(12) United States Patent
Lert

(10) Patent No.: US 11,760,569 B2
(45) Date of Patent: Sep. 19, 2023

(54) REPLENISHMENT AND ORDER FULFILLMENT SYSTEM

(71) Applicant: Symbotic LLC, Wilmington, MA (US)

(72) Inventor: John Lert, Wakefield, MA (US)

(73) Assignee: Symbotic LLC, Wilmington, MA (US)

( * ) Notice: Subject to any disclaimer, the term of this patent is extended or adjusted under 35 U.S.C. 154(b) by 0 days.

(21) Appl. No.: 17/307,838

(22) Filed: May 4, 2021

(65) Prior Publication Data

US 2021/0253349 A1   Aug. 19, 2021

Related U.S. Application Data

(63) Continuation of application No. 16/860,491, filed on Apr. 28, 2020, now Pat. No. 10,994,930, which is a continuation of application No. 16/358,488, filed on Mar. 19, 2019, now Pat. No. 10,633,184, which is a continuation of application No. 15/479,111, filed on Apr. 4, 2017, now Pat. No. 10,233,019, which is a continuation of application No. 14/715,029, filed on
(Continued)

(51) Int. Cl.
*B65G 1/04* (2006.01)
*B65G 1/137* (2006.01)
*B65G 1/06* (2006.01)

(52) U.S. Cl.
CPC .......... *B65G 1/0492* (2013.01); *B65G 1/065* (2013.01); *B65G 1/1373* (2013.01); *B65G 1/1378* (2013.01); *B65G 2209/08* (2013.01)

(58) Field of Classification Search
CPC .... B65G 1/0492; B65G 1/065; B65G 1/1373; B65G 1/1378; B65G 2209/08
See application file for complete search history.

(56) References Cited

U.S. PATENT DOCUMENTS 2,693,770 A   11/1954 Hubscher
2,717,088 A   9/1955 Morley
(Continued)

FOREIGN PATENT DOCUMENTS

DE   20112328   1/2002
DE   10307949   9/2004
(Continued)

*Primary Examiner* — Gene O Crawford
*Assistant Examiner* — Lester Rushin, III
(74) *Attorney, Agent, or Firm* — Perman & Green, LLP

(57) ABSTRACT

A warehousing system for storing and retrieving goods disposed in containers is provided. The system includes a multilevel storage array including an array of storage shelves for holding containers thereon, at least one substantially continuous lift for transporting containers to and from at least one level of the storage array, at least one transport vehicle located on the at least one level and configured to traverse a transport area transporting containers between the at least one continuous lift and container storage locations so that the at least one continuous lift communicates non-deterministically, via the transport vehicle, with storage locations of each of the storage shelves on the at least one level, an infeed transport system linked to the at least one continuous lift, and an order fulfillment station for generating order containers corresponding to customer orders where the order containers are entered onto the storage shelves of the storage array.

23 Claims, 42 Drawing Sheets

Related U.S. Application Data

May 18, 2015, now Pat. No. 9,611,097, which is a continuation of application No. 13/047,584, filed on Mar. 14, 2011, now Pat. No. 9,037,286.

(60) Provisional application No. 61/313,638, filed on Mar. 12, 2010.

(56) References Cited

U.S. PATENT DOCUMENTS

| | | | |
|---|---|---|---|
| 2,743,486 A | 5/1956 | Grayek | |
| 3,526,327 A | 9/1970 | Atwater | |
| 3,734,311 A | 5/1973 | Thompson et al. | |
| 3,738,506 A | 6/1973 | Cornford et al. | |
| 3,746,130 A | 7/1973 | Bullas | |
| 3,762,531 A | 10/1973 | Lee | |
| 3,846,947 A | 11/1974 | Short | |
| 3,927,773 A | 12/1975 | Bright | |
| 4,221,077 A | 9/1980 | Von Winckelmann | |
| 4,274,794 A | 6/1981 | Olson | |
| 4,428,708 A | 1/1984 | Burt | |
| 4,492,504 A | 1/1985 | Hainsworth | |
| 4,669,047 A | 5/1987 | Chucta | |
| 4,678,390 A | 7/1987 | Bonneton et al. | |
| 4,724,640 A | 2/1988 | Patane | |
| 4,773,807 A | 9/1988 | Kroll et al. | |
| 4,786,229 A | 11/1988 | Henderson | |
| 4,850,783 A | 7/1989 | Maekawa | |
| 4,878,876 A | 11/1989 | Ishimoto | |
| 5,067,932 A | 11/1991 | Edwards | |
| 5,135,344 A | 8/1992 | Kita et al. | |
| 5,169,284 A | 12/1992 | Berger et al. | |
| 5,211,523 A | 5/1993 | Andrada Galan et al. | |
| 5,218,909 A | 6/1993 | Ng | |
| 5,226,782 A | 7/1993 | Rigling | |
| 5,228,820 A | 7/1993 | Stansfield et al. | |
| 5,273,392 A | 12/1993 | Bernard, II et al. | |
| 5,370,492 A | 12/1994 | Gleyze et al. | |
| 5,380,139 A | 1/1995 | Pohjonen et al. | |
| 5,403,147 A | 4/1995 | Tanaka | |
| 5,405,232 A | 4/1995 | Lloyd et al. | |
| 5,425,612 A | 6/1995 | Ebstein | |
| 5,472,309 A | 12/1995 | Bernard, II et al. | |
| 5,478,183 A | 12/1995 | Savigny | |
| 5,564,879 A | 10/1996 | Noguchi | |
| 5,582,497 A | 12/1996 | Noguchi | |
| 5,595,263 A | 1/1997 | Pignataro | |
| 5,595,264 A | 1/1997 | Trotta | |
| 5,601,395 A | 2/1997 | Lichti, Sr. et al. | |
| 5,642,976 A | 7/1997 | Konstant | |
| 5,669,748 A | 9/1997 | Knudsen, Jr. | |
| 5,707,199 A | 1/1998 | Faller | |
| 5,718,551 A | 2/1998 | Ebstein | |
| 5,720,157 A | 2/1998 | Ross | |
| 5,816,281 A | 10/1998 | Mixon | |
| 5,839,872 A | 11/1998 | Goto et al. | |
| 5,877,962 A | 3/1999 | Radcliffe | |
| 5,890,136 A | 5/1999 | Kipp | |
| 5,903,464 A | 5/1999 | Stingel, Jr. et al. | |
| 5,928,058 A | 7/1999 | Francis et al. | |
| 5,933,814 A | 8/1999 | Rosenberg | |
| 5,953,234 A | 9/1999 | Singer et al. | |
| 6,061,607 A | 5/2000 | Bradley et al. | |
| 6,062,942 A | 5/2000 | Ogihara | |
| 6,135,697 A | 10/2000 | Isaacs et al. | |
| 6,289,260 B1 * | 9/2001 | Bradley | B65G 1/1376 414/280 |
| 6,321,138 B1 | 11/2001 | Livesay et al. | |
| 6,325,586 B1 | 12/2001 | Loy | |
| 6,332,098 B2 | 12/2001 | Ross et al. | |
| 6,377,867 B1 * | 4/2002 | Bradley | B65G 1/1376 700/216 |
| 6,439,955 B1 | 8/2002 | Feketo | |
| 6,602,037 B2 | 8/2003 | Winkler | |
| 6,687,568 B2 | 2/2004 | Ohtsuka et al. | |
| 6,729,836 B2 * | 5/2004 | Stingel, III | B65G 1/08 414/789.6 |
| 6,748,292 B2 | 6/2004 | Mountz | |
| 6,788,996 B2 | 9/2004 | Shimizu | |
| 6,794,928 B2 | 9/2004 | Lei | |
| 6,854,583 B1 | 2/2005 | Horn | |
| 6,895,301 B2 | 5/2005 | Mountz | |
| 6,929,440 B1 * | 8/2005 | Grand | B65G 1/0492 414/284 |
| 6,974,928 B2 | 12/2005 | Bloom | |
| 7,097,045 B2 | 8/2006 | Winkler | |
| 7,155,304 B1 | 12/2006 | Charych | |
| 7,640,863 B2 * | 1/2010 | Minges | B65G 1/0492 104/130.09 |
| 7,695,235 B1 | 4/2010 | Rallis | |
| 8,195,326 B2 | 6/2012 | Schaefer | |
| 8,428,771 B2 | 4/2013 | Schaefer | |
| 8,634,954 B2 | 1/2014 | Schafer | |
| 2002/0045954 A1 | 4/2002 | Nose et al. | |
| 2004/0016684 A1 | 1/2004 | Braginsky et al. | |
| 2004/0128928 A1 | 7/2004 | Stagner | |
| 2004/0193311 A1 | 9/2004 | Winkler | |
| 2004/0247421 A1 | 12/2004 | Saunders et al. | |
| 2004/0249497 A1 | 12/2004 | Saigh et al. | |
| 2005/0055939 A1 | 3/2005 | Wolgemuth et al. | |
| 2006/0051190 A1 * | 3/2006 | Taguchi | B65G 1/0421 414/279 |
| 2006/0229762 A1 | 10/2006 | Schaefer | |
| 2007/0065258 A1 | 3/2007 | Benedict et al. | |
| 2008/0247848 A1 | 10/2008 | Freudelsperger | |
| 2009/0074545 A1 | 3/2009 | Lert et al. | |
| 2010/0049360 A1 | 2/2010 | Stemmle | |
| 2010/0076591 A1 | 3/2010 | Lert | |
| 2010/0316468 A1 | 12/2010 | Lert et al. | |

FOREIGN PATENT DOCUMENTS

| | | |
|---|---|---|
| EP | 0133472 | 2/1985 |
| EP | 1331179 | 7/2003 |
| EP | 1767472 | 3/2007 |
| FR | 2730715 | 8/1996 |
| JP | 07004408 | 1/1995 |
| JP | 07033219 | 2/1995 |
| JP | 09278117 | 10/1997 |
| JP | 2004099272 | 4/2004 |
| JP | 2007153490 | 6/2007 |
| JP | 2007323471 | 12/2007 |
| JP | 2010001152 | 1/2010 |

* cited by examiner

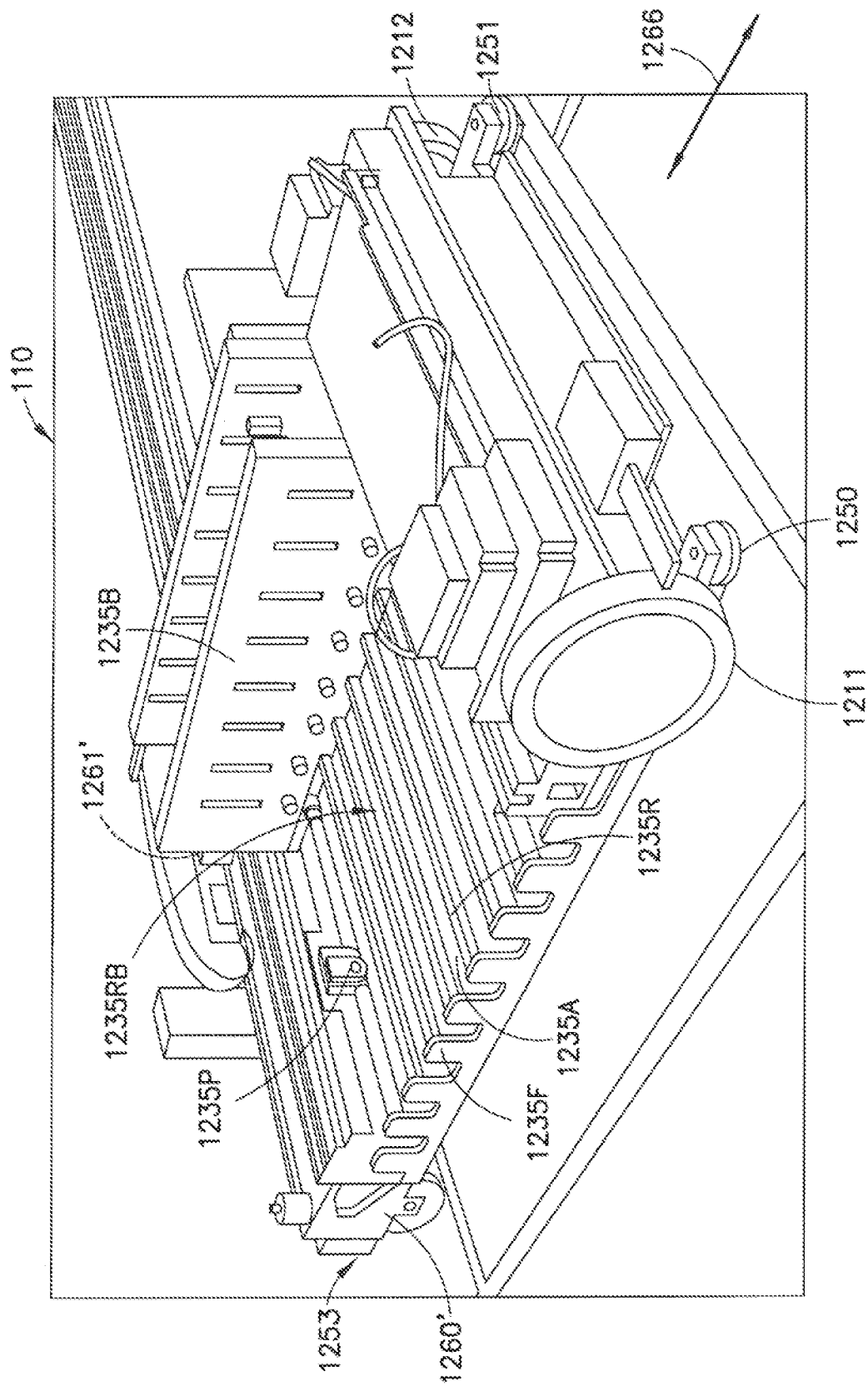

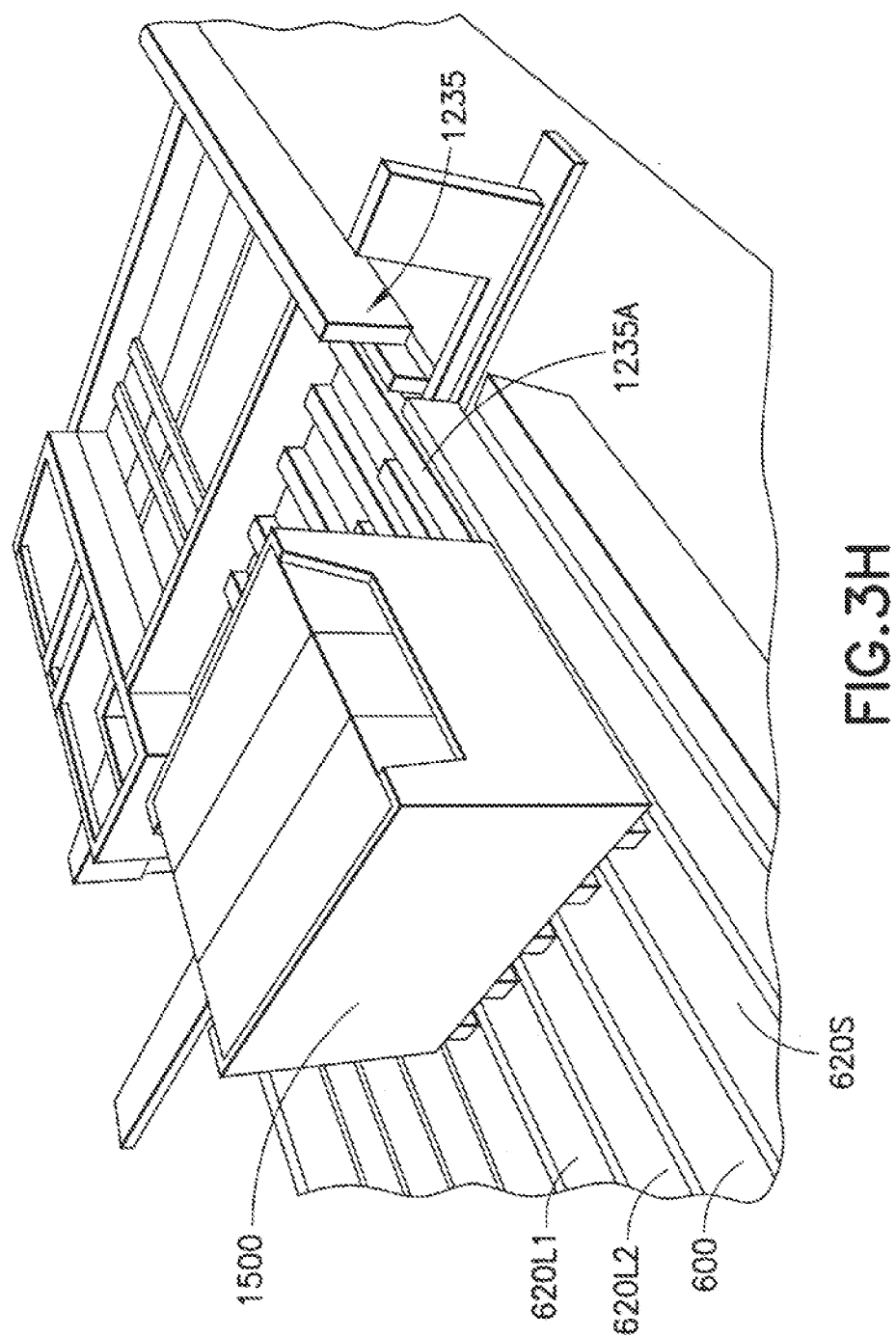

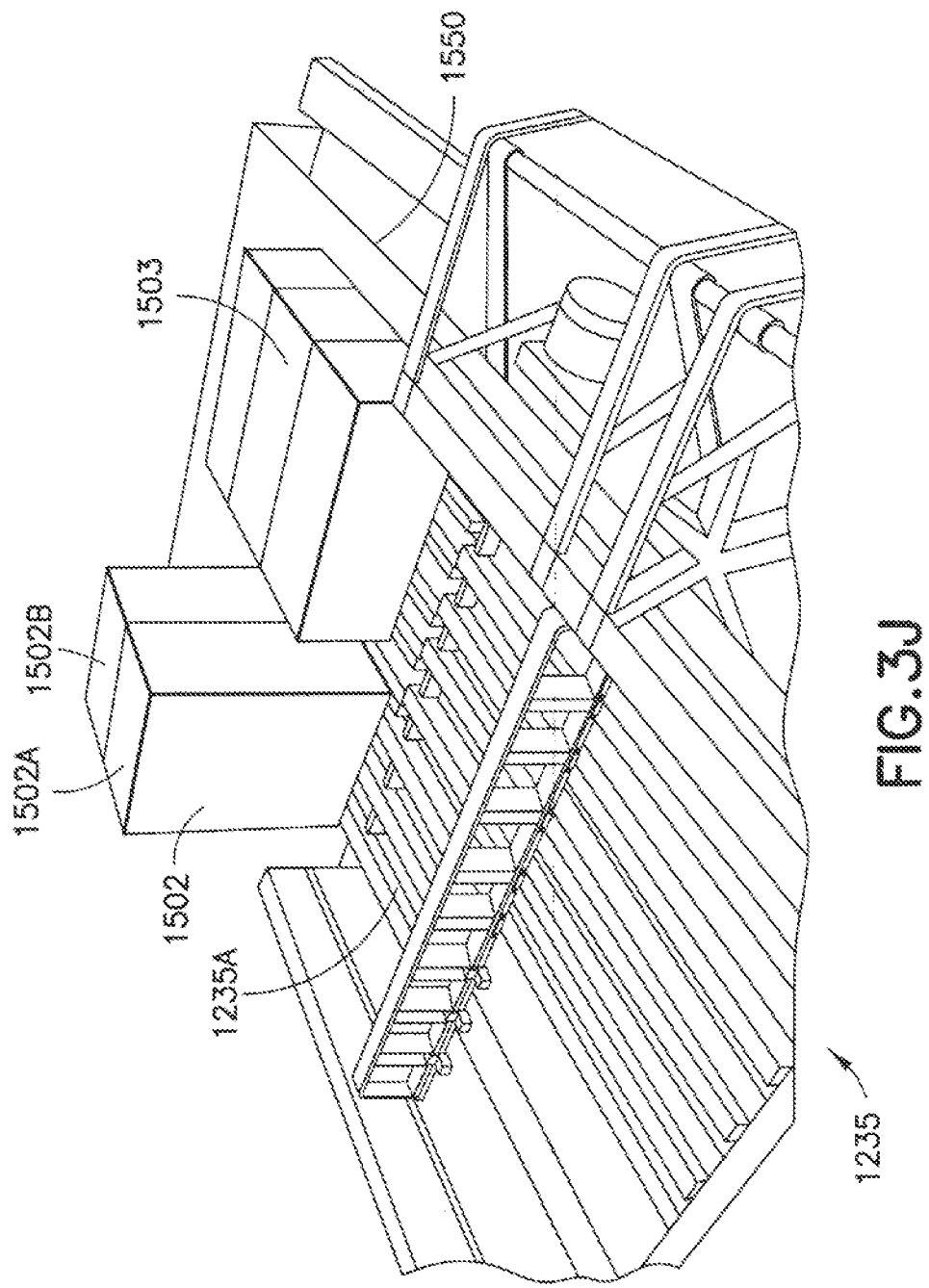

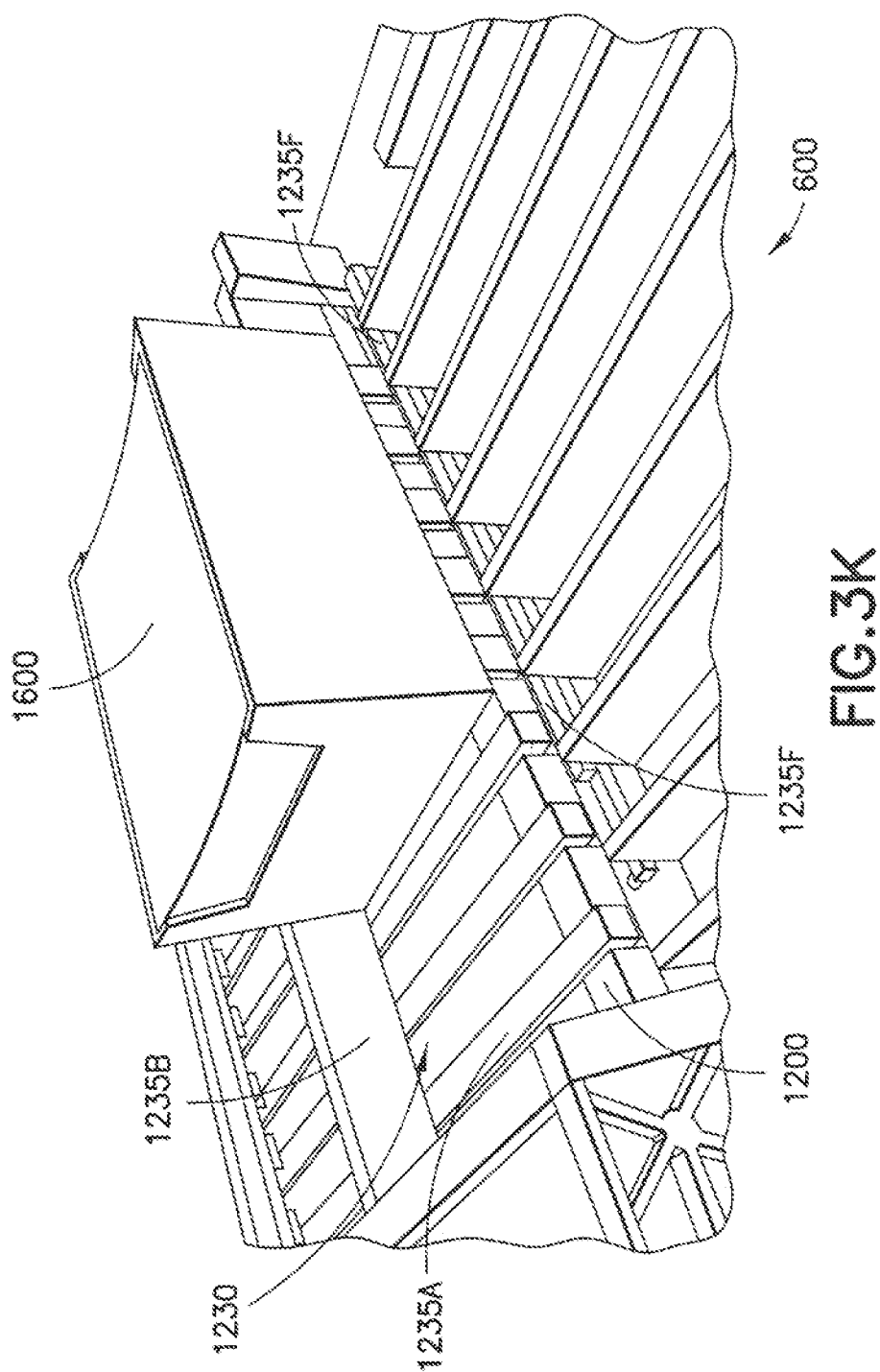

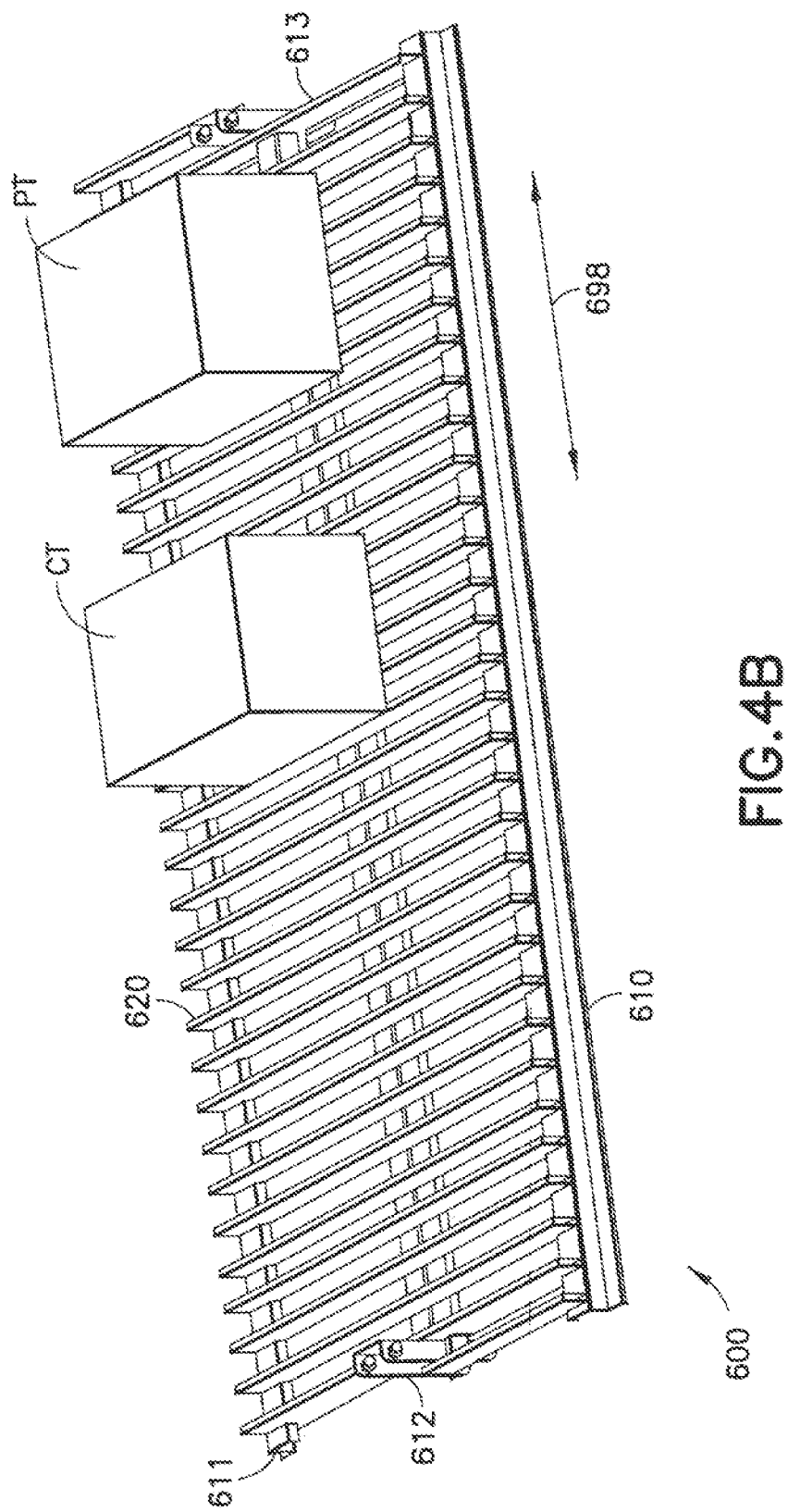

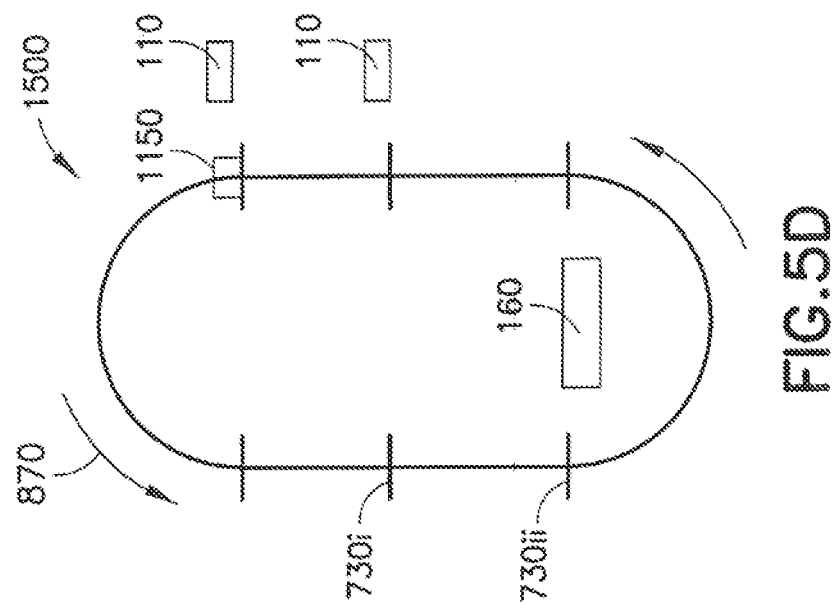
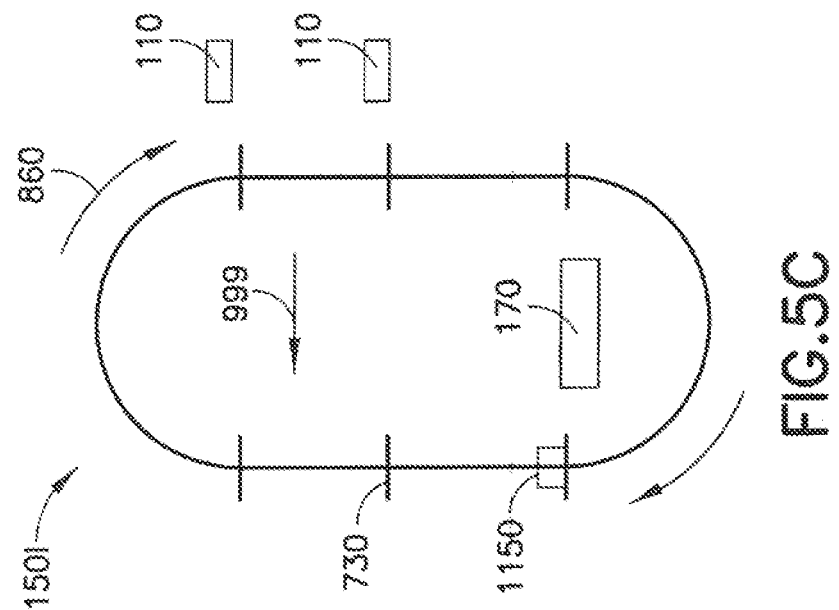

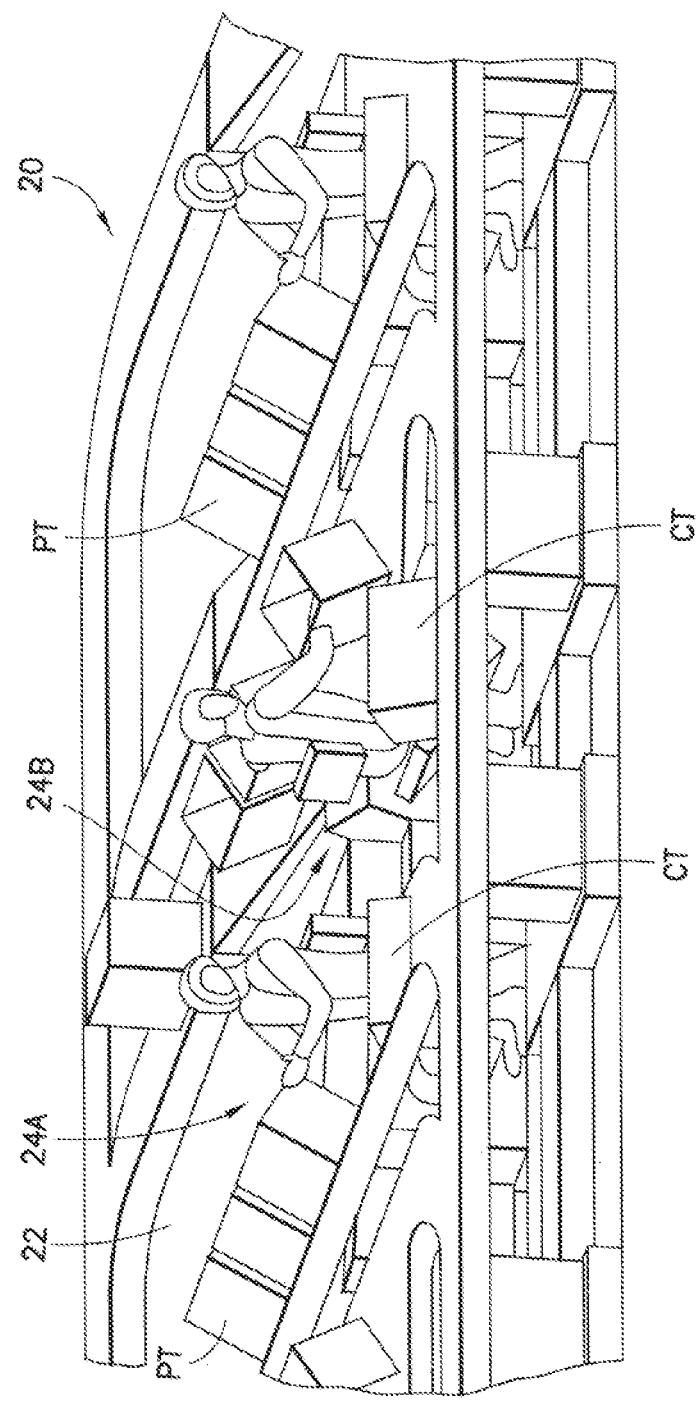

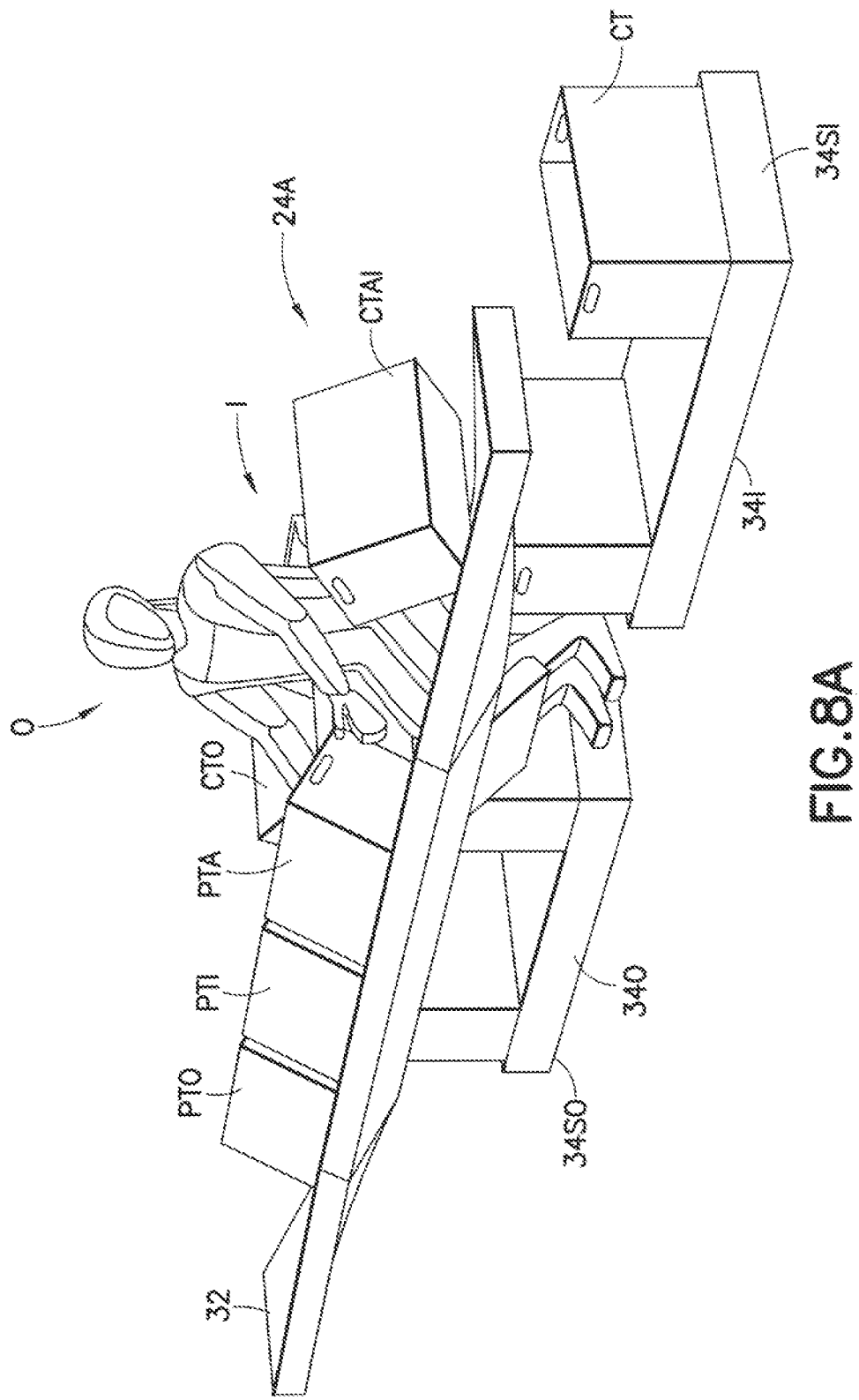

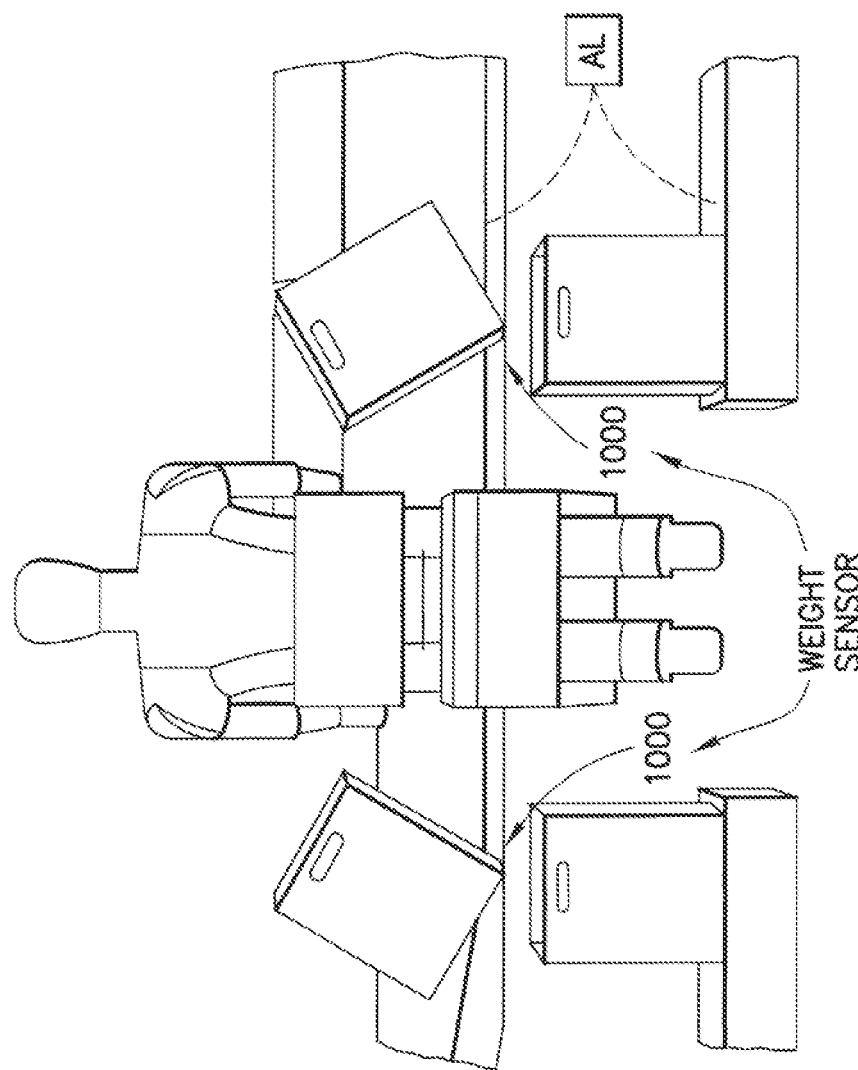

REPLENISHMENT AND ORDER FULFILLMENT SYSTEM

CROSS REFERENCE TO RELATED APPLICATIONS

This application is a continuation of U.S. patent application Ser. No. 16/860,491, filed Apr. 28, 2020, (now U.S. Pat. No. 10,994,930), which is a continuation of U.S. patent application Ser. No. 16/358,488, filed Mar. 19, 2019, (now U.S. Pat. No. 10,633,184), which is a continuation of U.S. patent application Ser. No. 15/479,111, filed Apr. 4, 2017, (now U.S. Pat. No. 10,233,019), which is a continuation of U.S. patent application Ser. No. 14/715,029, filed on May 18, 2015, (now U.S. Pat. No. 9,611,097), which is a continuation of U.S. patent application Ser. No. 13/047,584, filed on Mar. 14, 2011, (now U.S. Pat. No. 9,037,286), which claims priority from and the benefit of U.S. provisional patent application No. 61/313,638, filed on Mar. 12, 2010, the disclosures of which are incorporated herein by reference in their entireties.

FIELD

The exemplary embodiments generally relate to an order replenishment system and more specifically to an automated order replenishment system.

BACKGROUND

Replenishment and order fulfillment are major portions of operations in the retail field and contribute greatly to cost factor. Improvements in the systems and methods for effecting replenishment and order fulfillment resulting in higher efficiencies (e.g. throughput) and lower fulfillment costs would provide significant advantages to retail business enjoying the fruits of such improvements. Generally replenishment of stores (e.g. retail stores or other stores were consumers can obtain various goods units) is accomplished from warehouses that by their nature may provide improved bulk storage capabilities compared to the store. The warehouse and store, naturally, are connected by a transport system that may include for example shipping systems, in examples where warehouse and store are geographically remote, and/or other suitable transport systems such as pallet trucks/fork lifts, continuous mass transport systems, (e.g. belt/roller conveyors, air bearing slides, etc.), and robotic vehicles. In other example, the warehouse may be substantially adjoining the store. As may be realized, the warehouse may be provided with storage, sorting and transport systems for storing and handling product cases. A case means a shipping container such as a carton, box, etc. capable of holding one or more product or good units and used to form the building blocks of a shipping pallet. A product or good unit is used herein to refer to the individual base unit procured by the customer at the store, which may be made up of one or more items (e.g. individual can or multi-can pack are both good units). A product case means a case holding only good units of a common product type as may be provided or sourced from a single manufacturer or distributor, is stocked prior to order and finally for chase. As may be realized, the warehouse may be provided with a storage, sorting and transport system that effect replenishment and order fulfillment of storage from the warehoused product cases. Storage may seek replenishment using what may be referred to as order line(s). Each order line corresponding to a store customer identifying the type/unique identification of the good(s) sought and the quantity of the good units sought. As may be realized, the quantity of good units may be more or less than case capacity. Accordingly, if the order quantity is less than a case, replenishment may be performed by shipping good unit(s) (or what may be also referred to as each or eached for purposes of description) out from the product case and a shipping container such as an order tote. A tote is a container suitable for being palletized and shipped. As may be also realized, order totes may include good units of different product types and sizes.

BRIEF DESCRIPTION OF THE DRAWINGS

The foregoing aspects and other features of the disclosed embodiment are explained in the following description, taken in connection with the accompanying drawings, wherein:

FIG. 6A is a partial perspective view showing part of the system in FIG. 6;

FIG. 7A showing a product tote conveyor; FIG. 7B further showing workstations; FIG. 7C further showing order tote conveyor(s); and FIG. 7D further showing empty product tote conveyor(s); FIG. 7E further showing replenishment product to the conveyor(s); and FIG. 7F showing an order staging conveyor(s) in accordance with aspects of the disclosed embodiments;

FIGS. 8A-8C respectively show schematic perspective front, back and partial back views of a workstation in the replenishment system in accordance with aspects of the disclosed embodiment;

DETAILED DESCRIPTION

Figure 1:
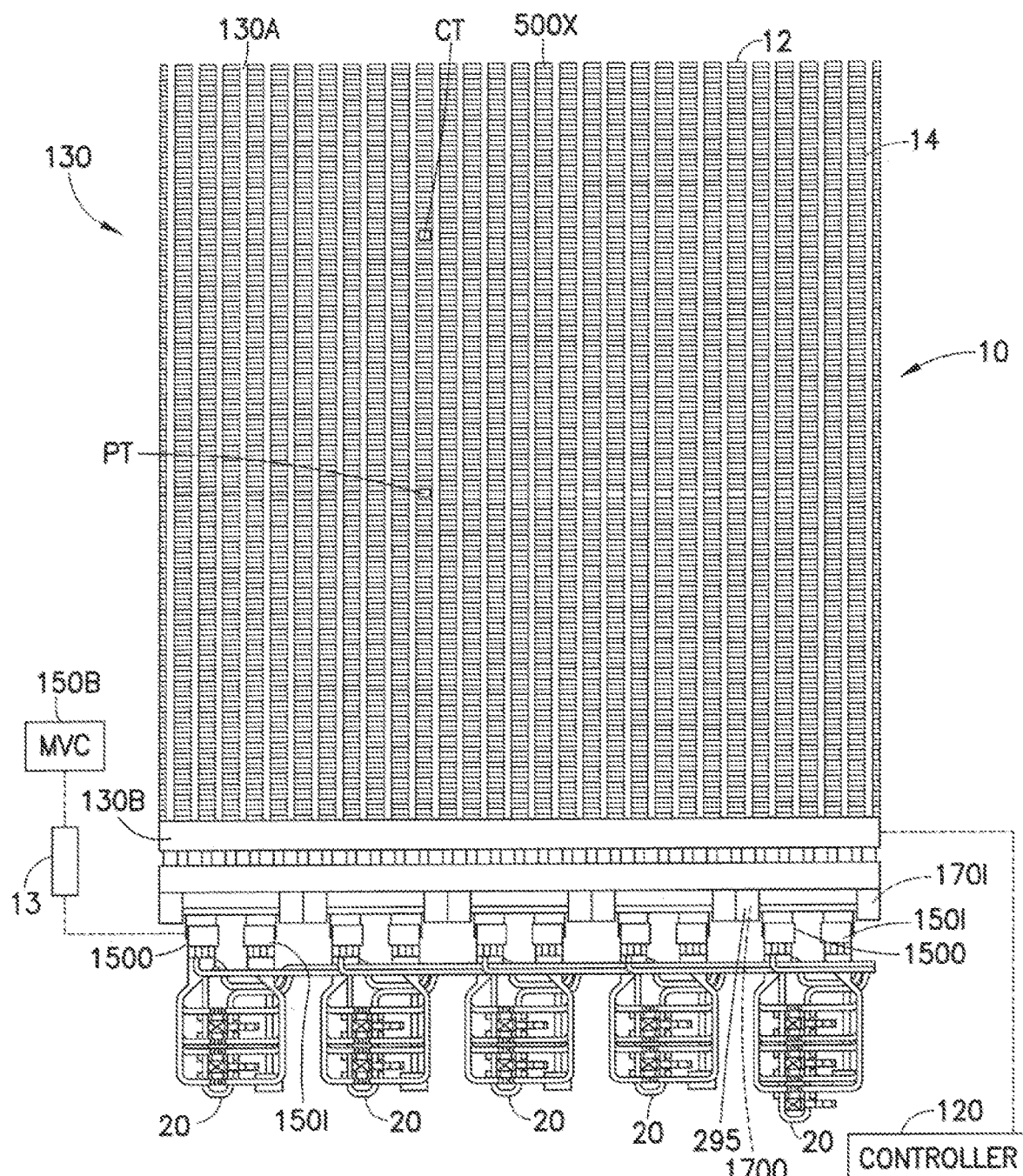
FIG. 1 is a schematic plan view of a facility with a replenishment and order fulfillment system incorporating features in accordance with aspects of a disclosed embodiment.

Referring to FIG. 1 there is shown a schematic plan view of a facility, such as a warehouse, that has a warehousing system for storing, sorting and transporting product cases within the facility, and a replenishment system for replenishment and order fulfillment of stores (such as for example, grocery, retail or other stores) and other customers, including individuals, incorporating features in accordance with aspects of the disclosed embodiment. Although aspects of the disclosed embodiment will be described with reference to the drawings, it should be understood that the aspects of the disclosed embodiment can be embodied in many alternate forms. In addition, any suitable size, shape or type of elements or materials could be used.

Figure 2:
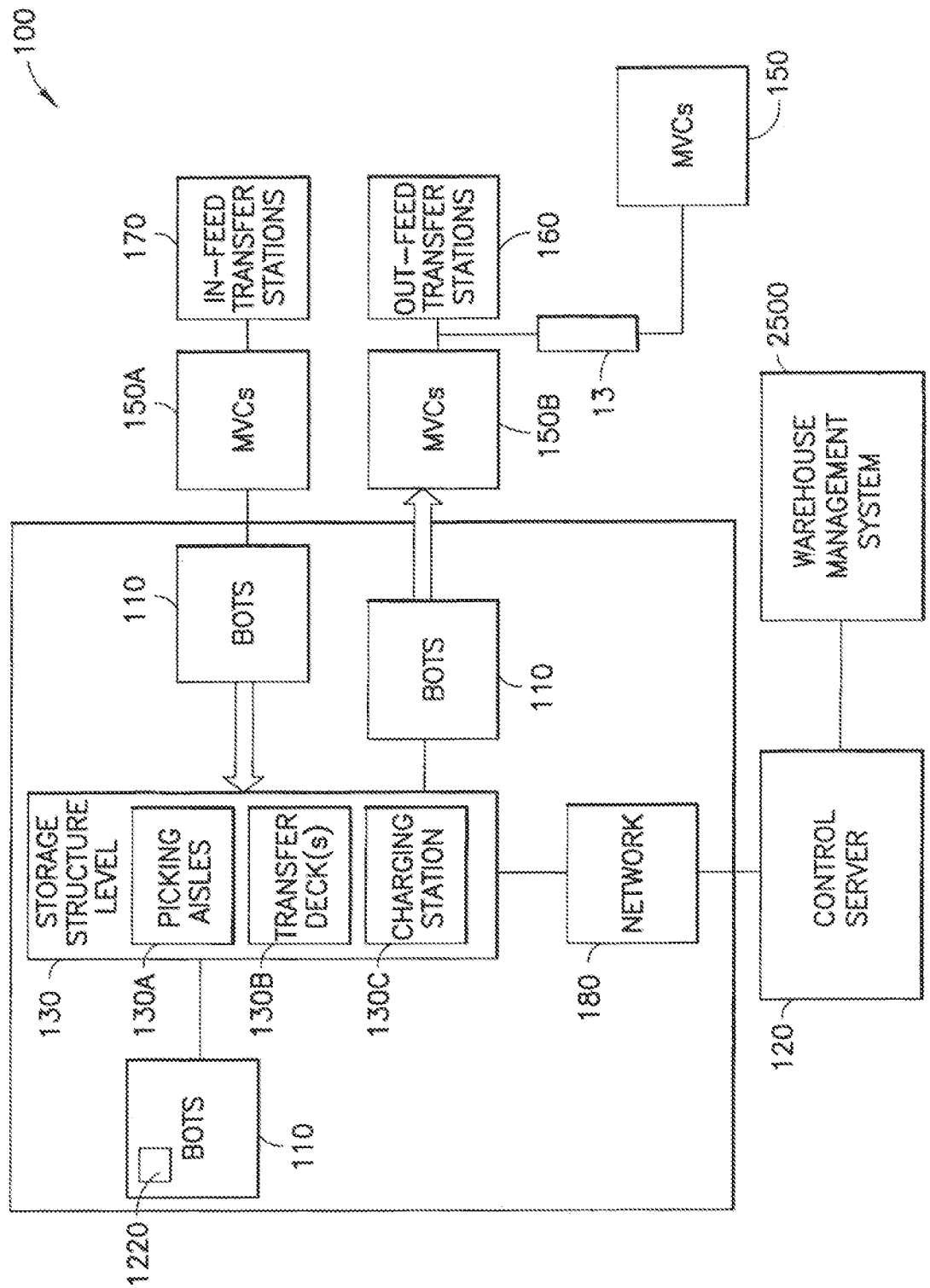
FIG. 2 is a schematic plan view of a portion of a replenishment and order fulfillment system in accordance with aspects of the disclosed embodiment.

Still referring to FIG. 1, the warehousing system 12 in the facility may be automated at least in part. Suitable examples of automated warehousing systems are described in U.S. provisional application No. 61/168,349, filed on Apr. 10, 2009 entitled "Storage and Retrieval System", U.S. patent application Ser. No. 12/757,220, filed on Apr. 9, 2010 entitled "Storage and Retrieval System", U.S. patent application Ser. No. 12/757,337, filed on Apr. 9, 2010 entitled "Control System for Storage and Retrieval Systems", U.S. patent application Ser. No. 12/757,381 filed on Apr. 9, 2010 entitled "Storage and Retrieval System", U.S. patent application Ser. No. 12/757,354 filed on Apr. 9, 2010 entitled "Lift Interface for Storage and Retrieval Systems", and U.S. patent application Ser. No. 12/757,312 filed Apr. 9, 2010 entitled Autonomous Transports for Storage and Retrieval Systems", the disclosures of which are incorporated by reference herein in their entireties. It should be understood that the warehousing system may be of any suitable type and configuration. As may be realized, the warehousing or storage and retrieval system 12 is arranged to handle product cases, (as well as product totes and order totes) that may move at the facility on pallets and may be depalletized, for storage and retrieval. For example, in one aspect and referring to FIG. 2, the storage and retrieval system 12 may be connected in any suitable manner to a storage system 100 that is substantially similar to that described in U.S. patent application Ser. No. 12/757,220 previously incorporated by reference herein. The storage and retrieval system 100, like storage and retrieval system 12, may be configured for installation in, for example, existing warehouse structures or adapted to new warehouse structures. In one example, the storage and retrieval system 100 may include in-feed and out-feed transfer stations 170, 160, multilevel vertical conveyors 150A, 150B, a storage structure 130, and a number of autonomous vehicular transport robots 110 (referred to herein as "bots"). The storage structure 130 may include multiple levels of storage rack modules where each level includes respective picking aisles 130A, and transfer decks 130B for transferring case units between any of the storage areas of the storage structure 130 and any shelf of any multilevel vertical conveyor 150A, 150B. The picking aisles 130A, and transfer decks 130B also allow the bots to place case units into picking stock and to retrieve ordered case units. The bots 110 may be configured to place case units, such as the above described retail merchandise, into picking stock in the one or more levels of the storage structure 130 and then selectively retrieve ordered case units for shipping the ordered case units to, for example, a store or transferring the case units to storage and retrieval system 12 as will be described below. The in-feed transfer stations 170 and out-feed transfer stations 160 may operate together with their respective multilevel vertical conveyors 150A, 150B for bi-directionally transferring case units to and from one or more levels of the storage structure 130. It is noted that while the multilevel vertical conveyors 150A, 150B are described as being dedicated inbound conveyors 150A and outbound conveyors 150B, it should be understood that each of the conveyors 150A, 150B may be used for both inbound and outbound transfer of case units/case units from the storage and retrieval system.

When transferring case units out of the storage system 100 the bots 110 may place the storage units on an outbound multilevel vertical conveyor 150B in any suitable manner. The outbound vertical conveyor 150B may transfer the case units to the out feed transfer stations 160 which may be configured to prepare the case units for shipping or transfer the case units to a conveyor 13 for transfer to the storage and retrieval system 12 (see also FIG. 1). For example, the conveyor may connect the outbound multilevel vertical conveyor 150B of storage system 100 or any other suitable supply source with an inbound multilevel vertical conveyor 150I of the storage and retrieval system 12. As may be realized, case units or the contents thereof may be prepared in any suitable manner for use in the storage and retrieval system 12 during the transfer of the case units and their contents between storage system 100 and storage and retrieval system 12. As one example the conveyor may include a box or container top removal station that exposes the contents of the case unit for each picking as described herein so that the case unit becomes a product tote. In another example, the contents of the case unit may be transferred to another container or tote (e.g. product tote).

Figure 4:
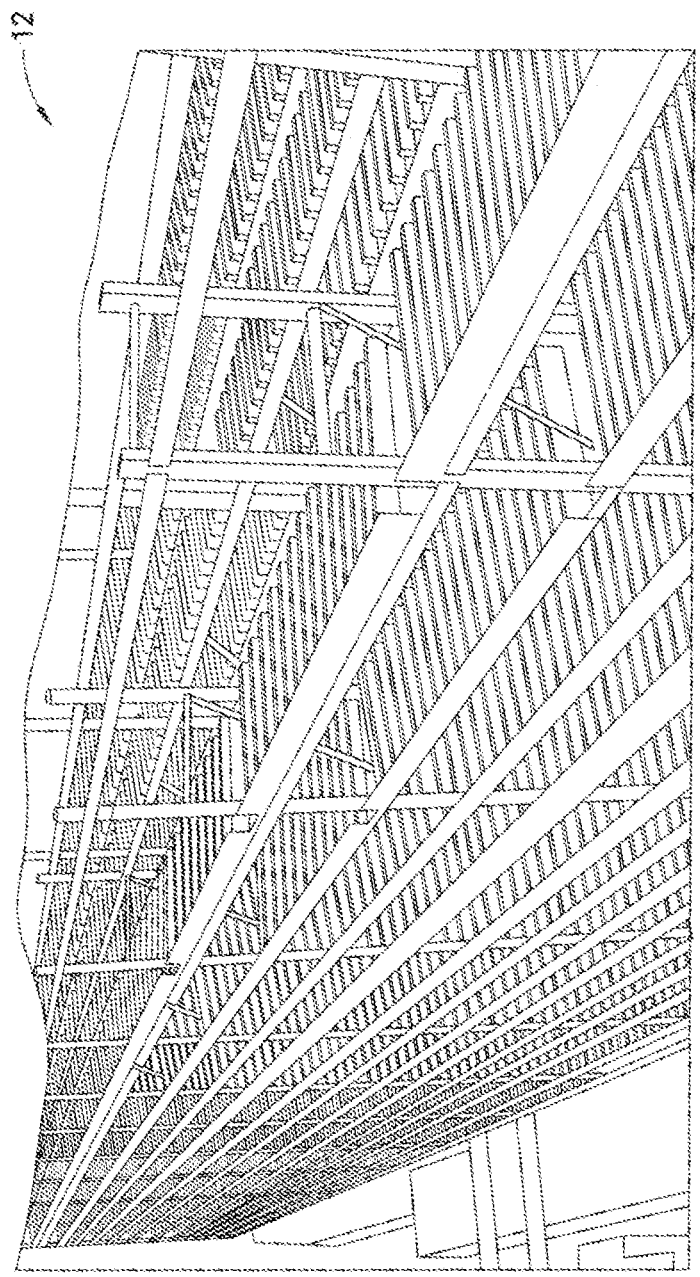
FIGS. 4-4C are schematic illustrations of a portion of the storage system of the facility in FIG. 1 in accordance with aspects of the disclosed embodiment.
Figure 4A:
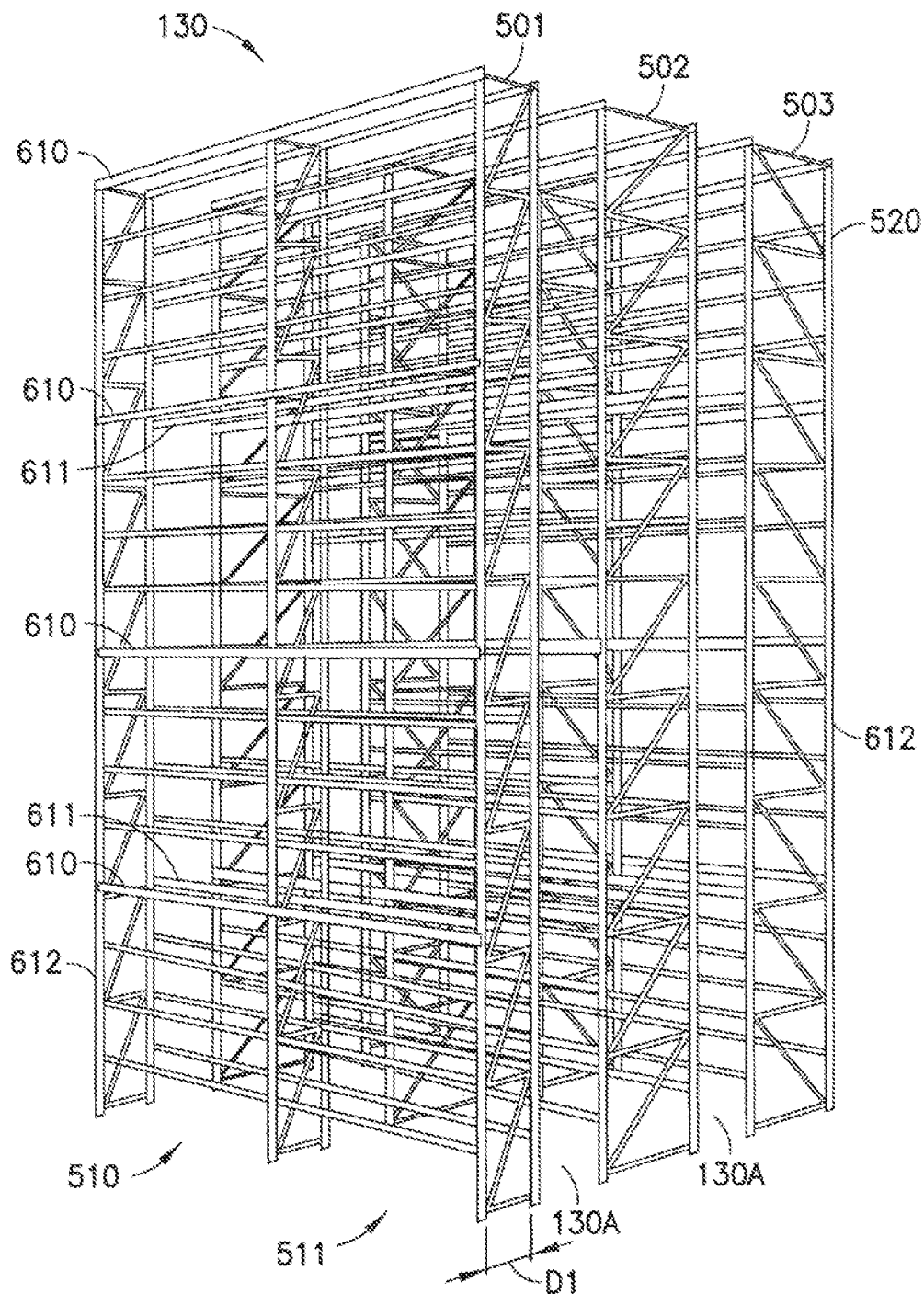
Figure 4C:
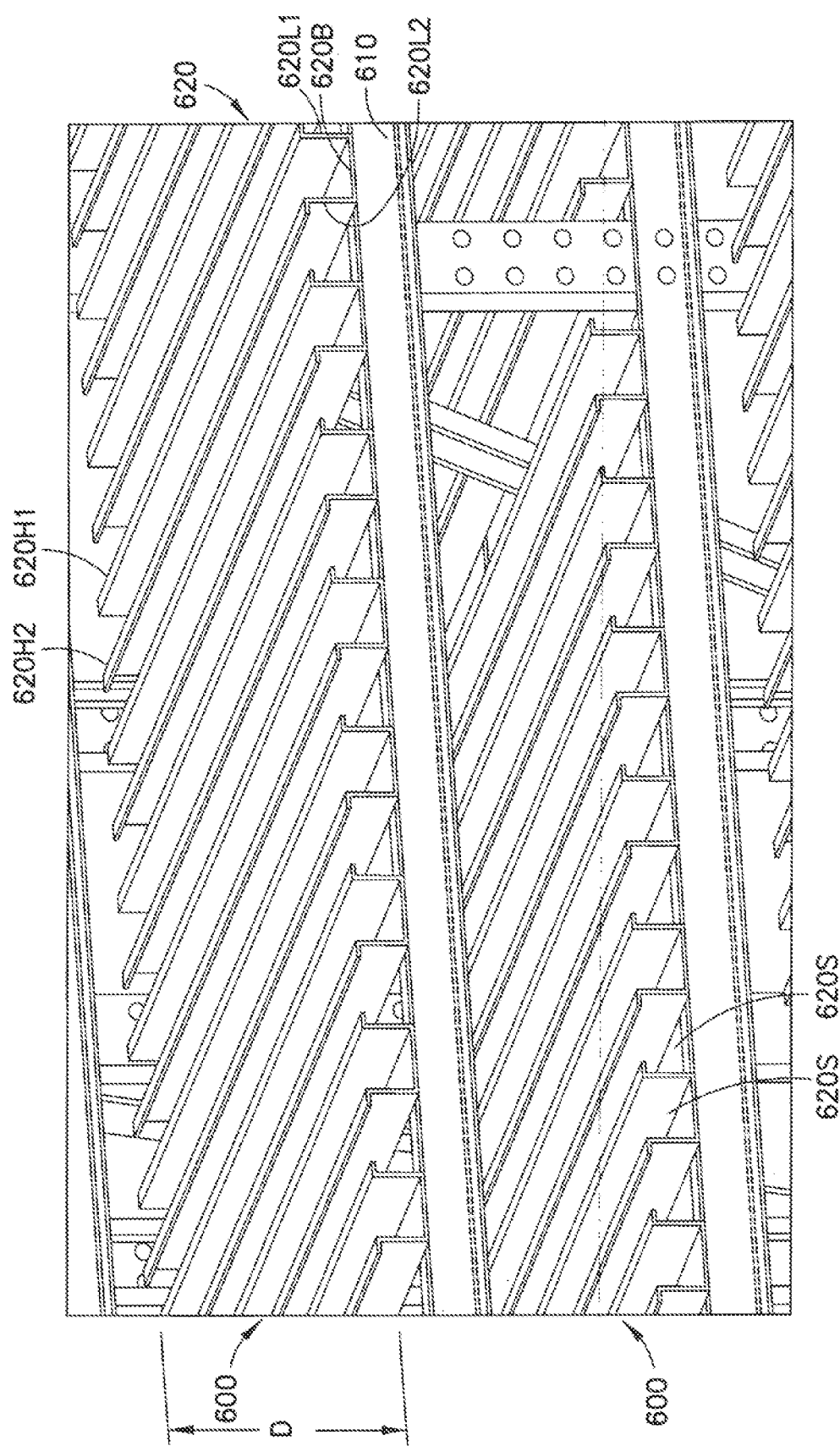

As seen in FIG. 1, and with reference also to FIGS. 4-4C, generally the warehousing system 12 may include storage locations (for example arranged in racks that may be stacked vertically, see for example FIG. 4, and distributed along aisles) capable of housing for example uncontained cases, such as product cases for example as well as product and order totes. As may be realized product totes PT or uncontained cases of the same type may be stored in different locations within the storage structure 130 so that at least one of that type of item may be retrieved when other ones of that type of item are inaccessible. The storage and retrieval system may also be configured to provide multiple access paths or routes to each storage location (e.g. pickface) so that bots 110 may reach each storage location using, for example, a secondary path if a primary path to the storage location is obstructed.

Figure 1A:
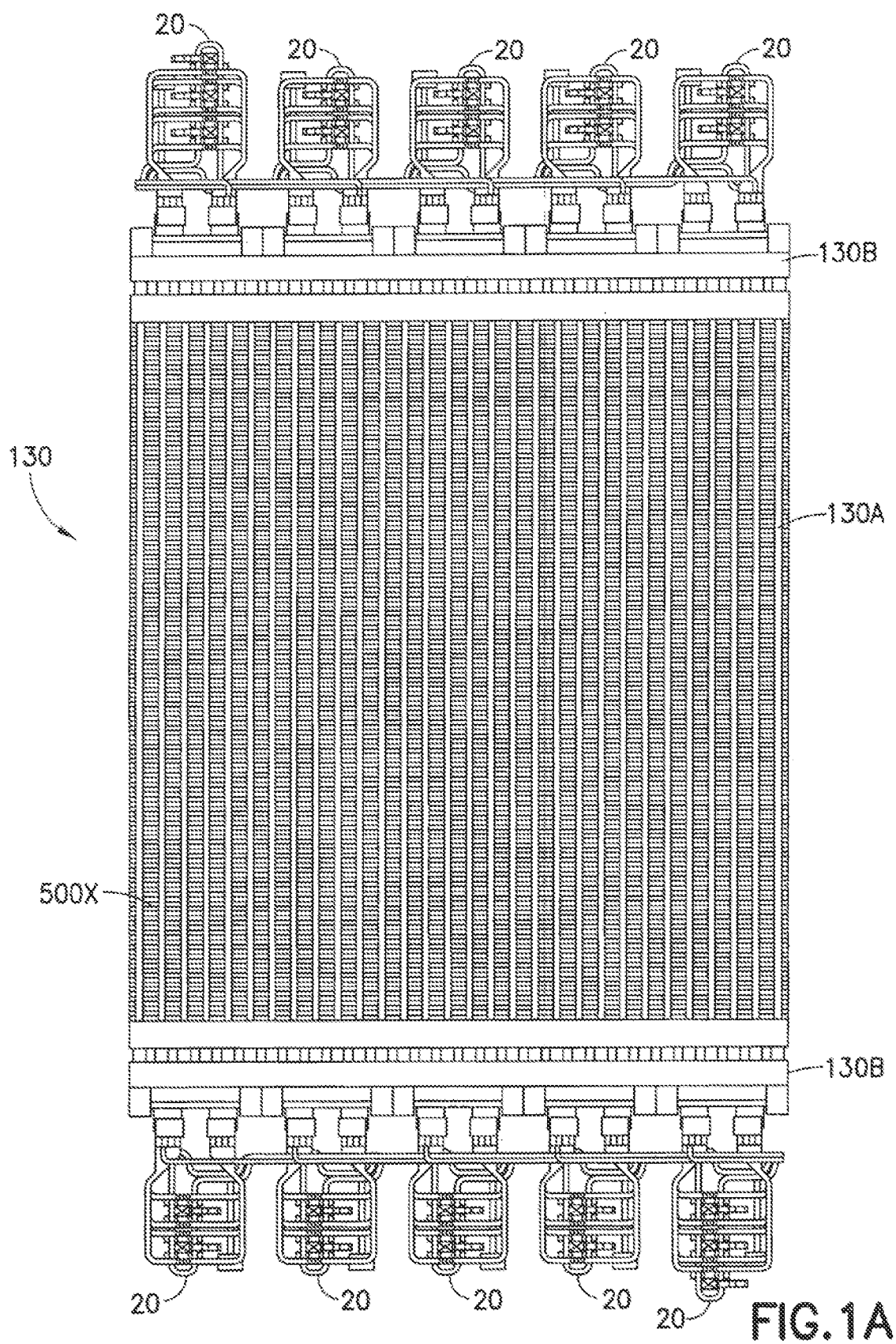
FIG. 1A is a schematic plan view of a facility with a replenishment and order fulfillment system incorporating features in accordance with aspects of a disclosed embodiment.

It is noted that the storage and retrieval systems shown herein have exemplary configurations only and may have any suitable configuration and components for storing and retrieving case units as described herein. For example, the storage and retrieval system in FIG. 1 is shown has a single ended storage system (e.g. modules 20 and transfer decks 130B are located only on one end of the picking aisles 130A and storage racks 500X) but it should be understood that the modules 20 and transfer decks 130B may be located on both ends of the picking aisles 130A and storage racks 500X as shown in FIG. 1A. As may be realized, the storage and retrieval system may also have any suitable number of storage sections or racks 500X, any suitable number of transfer decks 130B and corresponding modules 20. As a further example, a storage and retrieval system in accordance with aspects of the disclosed embodiment may include transfer decks and corresponding modules 20 located on three or four sides of the storage sections for serving, for example, loading docks disposed on various sides of a building or the modules may be located in between two storage sections so that the storage sections extend laterally from the transfer decks that extend between the storage sections and provide product and/or order totes to vertical conveyors that feed the modules 20.

Referring to FIGS. 4A-4C, the storage structure 130 of the storage and retrieval system 12 will be described in greater detail. In accordance with an exemplary embodiment, the storage structure 130 includes, for example, any suitable number of vertical supports 612 and any suitable number of horizontal supports 610, 611, 613. It is noted that the terms vertical and horizontal are used for exemplary purposes only and that the supports of the storage structure 130 may have any suitable spatial orientation. In this exemplary embodiment, the vertical supports 612 and horizontal supports 610, 611, 613 may form an array of storage modules 501, 502, 503 having storage bays 510, 511. The horizontal supports 610, 611, 613 may be configured to support the storage shelves 600 (described below) as well as the floors or tracks (for the bots 110 to travel) within the aisle spaces 130A. The horizontal supports 610, 611, 613 may be configured to minimize the number of splices between horizontal supports 610, 611, 613 and thus, the number of splices that, for example, tires of the bots 110 will encounter. For exemplary purposes only, the aisle floor 130F may be a solid floor constructed of plymetal panels having, for example, a wood core sandwiched between sheets of sheet metal. As may be realized, the floors of the storage and retrieval system 12 may have any suitable layered, laminated, solid or other construction and be constructed of any suitable material(s), including, but not limited to plastics, metals, woods and composites. In one aspect of the disclosed embodiment the floors may be constructed of a honeycomb structure or other suitable lightweight yet substantially rigid structure. The floors may be coated or treated with wear resistant materials or include replaceable sheets or panels that may be replaced when worn. Tracks 1300 (FIG. 3D) for the bots 110 may be incorporated into or otherwise affixed to, for example, the aisle floors for guiding the bots 110 in substantially straight lines or paths of travel while the bots 110 are traveling within the storage structure 130. Suitable examples of tracks 1300 are described in U.S. patent application Ser. No. 12/757,312, entitled "AUTONOMOUS TRANSPORTS FOR STORAGE AND RETRIEVAL SYSTEMS," previously incorporated by reference. The floors may be attached to, for example, one or more of the vertical and horizontal supports (or any other suitable support structure) in any suitable manner such as with any suitable fasteners including, but not limited to bolts and welds. In one exemplary embodiment, as can be seen in, for example, FIG. 3D, the tracks 1300 for the bots 110 may be fixed to one or more vertical supports of the storage structure in any suitable manner such that the bot straddles adjacent tracks 1300 for traversing a picking aisle 130A. As can be seen in FIG. 3D one or more of the picking aisles may be substantially vertically unobstructed by floors (e.g. the picking aisles do not have floors). The absence of floors on each picking level may allow maintenance personnel to walk down the picking aisles where the height between each storage level would otherwise substantially prevent the maintenance personnel from traversing the picking aisles.

Still referring to FIGS. 4-4C, each of the storage bays 510, 511 may hold one or more product totes PT and/or order totes CT on storage shelves 600 that are separated by the picking aisles 130A (see also FIG. 1). It is noted that the product totes PT and order totes CT may be placed on the same shelf adjacent one another (e.g. product totes are located next to order totes and vice versa), as shown in FIG. 4B, in the same storage array on the same level of the storage structure 130 as shown in FIG. 1 or the product totes PT may be segregated from the order totes CT and vice versa (e.g. one storage aisle 500X has product totes and another different one of the storage racks 500X has order totes or one level of the storage structure has product totes and another different level of the storage structure has order totes). A controller, such as controller 120, may be configured to designate and track the storage locations of the totes CT, PT for manipulation of the totes CT, PT through the storage and retrieval system 12. It is also noted that in one aspect of the disclosed embodiment the vertical supports 612 and/or horizontal supports 610, 611, 613 may be configured to allow for adjusting the height or elevation of the storage shelves and/or floors relative to, for example, each other and a floor of the facility in which the storage and retrieval system is located. In another aspect, the storage shelves and floors may be fixed in elevation. As can be seen in FIG. 4A, storage module 501 is configured as an end module having, for example, about half the width of the other storage modules 502, 503. As an example, the end module 501 may have a wall located on one side and the picking aisle 130A located on the opposite side. The depth D1 of end module 501 may be such that access to the storage shelves 600 on module 501 is achieved by the picking aisle 130A located on but one side of the storage module 501, whereas the storage shelves 600 of modules 502, 503 may be accessed by picking aisles 130A located on both sides of the modules 502, 503 allowing for, as an example, the storage modules 502, 503 having a depth substantially twice that of the depth D1 of storage module 501.

The storage shelves 600 may include one or more support legs 620L1, 620L2 extending from, for example, the horizontal supports 610, 611, 613. The support legs 620L1, 620L2 may have any suitable configuration and may be part of, for example, a substantially U-shaped channel 620 such that the legs are connected to each other through channel portion 620B. The channel portion 620B may provide an attachment point between the channel 620 and one or more horizontal supports 610, 611, 613. In alternate embodiments, each support leg 620L1, 620L2 may be configured to individually mount to the horizontal supports 610, 611, 613. In this exemplary embodiment, each support leg 620L1, 620L2 includes a bent portion 620H1, 620H2 having a suitable surface area configured to support case units stored on the shelves 600. The bent portions 620H1, 620H2 may be configured to substantially prevent deformation of the case units stored on the shelves. In other aspects of the disclosed embodiment the leg portions 620H1, 620H2 may have a suitable thickness or have any other suitable shape and/or configuration for supporting case units stored on the shelves. As can be seen in FIGS. 17A and 17B, the support legs 620L1, 620L2 or channels 620 may form a slatted or corrugated shelf structure where spaces 620S between, for example, the support legs 620L1, 620L2 allow for arms or fingers of the bots 110 to reach into the shelving for transferring case units to and from the shelves. It is noted that the support legs 620L1, 620L2 of the shelves 600 may be configured for storing case units, where adjacent case units are spaced any suitable distance from each other. For example, a pitch or spacing between the support legs 620L1, 620L2 in the direction of arrow 698 may be such that the case units are placed on the shelves 600 with a distance of about one pitch between the case units to, for example, minimize contact between case units as the case units are placed and removed from the shelves by the bots 110. For exemplary purposes only, case units located adjacent one another may be spaced apart, for example, in direction 698 a distance of about 2.54 cm. In alternate embodiments the spacing between the case units on the shelves may be any suitable spacing. It is also noted that transfer of case units to and from the multilevel vertical conveyors 150A, 150B (whether the transfer is made directly or indirectly by the bot 110) may occur in a substantially similar manner to that described above with respect to the storage shelves 600.

Figure 3:
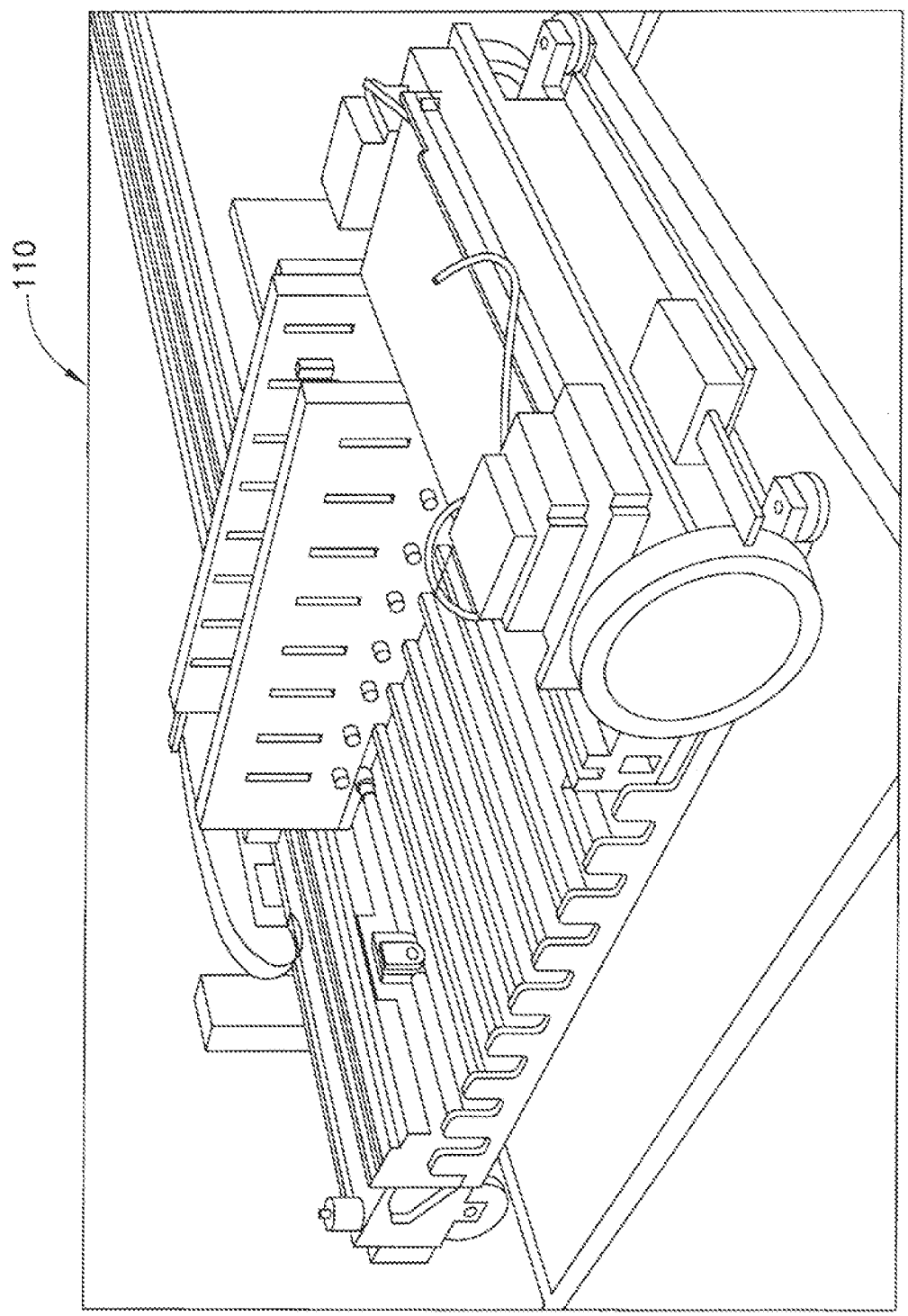
FIGS. 3-3N are schematic illustrations of a transport vehicle in accordance with aspects of the disclosed embodiment.
Figure 5:
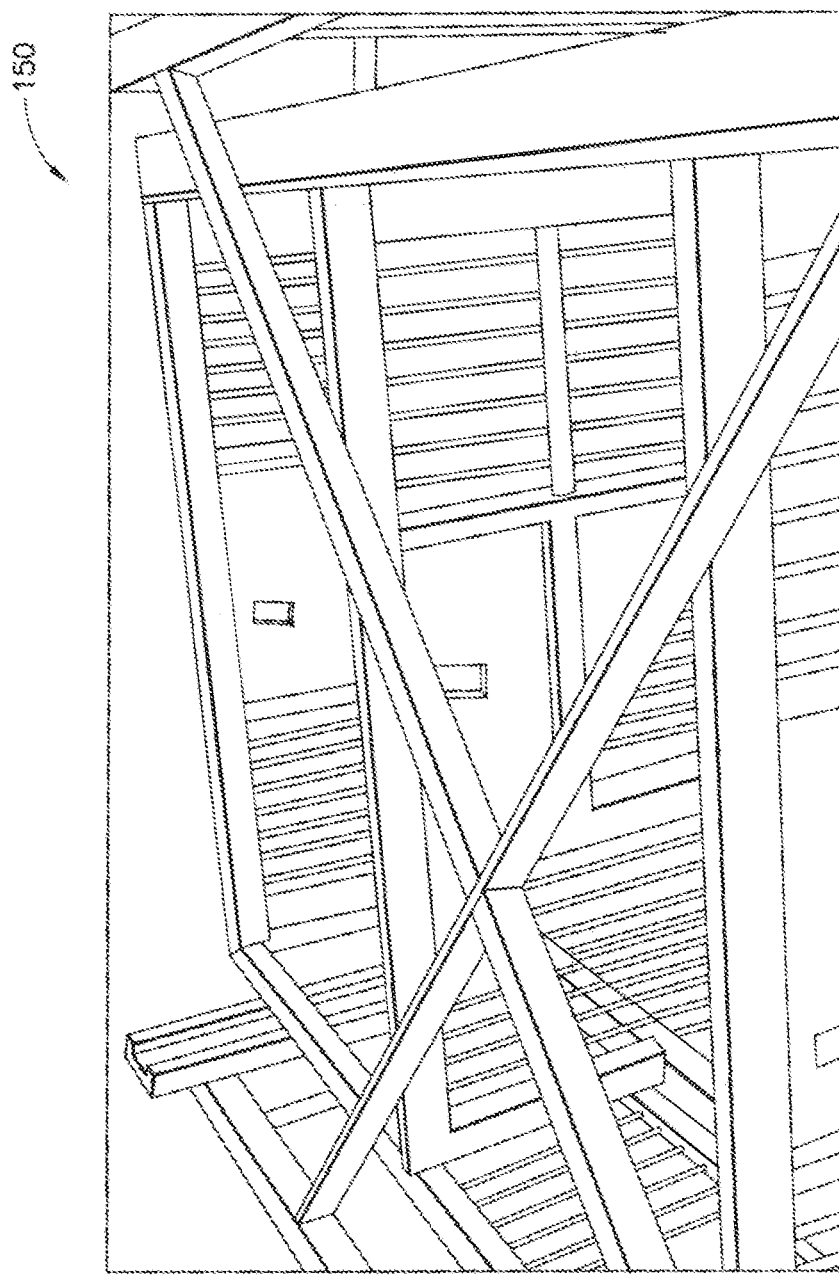
FIGS. 5-5F are schematic illustrations of a conveyor system in accordance with aspects of the disclosed embodiment.
Figure 5A:
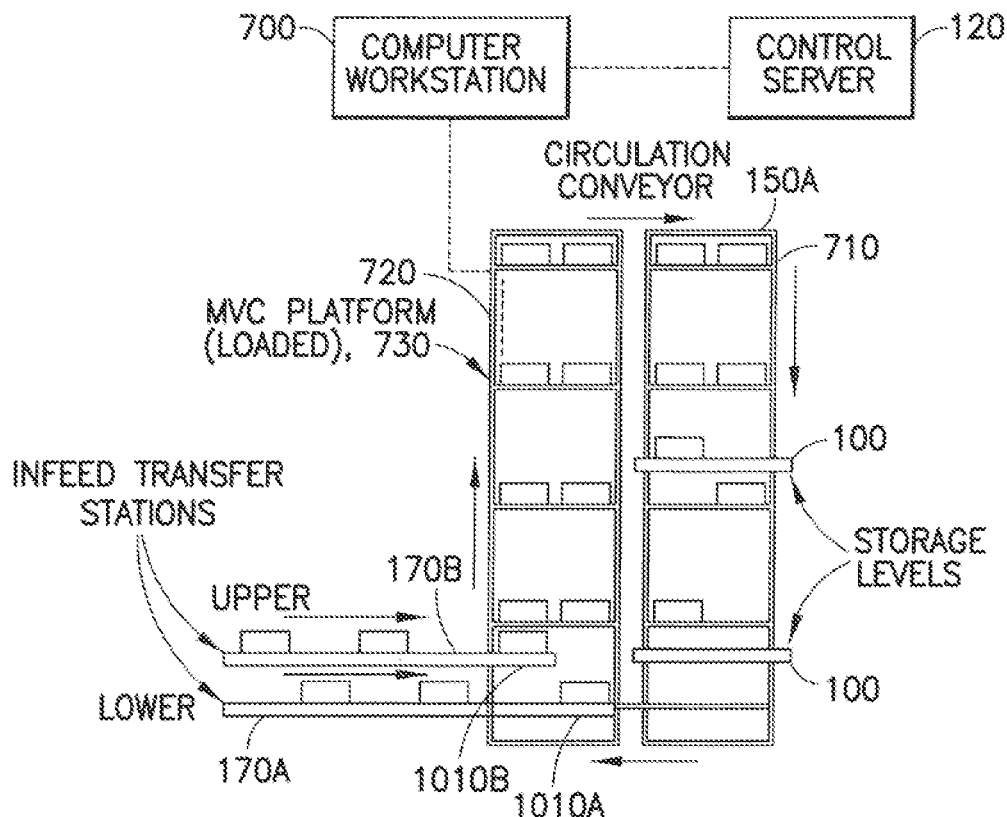
FIG. 5G is a flow chart in accordance with aspects of the disclosed embodiment.

The warehouse system may also include for example a transport system including autonomous vehicles or bots 110 and lifts 150 (see also FIGS. 3 and 5 showing an exemplary transport such as a robot vehicle 110 and a lift 150, such as a continuous vertical conveyor, that may be capable of handling for example both uncontained cases as well as product and order totes) capable of transporting cases and totes to and from storage locations throughout the storage array. As may be realized the transport system is capable of placing and retrieving cases and totes from storage locations to desired locations within the facility for effecting replenishment and order fulfillment as will be described further below. As noted before the arrangement of the warehousing or storage and retrieval system illustrated is merely exemplary and in alternate embodiments the system may have any desired configuration.

Figure 3A:
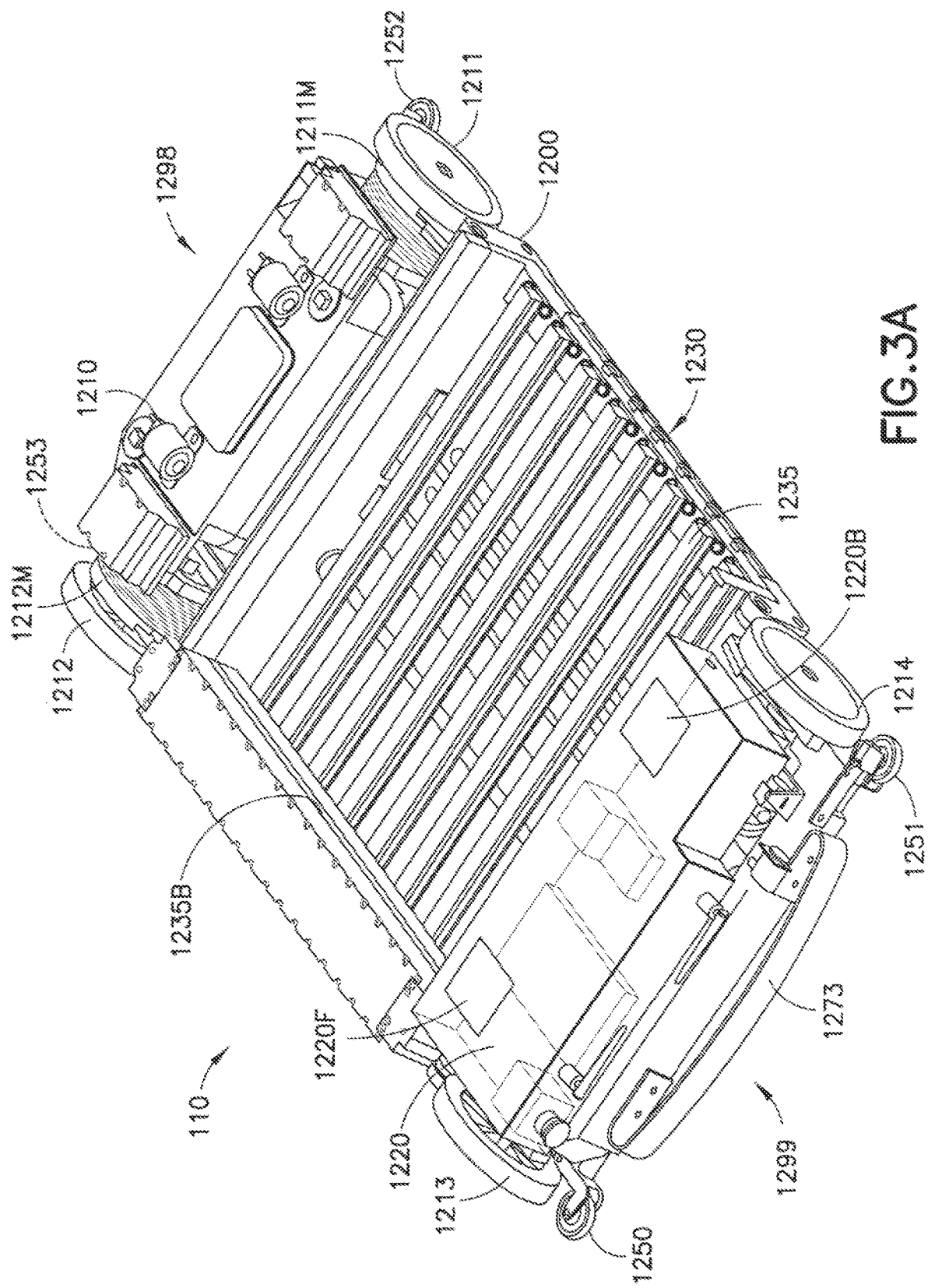
Figure 3B:
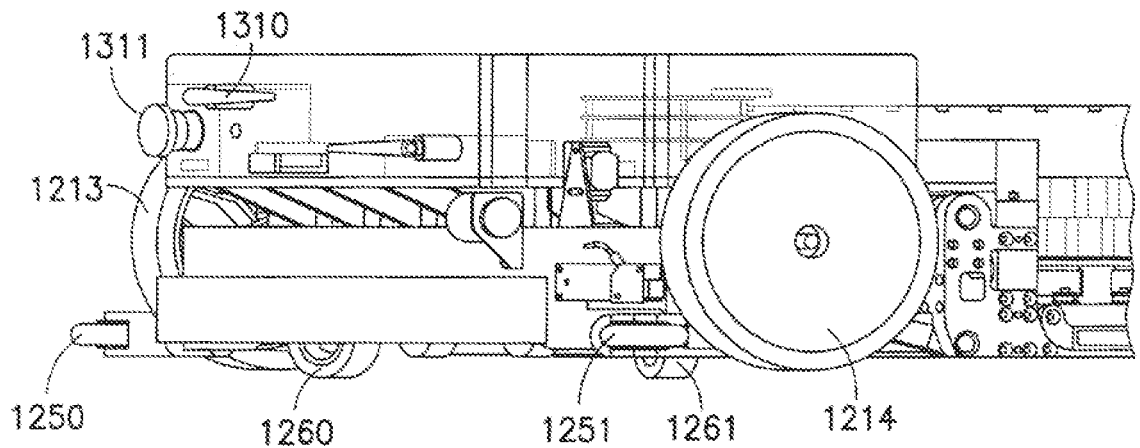
Figure 3C:
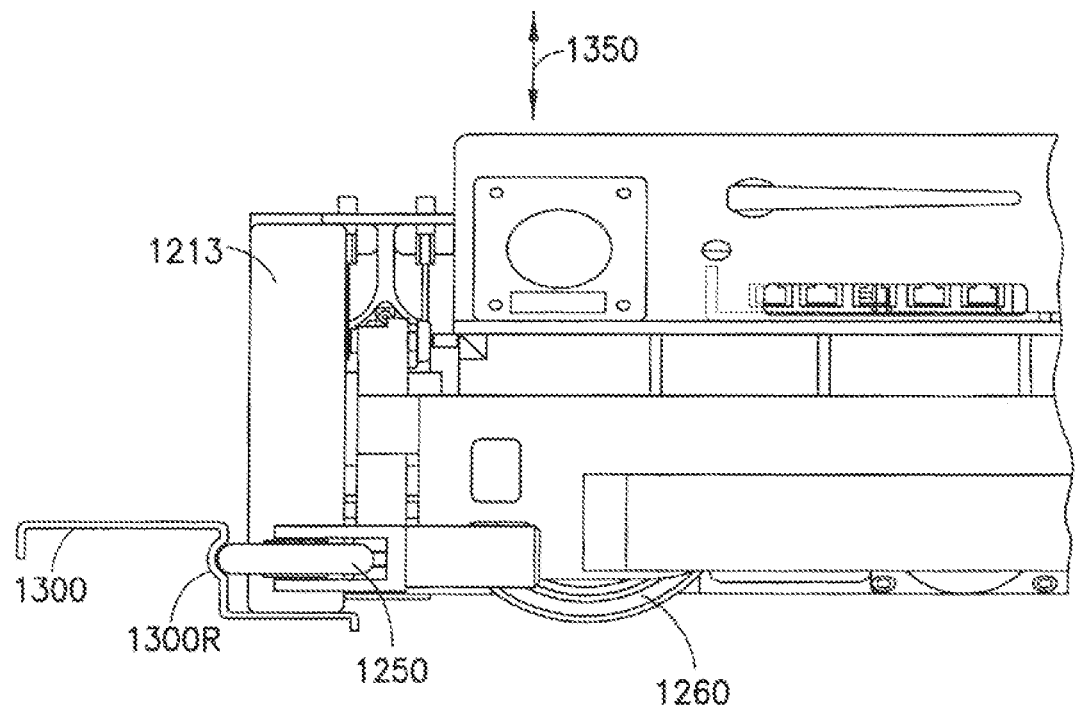
Figure 3D:
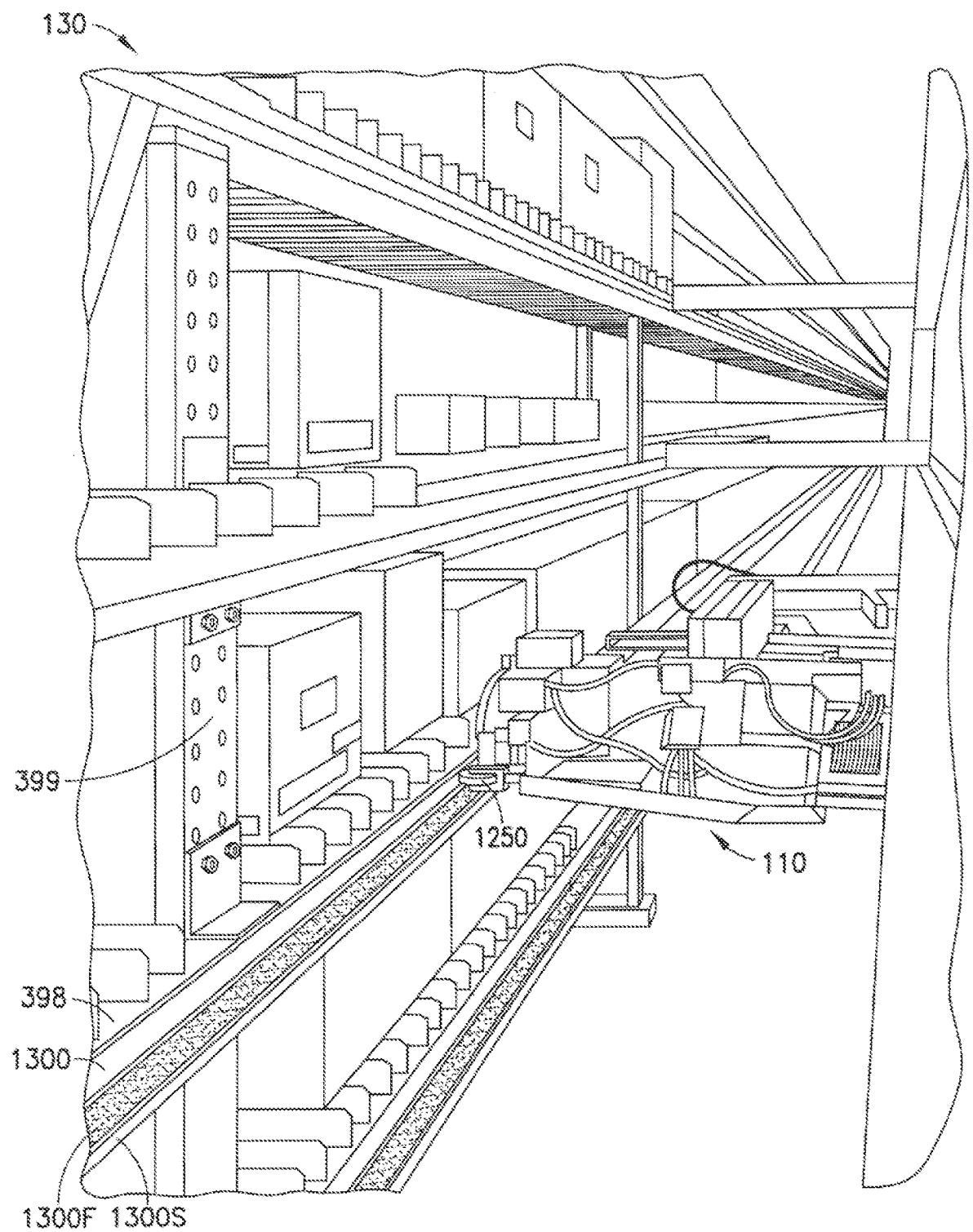
Figure 3E:
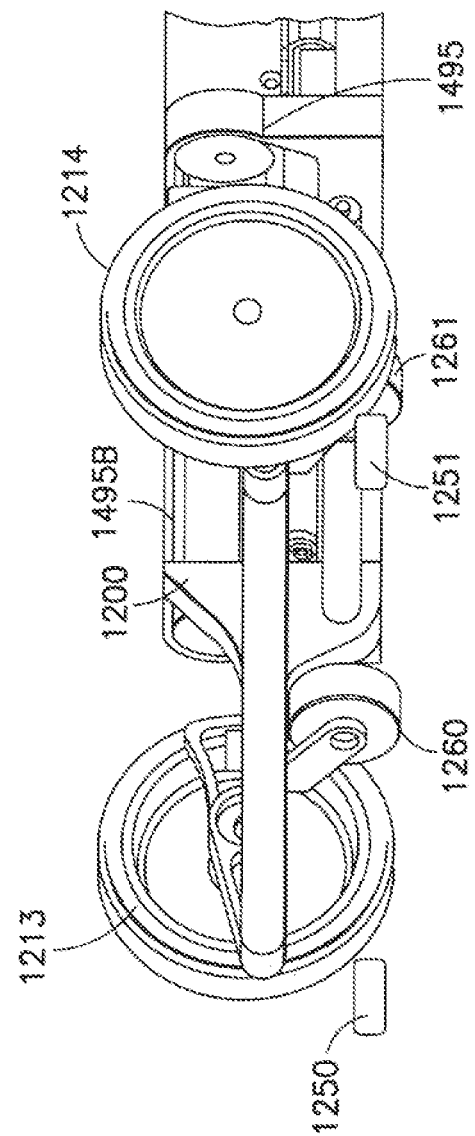
Figure 3F:
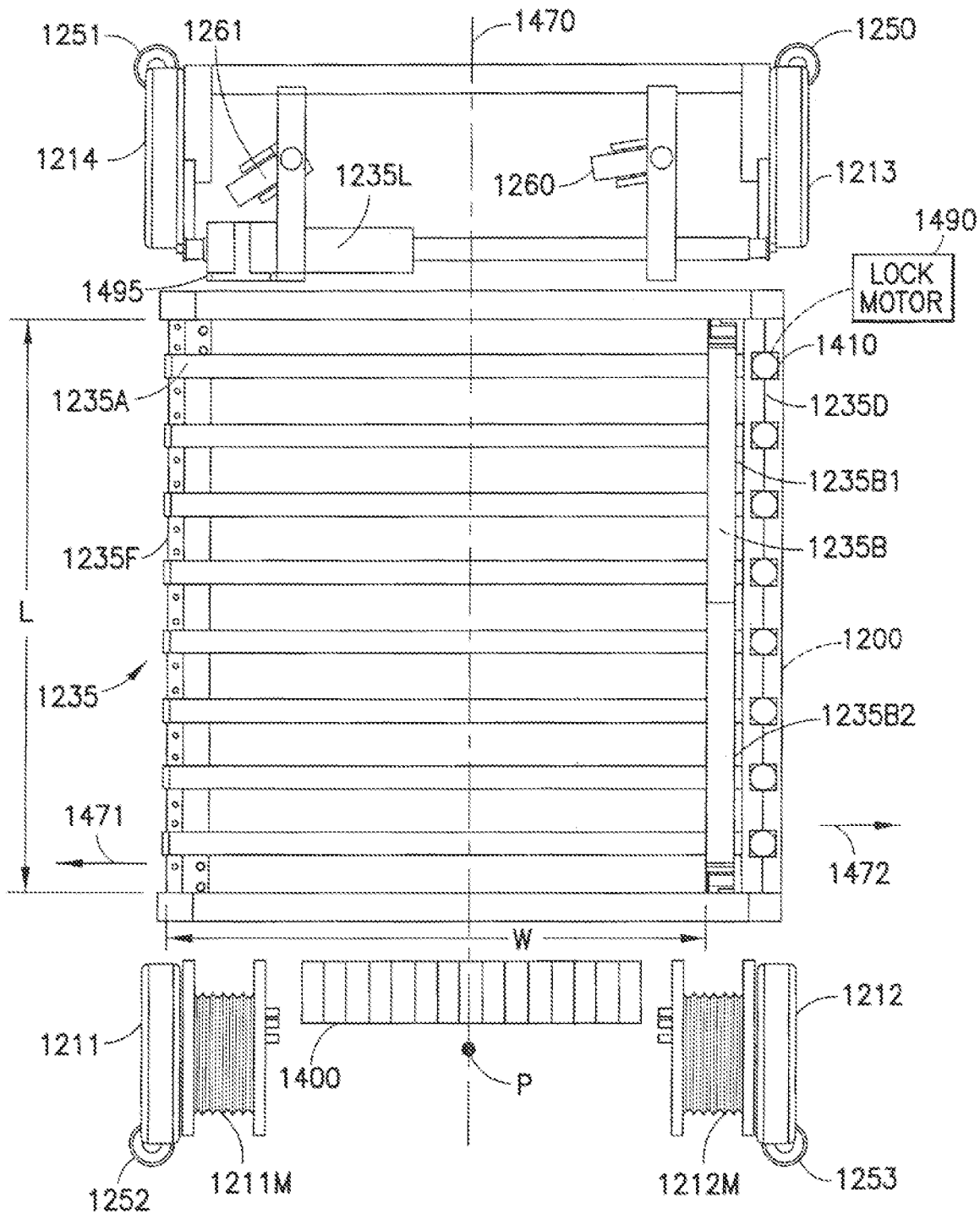
Figure 31:
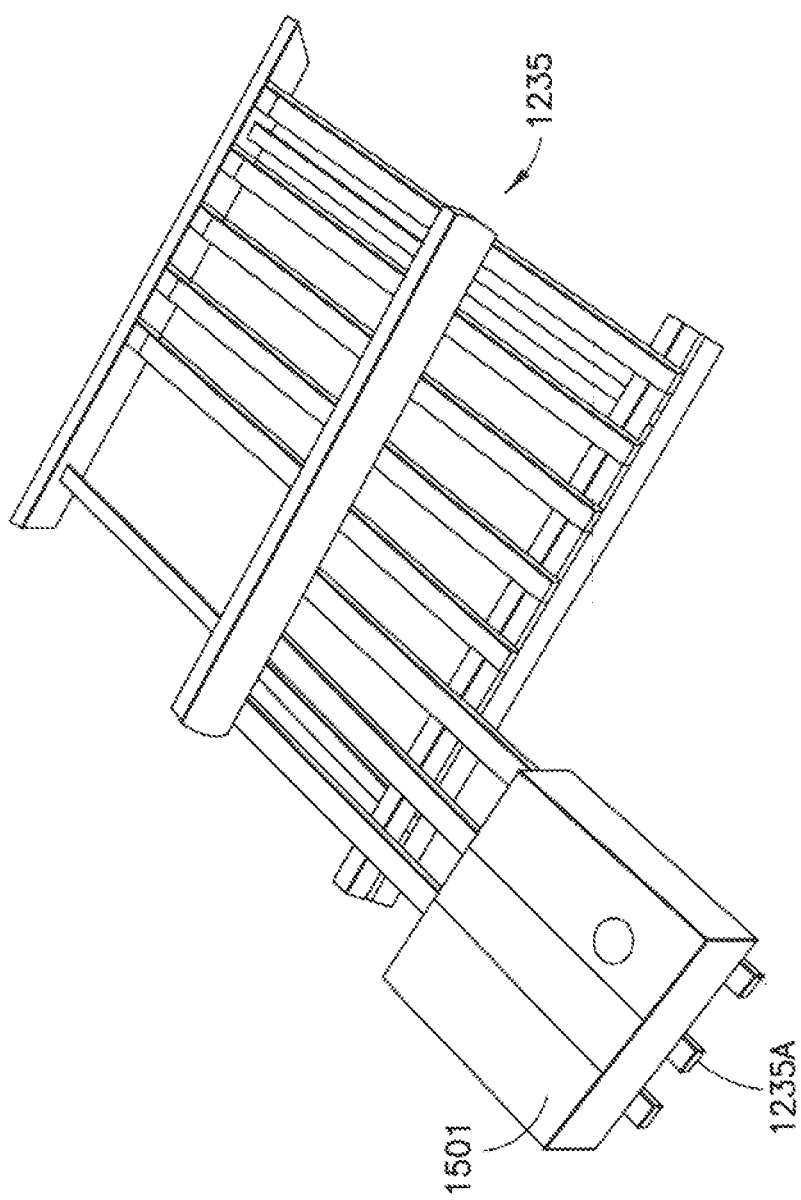
Figure 3L:
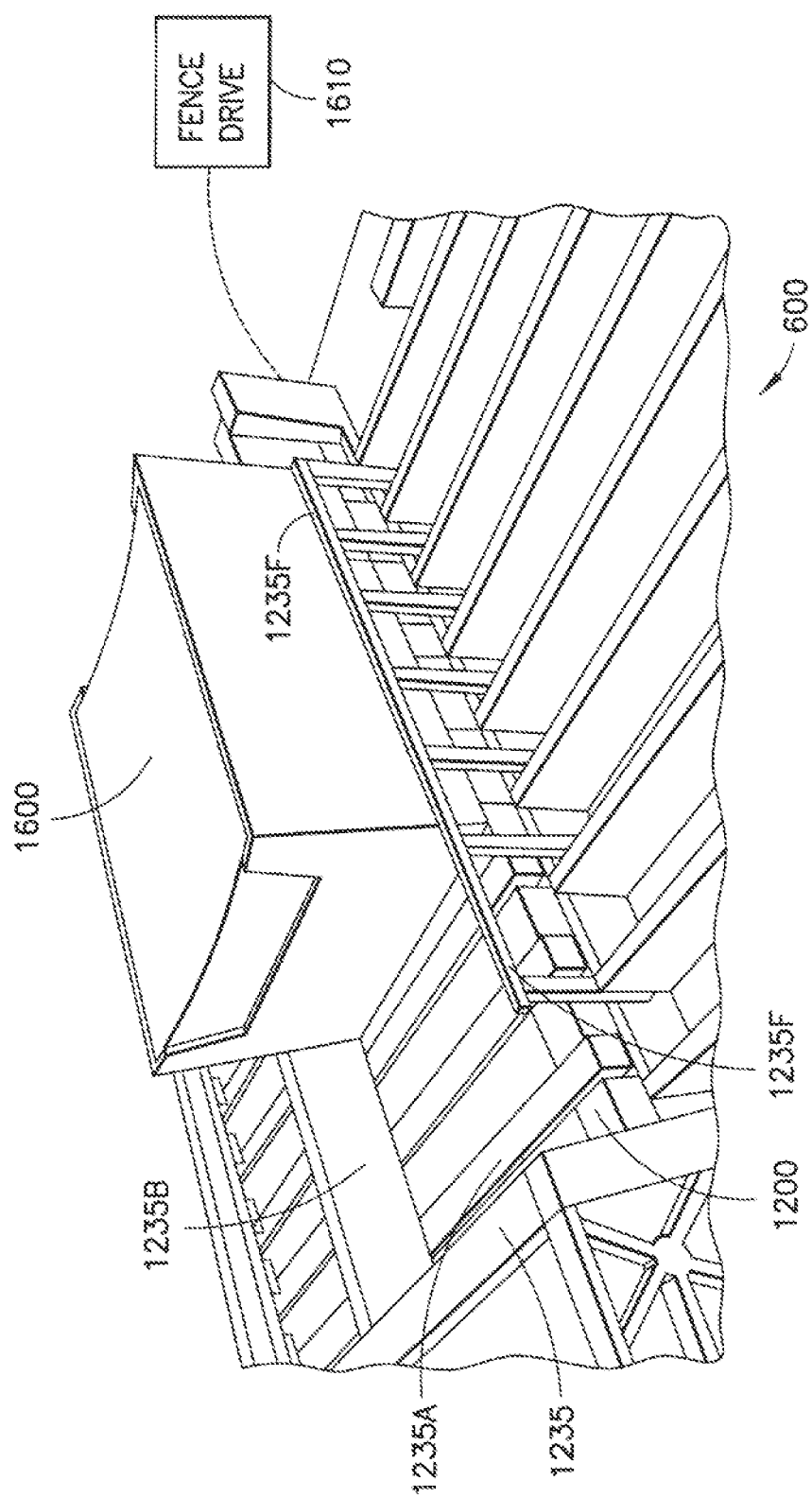
Figure 3M:
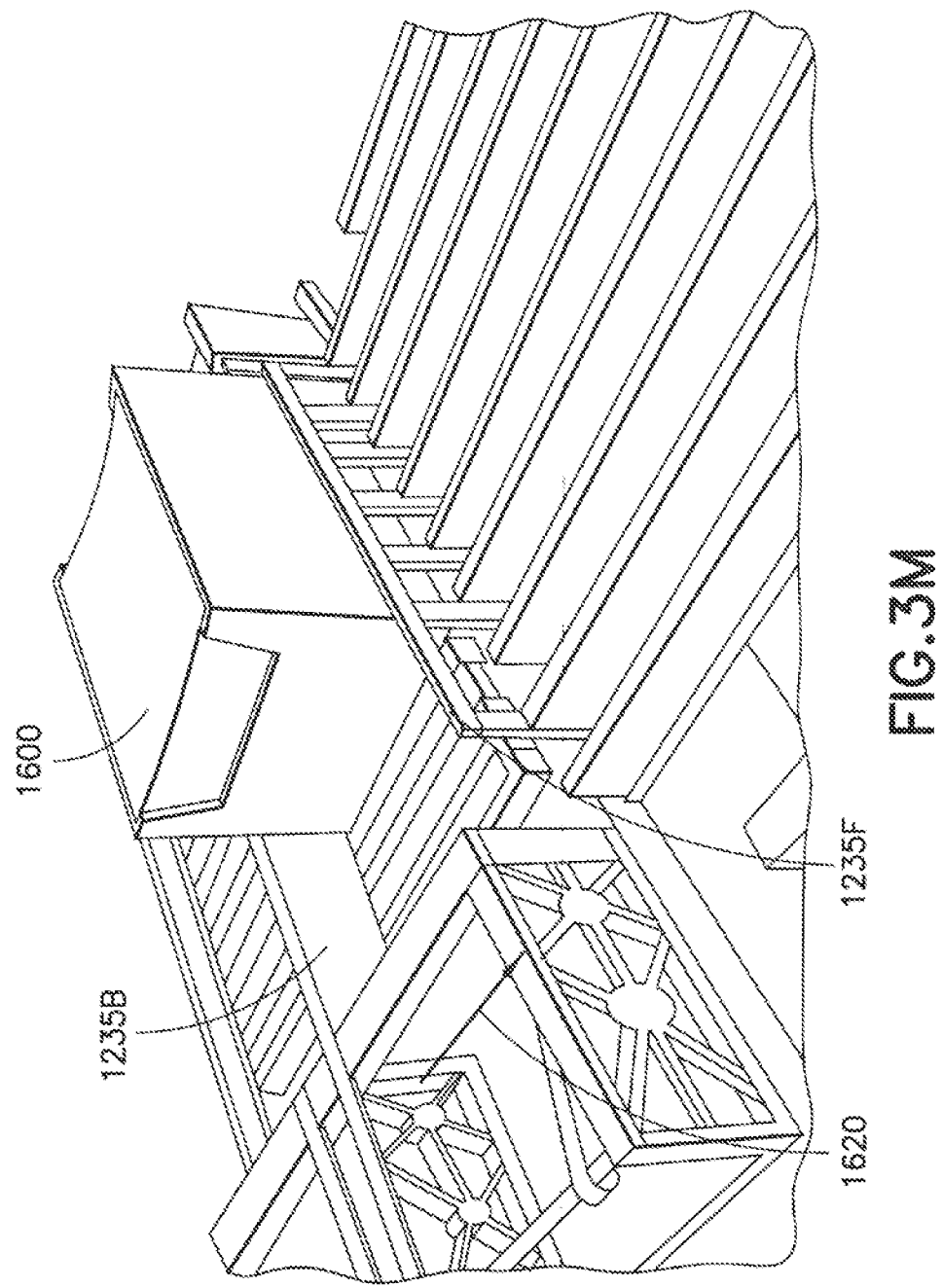
Figure 3N:
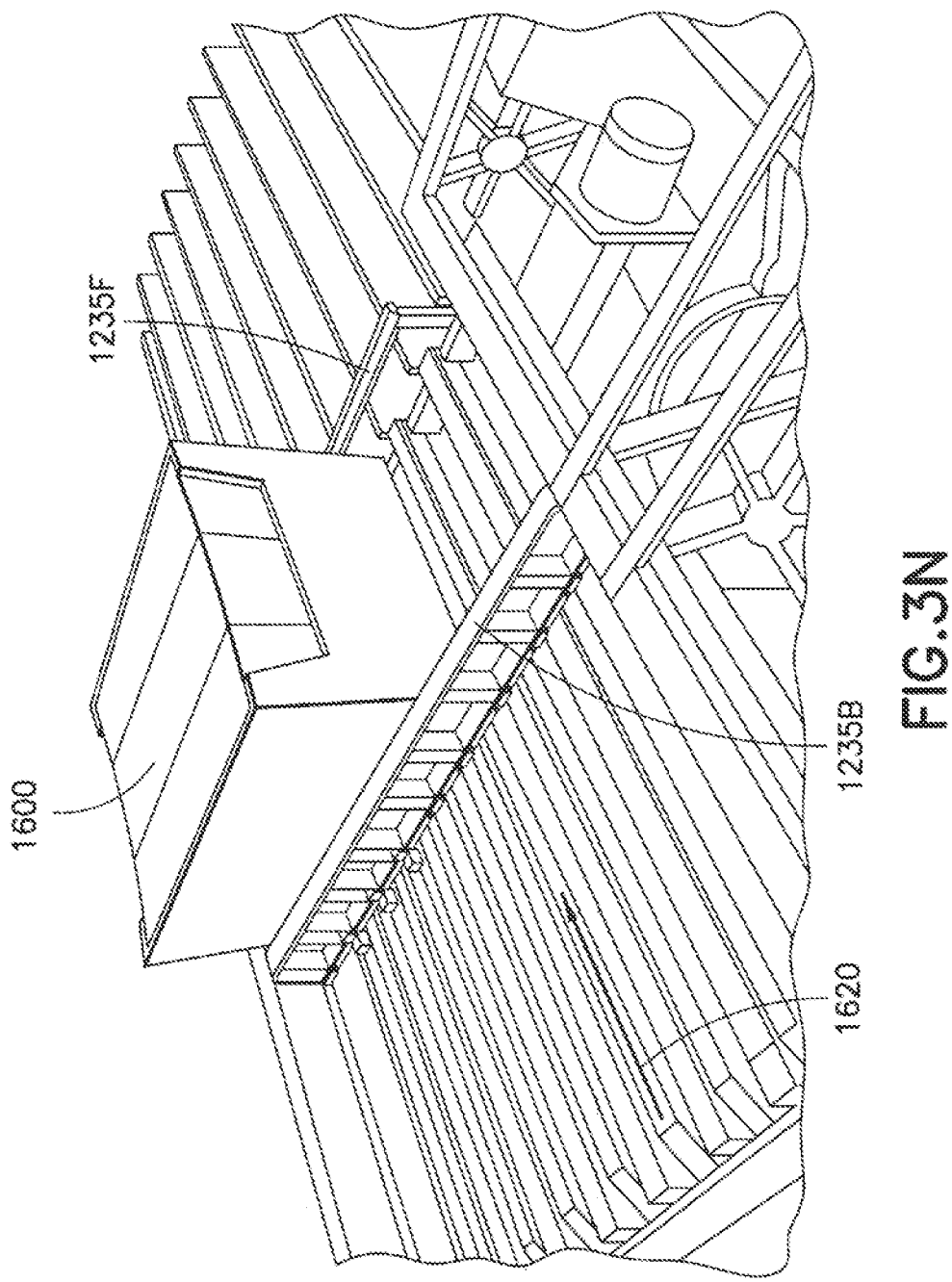

Referring to FIGS. 3A-3N the bots 110 generally include a frame 1200, a drive system 1210, a control system 1220, and a payload area 1230. The drive system 1210 and control system 1220 may be mounted to the frame in any suitable manner. The frame may form the payload area 1230 and be configured for movably mounting a transfer arm or effector 1235 to the bot 110.

In one example, the drive system 1210 may include two drive wheels 1211, 1212 disposed at a drive end 1298 of the bot 110 and two idler wheels 1213, 1214 disposed at a driven end 1299 of the bot 110. The wheels 1211-1214 may be mounted to the frame 1200 in any suitable manner and be constructed of any suitable material, such as for example, low-rolling-resistance polyurethane. It is noted that the bot 110 may have any suitable number of drive and idler wheels. In one aspect of the disclosed embodiment, the wheels 1211-1214 may be substantially fixed relative to the a longitudinal axis 1470 (FIG. 3F) of the bot 110 (e.g. the rotational plane of the wheels is fixed in a substantially parallel orientation relative to the longitudinal axis 1470 of the bot) to allow the bot 110 to move in substantially straight lines such as when, for example, the bot is travelling on a transfer deck 130B (e.g. FIG. 1) or within a picking isle 130A (e.g. FIG. 1). In other aspects of the disclosed embodiments, the rotational plane of one or more of the drive wheels and idler wheels may be pivotal (e.g. steerable) relative to the longitudinal axis 1470 of the bot for providing steering capabilities to the bot 110 by turning the rotational planes of one or more of the idler or drive wheels relative to the longitudinal axis 1470. The wheels 1211-1214 may be substantially rigidly mounted to the frame 1200 such that the axis of rotation of each wheel is substantially stationary relative to the frame 1200. In other aspects of the disclosed embodiment the wheels 1211-1214 may be movably mounted to the frame by, for example, any suitable suspension device, such that the axis of rotation of the wheels 1211-1214 is movable relative to the frame 1200. Movably mounting the wheels 1211-1214 to the frame 1200 may allow the bot 110 to substantially level itself on uneven surfaces while keeping the wheels 1211-1214 in contact with the surface.

Each of the drive wheels 1211, 1212 may be individually driven by a respective motor 1211M, 1212M. The drive motors 1211M, 1212M may be any suitable motors such as, for exemplary purposes only, direct current electric motors. The motors 1211M, 1212M may be powered by any suitable power source such as by, for example, a capacitor 1400 (FIG. 4B) mounted to the frame 1200. As may be realized the power source may be any suitable power source such as, for example, a battery or fuel cell. In still other aspects the motors may be alternating current electric motors or internal combustion motors. The motors may also be a single motor with dual independently operable drive trains/transmissions for independently driving each drive wheel. The drive motors 1211M, 1212M may be configured for bi-directional operation and may be individually operable under, for example, control of the control system 1220 for effecting steering of the bot 110 as will be described below. The motors 1211M, 1212M may be configured for driving the bot 110 at any suitable speed with any suitable acceleration when the bot is in either a forward orientation (e.g. drive end 1298 trailing the direction of travel) or a reverse orientation (e.g. drive end 1298 leading the direction of travel). In one aspect of the disclosed embodiment, the motors 1211M, 1212M are configured for direct driving of their respective drive wheel 1211, 1212 while in other aspects the motors 1211M, 1212M may be indirectly coupled to their respective wheels 1211, 1212 through any suitable transmission such as, for example, a drive shaft, belts and pulleys and/or a gearbox. The drive system 1210 of the bot 110 may include an electrical braking system such as for example, a regenerative braking system (e.g. to charge, for example, a capacitor 1400 (FIG. 3F) powering the bot 110 under braking). In alternate embodiments, the bot 110 may include any suitable mechanical braking system. The drive motors may be configured to provide any suitable acceleration/deceleration rates and any suitable bot travel speeds. For exemplary purposes only the motors 1211M, 1212M may be configured to provide the bot (while the bot is loaded at full capacity) a rate of acceleration/deceleration of about 3.048 m/sec2, a transfer deck 130B cornering speed of about 1.524 m/sec and a transfer deck straightaway speed of about 9.144 m/sec or about 10 m/sec.

As noted above drive wheels 1211, 1212 and idler wheels 1213, 1214 are substantially fixed relative to the frame 1200 for guiding the bot 110 along substantially straight paths while the bot is travelling on, for example, the transfer decks 130B (e.g. FIG. 1). Corrections in the straight line paths may be made through differential rotation of the drive wheels 1211, 1212 as described herein. In other aspects of the disclosed embodiment, guide rollers 1250, 1251 may be mounted to the frame to aid in guiding the bot 110 on the transfer deck 130B such as through contact with a wall of the transfer deck 130B or rails may be provided on the transfer deck in a manner substantially similar to that in the picking aisles 130A (with provisions for allowing the bots 110 to turn on the transfer deck 130B and into the picking aisles 130A) for guiding the bot 110. However, in this example the fixed drive and idler wheels 1211-1214 may not provide agile steering of the bot 110 such as when, for example, the bot 110 is transitioning between the picking aisles 130A, transfer decks 130B or transfer areas 295. In one aspect, the bot 110 may be provided with one or more retractable casters 1260, 1261 for allowing the bot 110 to make, for example, substantially right angle turns when transitioning between the picking aisles 130A, transfer decks 130B and bot transfer stations 140A, 140B. It is noted that while two casters 1260, 1261 are shown and described, in other aspects of the disclosed embodiment the bot 110 may have more or less than two retractable casters. The retractable casters 1260, 1261 may be mounted to the frame 1200 in any suitable manner such that when the casters 1260, 1261 are in a retracted position both the idler wheels 1213, 1214 and drive wheels 1211, 1212 are in contact with a flooring surface such as surface 1300S of the rails 1300 or a transfer deck 130B of the storage structure 130, whereas when the casters 1260, 1261 are lowered the idler wheels 1213, 1214 are lifted off the flooring surface. As the casters 1260, 1261 are extended or lowered the idler wheels 1213, 1214 are lifted off of the flooring surface so that the driven end 1299 of the bot 110 can be pivoted about a point P of the bot through, for example, differential rotation of the drive wheels 1211, 1212. For example, the motors 1211M, 1212M may be individually and differentially operated for causing the bot 110 to pivot about point P which is located, for example, midway between the wheels 1211, 1212 while the driven end 1299 of the bot swings about point P accordingly via the casters 1260, 1261.

In other aspects of the disclosed embodiment, the idler wheels 1213, 1214 may be replaced by non-retractable casters 1260', 1261' (FIG. 3G) where the straight line motion of the bot 110 is controlled by differing rotational speeds of each of the drive wheels 1211, 1212 as described herein. The non-retractable casters 1260', 1261' may be releasably lockable casters such that the casters 1260', 1261' may be selectively locked in predetermined rotational orientations to, for example, assist in guiding the bot 110 along a travel path. For example, during straight line motion of the bot 110 on the transfer deck 130B and/or within the picking aisles 130A the non-retractable casters 1260', 1261' may be locked in an orientation such that the wheels of the casters 1260', 1261' are substantially in-line with a respective one of the drive wheels 1213, 1214 (e.g. the rotational plane of the wheels of the casters is fixed in a substantially parallel orientation relative to the longitudinal axis 1470 of the bot). The rotational plane of the wheels of non-retractable casters 1260', 1261' may be locked and released relative to the longitudinal axis 1470 of the bot 110 in any suitable manner. For example, a controller of the bot 110 (which may be located onboard the bot or remotely from the bot, such as controller 120) may be configured to effect the locking and releasing of the casters 1260', 1261' by for example controlling any suitable actuator and/or locking mechanism.

The bot 110 may also be provided with guide wheels 1250-1253. As can be best seen in FIGS. 3C and 3D, while the bot 110 is travelling in, for example, the picking aisles 130A and/or transfer areas 295 (FIG. 1) the movement of the bot 110 may be guided by a tracked or rail guidance system. It is noted that the transfer areas 295 may allow the bots 110 to access transport shelves 730 (FIGS. 5A-5F) of the multilevel vertical conveyors 150I, 150O (generally referred to as conveyors 150). The rail guidance system may include rails 1300 disposed on either side of the bot 110. The rails 1300 and guide wheels 1250-1253 may allow for high-speed travel of the bot 110 without complex steering and navigation control subsystems. The rails 1300 may be configured with a recessed portion 1300R shaped to receive the guide wheels 1250-1253 of the bot 110. It is noted that the rails may have any suitable configuration such as, for example, without recessed portion 1300R. The rails 1300 may be integrally formed with or otherwise fixed to, for example, one or more of the horizontal and vertical supports 398, 399 of the storage rack structure 130. As can be seen in FIG. 3D the picking aisles may be substantially floor-less such that bot wheel supports 1300S of the guide rails 1300 extend away from the storage areas a predetermined distance to allow a sufficient surface area for the wheels 1211-1214 (or in the case of lockable casters, wheels 1260', 1261') of the bot 110 to ride along the rails 1300. In alternate embodiments the picking aisles may have any suitable floor that extends between adjacent storage areas on either side of the picking aisle. In one aspect of the disclosed embodiment, the rails 1300 may include a friction member 1300F for providing traction to the drive wheels 1211, 1212 of the bot 110. The friction member 1300F may be any suitable member such as for example, a coating, an adhesive backed strip or any other suitable member that substantially creates a friction surface for interacting with the wheels of the bot 110.

While four guide wheels 1250-1253 are shown and described it should be understood that the bot 110 may have any suitable number of guide wheels. The guide wheels 1250-1253 may be mounted to, for example, the frame 1200 of the bot in any suitable manner. In one example, the guide wheels 1250-1253 may be mounted to the frame 1200, through for example, spring and damper devices so as to provide relative movement between the guide wheels 1250-1253 and the frame 1200. The relative movement between the guide wheels 1250-1253 and the frame may be a dampening movement configured to, for example, cushion the bot 110 and its payload against any change in direction or irregularities (e.g. misaligned joints between track segments, etc.) in the track 1300. In other examples, the guide wheels 1250-1253 may be rigidly mounted to the frame 1200. The fitment between the guide wheels 1250-1253 and the recessed portion 1300R of the track 1300 may be configured to provide stability (e.g. anti-tipping) to the bot during, for example, cornering and/or extension of the transfer arm 1235 (e.g. to counteract any tipping moments created by a cantilevered load on the transfer arm). It is noted that the bot may be stabilized in any suitable manner during cornering and/or extension of the transfer arm 1235. For example, the bot 110 may include a suitable counterweight system for counteracting any moment that is created on the bot through the extension of the transfer arm 1235.

The transfer arm 1235 may be movably mounted to the frame 1200 within, for example, the payload area 1230. It is noted that the payload area 1230 and transfer arm 1235 may be suitably sized for transporting cases in the storage and retrieval system 100. For example, the width W of the payload area 1230 and transfer arm 1235 may be substantially the same as or larger than a depth D (FIG. 6B) of the storage shelves 600. In another example, the length L of the payload area 1230 and transfer arm 1235 may be substantially the same as or larger than the largest item length transferred through the system 100 with the item length being oriented along the longitudinal axis 1470 (FIG. 3F) of the bot 110.

Referring also to FIGS. 3E and 3F, the transfer arm 1235 may include an array of fingers 1235A, one or more pusher bars 1235B and a fence 1235F. As may be realized, the transfer arm may have any suitable configuration and/or components. The transfer arm 1235 may be configured to extend and retract from the payload area 1230 for transferring loads to and from the bot 110. In one aspect of the disclosed embodiment, the transfer arm 1235 may be configured to operate or extend in a unilateral manner relative to the longitudinal axis 1470 of the bot (e.g. extend from one side of the bot in direction 1471) for increasing, for example, reliability of the bot while decreasing the bots complexity and cost. It is noted that where the transfer arm 1235 is operable only to one side of the bot 110, the bot may be configured to orient itself for entering the picking aisles 130A and/or transfer areas 295 with either the drive end 1298 or the driven end 1299 facing the direction of travel so that the operable side of the bot is facing the desired location for depositing or picking a load. In other aspects of the disclosed embodiment the bot 110 may be configured such that the transfer arm 1235 is operable or extendable in a bilateral manner relative to the longitudinal axis 1470 of the bot (e.g. extendable from both sides of the bot in directions 1471 and 1472).

In one example, the fingers 1235A of the transfer arm 1235 may be configured such that the fingers 1235A are extendable and retractable individually or in one or more groups. For example, each finger may include a locking mechanism 1410 that selectively engages each finger 1235A to, for example, the frame 1200 of the bot 110 or a movable member of the transfer arm 1235 such as the pusher bar 1235B. The pusher bar 1235B (and any fingers coupled to the pusher bar), for example, may be driven by any suitable drive such as extension motor 1495. The extension motor 1495 may be connected to, for example, the pusher bar, through any suitable transmission such as, for exemplary purposes only, a belt and pulley system 1495B (FIG. 3E).

In one example, the locking mechanism for coupling the fingers 1235A to, for example, the pusher bar 1235B may be, for example, a cam shaft driven by motor 1490 that is configured to cause engagement/disengagement of each finger with either the pusher bar or frame. In other examples, the locking mechanism may include individual devices, such as solenoid latches associated with corresponding ones of the fingers 1235A. It is noted that the pusher bar may include a drive for moving the pusher bar in the direction of arrows 1471, 1472 for effecting, for example, a change in orientation (e.g. alignment) of a load being carried by the bot 110, gripping a load being carried by the bot 110 or for any other suitable purpose. In one aspect of the disclosed embodiment, when one or more locking mechanisms 1410 are engaged with, for example, the pusher bar 1235B the respective fingers 1235A extend and retract in the direction of arrows 1471, 1472 substantially in unison with movement of the pusher bar 1235B while the fingers 1235A whose locking mechanisms 1410 are engaged with, for example, the frame 1200 remain substantially stationary relative to the frame 1200.

In another aspect of the disclosed embodiment, the transfer arm 1235 may include a drive bar 1235D or other suitable drive member. The drive bar 1235D may be configured so that it does not directly contact a load carried on the bot 110. The drive bar 1235D may be driven by a suitable drive so that the drive bar 1235D travels in the direction of arrows 1471, 1472 in a manner substantially similar to that described above with respect to the pusher bar 1235B. In this exemplary embodiment, the locking mechanisms 1410 may be configured to latch on to the drive bar 1235D so that the respective fingers 1235A may be extended and retracted independent of the pusher bar and vice versa. In other aspects, the pusher bar 1235B may include a locking mechanism substantially similar to locking mechanism 1410 for selectively locking the pusher bar to either the drive bar 1235D or the frame 1200 where the drive bar is configured to cause movement of the pusher bar 1235B when the pusher bar 1235B is engaged with the drive bar 1235D.

In one aspect of the disclosed embodiment, the pusher bar 1235B may be a one-piece bar that spans across all of the fingers 1235A. In other aspects of the disclosed embodiment, the pusher bar 1235B may be a segmented bar having any suitable number of segments 1235B1, 1235B2. Each segment 1235B1, 1235B2 may correspond to the groups of one or more fingers 1235A such that only the portion of the pusher bar 1235B corresponding to the finger(s) 1235A that are to be extended/retracted is moved in the direction of arrows 1471, 1472 while the remaining segments of the pusher bar 1235B remain stationary so as to avoid movement of a load located on the stationary fingers 1235A.

The fingers 1235A of the transfer arm 1235 may be spaced apart from each other by a predetermined distance so that the fingers 1235A are configured to pass through or between corresponding support legs 620L1, 620L2 of the storage shelves 600 (FIG. 3H) and corresponding support fingers 910 of the shelves 730 on the multilevel vertical conveyors 150A, 150B. In other aspects of the disclosed embodiment the fingers 1235A may be configured to pass through corresponding support fingers of bot transfer stations for passing the bot load to multilevel vertical conveyor through the bot transfer station. The spacing between the fingers 1235A and a length of the fingers of the transfer arm 1235 allows an entire length and width of the loads being transferred to and from the bot 110 to be supported by the transfer arm 1235.

The transfer arm 1235 may include any suitable lifting device(s) 1235L configured to move the transfer arm 1235 in a direction substantially perpendicular to a plane of extension/retraction of the transfer arm 1235.

Referring also to FIGS. 3H-3J, in one example, a load (substantially similar to loads 750-753) is acquired from, for example, a storage shelf 600 by extending the fingers 1235A of the transfer arm 1235 into the spaces 620S between support legs 620L1, 620L2 of the storage shelf 600 and under one or more target items 150O located on the shelf 600. The transfer arm lift device 1235L is suitably configured to lift the transfer arm 1235 for lifting the one or more target items 1500 off of the shelf 600. The fingers 1235A are retracted so that the one or more target items are disposed over the payload area 1230 of the bot 110. The lift device 1235L lowers the transfer arm 1235 so the one or more target items are lowered into the payload area 1230 of the bot 110. In other examples, the storage shelves 600 may be configured with a lift motor for raising and lowering the target items where the transfer arm 1235 of the bot 110 does not include a lift device 1235L. FIG. 3I illustrates an extension of three of the fingers 1235A for transferring a load 1501. FIG. 3J shows a shelf 1550 having two items or loads 1502, 1503 located side by side. In FIG. 3J, three fingers 1235A of the transfer arm 1235 are extended for acquiring only load 1502 from the shelf 1550. As can be seen in FIG. 3J, it is noted that the loads carried by the bots 110 may include one or more product totes PT and/or order totes CT (e.g. load 1502 includes two separate boxes and load 1503 includes three separate boxes). It is also noted that in one exemplary embodiment the extension of the transfer arm 1235 may be controlled for retrieving a predetermined number of items from an array of items. For example, the fingers 1235A in FIG. 3J may be extended so that only item 1502A is retrieved while item 1502B remains on the shelf 1550. In another example, the fingers 1235A may be extended only part way into a shelf 600 (e.g. an amount less than the depth D of the shelf 600) so that a first item located at, for example, the front of the shelf (e.g. adjacent the picking aisle) is picked while a second item located at the back of the shelf, behind the first item, remains on the shelf.

As noted above the bot 110 may include a retractable fence 1235F. Referring to FIGS. 3K-3N, the fence 1235F may be movably mounted to the frame 1200 of the bot 110 in any suitable manner so that the loads, such as load 1600, pass over the retracted fence 1235F as the loads are transferred to and from the bot payload area 1230 as can be seen in FIG. 3K. Once the load 1600 is located in the payload area 1230, the fence 1235F may be raised or extended by any suitable drive motor 1610 so that the fence 1235F extends above the fingers 1235A of the bot 110 for substantially preventing the load 1600 from moving out of the payload area 1230 as can be seen in FIG. 3L. The bot 110 may be configured to grip the load 1600 to, for example, secure the load during transport. For example, the pusher bar 1235B may move in the direction of arrow 1620 towards the fence 1235F such that the load 1600 is sandwiched or gripped between the pusher bar 1235B and the fence 1235F as can be seen in FIGS. 3M and 3N. As may be realized, the bot 110 may include suitable sensors for detecting a pressure exerted on the load 1600 by the pusher bar 1235B and/or fence 1235F so as to prevent damaging the load 1600. In alternate embodiments, the load 1600 may be gripped by the bot 110 in any suitable manner.

Referring again to FIGS. 3F and 3G, the bot 110 may include a roller bed 1235RB disposed in the payload area 1230. The roller bed 1235RB may include one or more rollers 1235R disposed transversely to the longitudinal axis 1470 of the bot 110. The rollers 1235R may be disposed within the payload area 1230 such that the rollers 1235R and the fingers 1235A are alternately located so that the fingers 1235A may pass between the rollers 1235R for transferring items to and from the payload area 1230 as described above. One or more pushers 1235P may be disposed in the payload area 1230 such that a contact member of the one or more pushers 1235P extends and retracts in a direction substantially perpendicular to the axis of rotation of the rollers 1235R. The one or more pushers 1235P may be configured to push the load 1600 back and forth within the payload area 1230 in the direction of arrow 1266 (e.g. substantially parallel to the longitudinal axis 1470 of the bot 110) along the rollers 1235R for adjusting a position of the load 1600 longitudinally within the payload area 1230. In other aspects of the disclosed embodiment, the rollers 1235R may be driven rollers such that a controller of, for example, the bot drives the rollers for moving the load 1600 such that the load is positioned at a predetermined location within the payload area 1230. In still other aspects of the disclosed embodiment the load may be moved to the predetermined location within the payload area in any suitable manner. The longitudinal adjustment of the load 1600 within the payload area 1230 may allow for positioning of the loads 1600 for transferring the loads from the payload area to, for example, a storage location or other suitable location such as the multilevel vertical conveyors 150I, 150O.

It is noted that the bots 110 may be configured to communicate with other bots 110 in the storage and retrieval system 12 to form a peer-to-peer collision avoidance system so that bots can travel throughout the storage and retrieval system 12 at predetermined distances from each other in a manner substantially similar to that described in U.S. patent application Ser. No. 12/757,337, entitled "CONTROL SYSTEM FOR STORAGE AND RETRIEVAL SYSTEMS," previously incorporated by reference herein in its entirety. It is also noted that the description of the bot 110 herein is exemplary only and that the bot or transport vehicle can have nay suitable configuration for transporting loads between storage locations and the conveyors 150I, 150O.

Referring to FIGS. 5A-5F the conveyors 150I, 150O (generally referred to as conveyors 150) will be described in greater detail. It is noted that the input multilevel vertical conveyor 150I and associated transfer stations 170I may be substantially similar to the out-feed multilevel vertical conveyors 150O and associated out-feed transfer stations 170O but for the direction of material flow to/from the storage and retrieval system 12. As may be realized, the storage and retrieval system 12 may include multiple in-feed and out-feed multilevel vertical conveyors 150I, 150O that are accessible by, for example, bots 110 on each level of the storage and retrieval system 12 (through e.g. transfer stations 295) so that one or more product totes PT or order totes CT can be transferred from a multilevel vertical conveyor 150I, 150O to each storage space on a respective level and from each storage space to any one of the multilevel vertical conveyors 150I, 150O on a respective level. The bots 110 may be configured to transfer the product totes PT and order totes CT between the storage spaces and the multilevel vertical conveyors with one pick (e.g. substantially directly between the storage spaces and the multilevel vertical conveyors). By way of further example, the designated bot 110 picks the product totes PT and order totes CT from a shelf of a multilevel vertical conveyor, transports the product totes PT and order totes CT to a predetermined storage area of the storage structure 130 and places the product totes PT and order totes CT in the predetermined storage area (and vice versa). It is noted that the product totes PT and order totes CT may be stored in the storage and retrieval system 12 in substantially random locations so that there are multiple paths for accessing each of the product totes PT and order totes CT.

Generally, the multilevel vertical conveyors include payload shelves 730 (FIGS. 5A-5F) attached to chains or belts that form continuously moving or circulating vertical loops (the shape of the loop shown in the Figs. is merely exemplary and it should be understood that the loop may have any suitable shape including rectangular and serpentine) that move at a substantially constant rate, so that the shelves 730 use what may be referred to as the "paternoster" principle of continuous conveyance, with loading and unloading performed at any point in the loop without slowing or stopping. The multilevel vertical conveyors 150I, 150O may be controlled by a server, such as for example, control server 120, or any other suitable controller. One or more suitable computer workstations 700 may be connected to the multilevel vertical conveyors 150I, 150O and the server 120 in any suitable manner (e.g. wired or wireless connection) for providing, as an example, inventory management, multilevel vertical conveyor functionality and control, and customer order fulfillment. As may be realized, the computer workstations 700 and/or server 120 may be programmed to control the in-feed and/or out-feed conveyor systems. In one aspect of the disclosed embodiment, one or more of the workstations 700 and control server 120 may include a control cabinet, a programmable logic controller and variable frequency drives for driving the multilevel vertical conveyors 150I, 150O. In other aspects of the disclosed embodiment the workstations 700 and/or control server 120 may have any suitable components and configuration.

The multilevel vertical conveyors 150 may include a frame 710 configured to support driven members such as, for example, chains 720. The chains 720 may be coupled to the shelves 730, which are movably mounted to the frame 710 such that the chains 720 effect substantially continuous movement of the shelves 730 around the frame 710. In alternate embodiments, any suitable drive link, such as for example, belts or cables may be used to drive the shelves 730. The shelves may include a platform 900 which may include, for example, any suitably shaped frame 911, which in this example is generally "U" shaped (e.g. having lateral members connected by a span member at one end), and any suitable number of spaced apart fingers 910 extending from the frame 911. The fingers 910 may be configured for supporting the product totes PT and order totes CT. In one example, each of the fingers 910 may be removably fastened to a frame 911 for facilitating replacement or repair of individual fingers 910. The fingers 910 and frame 911 may form an integral structure or platform that defines the seating surface that contacts and supports the product totes PT and order totes CT. It is noted that the shelf 730 illustrates only a representative structure and in other aspects of the disclosed embodiment, the shelves 730 may have any suitable configuration and size for transporting product totes PT and order totes CT. The spaced apart fingers 910 are configured to interface with, for example, a transfer arm or effector of the bots 110 and the in-feed transfer stations 170 for transferring the product totes PT and order totes CT between the multilevel vertical conveyors 150 and one or more of the transfer stations 170 and bots 110.

The multilevel vertical conveyors 150 may also include a suitable stabilizing device(s), such as for example, driven stabilizing chains for stabilizing the shelves 730 during vertical travel. In one example, the stabilizing devices may include chain driven dogs that are engaged to the shelves in both the upward and downward directions to form, for example, a three point engagement with the shelf 730. The drive chains 720 for the shelves 730 and stabilizing devices may be drivingly coupled to for example, any suitable number of drive motors under the control of, for example, one or more of the computer workstations 700 and control server 120.

Figure 5B:
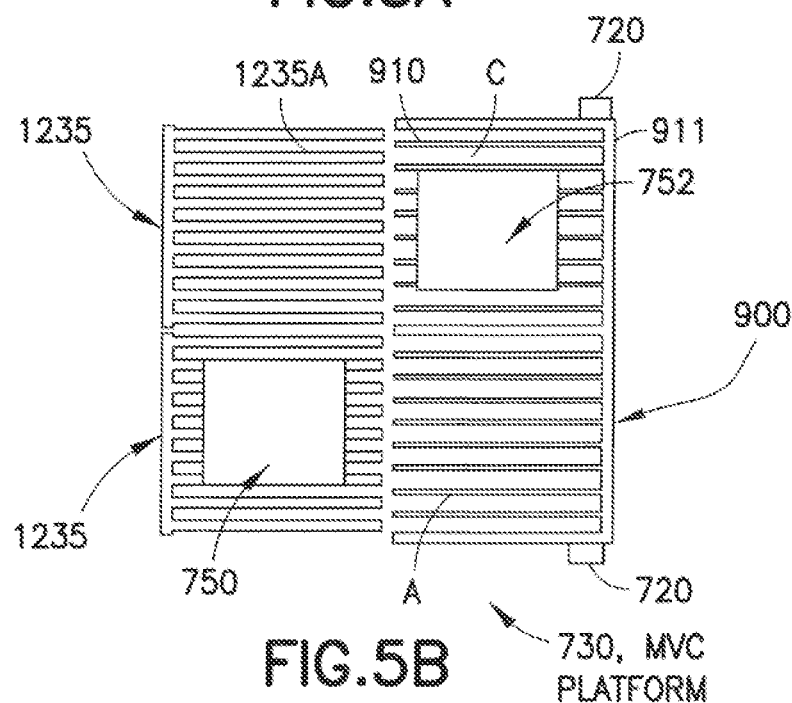
Figure 5E:
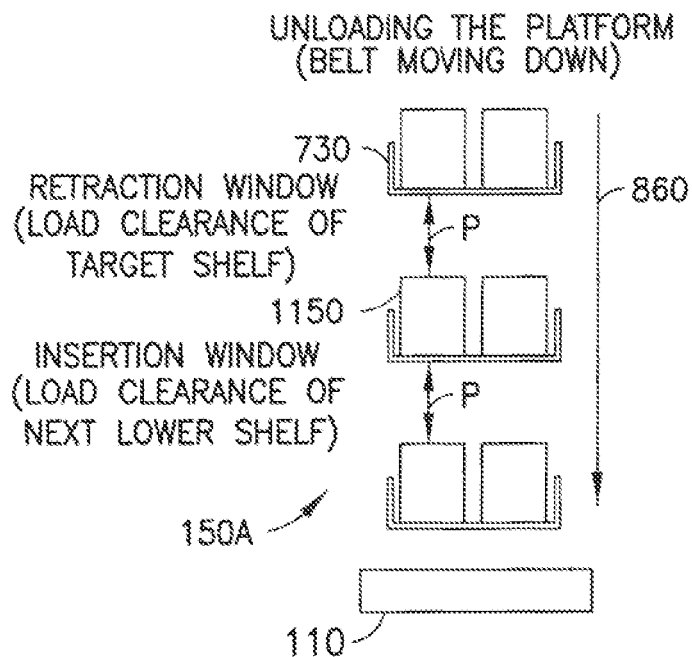

In one exemplary embodiment there may be any suitable number of shelves 730 mounted and attached to the drive chains 720. As can be seen in FIG. 5B each shelf 730 may be configured to carry, for exemplary purposes only, at any suitable number of product totes PT and order totes CT in respective positions, such as positions A, C on the shelf 730 (e.g. a single vertical conveyor is functionally equivalent to multiple individually operated conveyors arranged adjacent one another).

As may be realized, each multilevel vertical conveyor 150 may communicate non-deterministically with the each storage location of the storage shelves 600 (e.g. each conveyor is common to all storage shelves). For example, as described above, the bots 110 on each level of the storage and retrieval system 12 are able to travel along the transfer deck 130B and picking aisles 130A of the respective level so that each bot 110 can access any one of the multilevel vertical conveyors 150 and any one of the storage spaces of the storage shelves 600 on the respective level (e.g. each bot is common to all storage locations and conveyors 150). As described above, the bots are able to take multiple paths to any given storage location so that if one path is substantially blocked there is another path available to reach the storage location or anther path available to another storage location holding a desired product tote PT or order tote CT that is substantially the same as the product tote PT or order tote CT located in the blocked aisle. Because of the multiple paths and random storage locations (e.g. at least product totes having the same items are stored at random or spaced apart locations in the storage system 12) the bots 110 allows each multilevel vertical conveyor 150 to be non-deterministically in communication with each storage location within the storage and retrieval system 12.

Figure 5F:
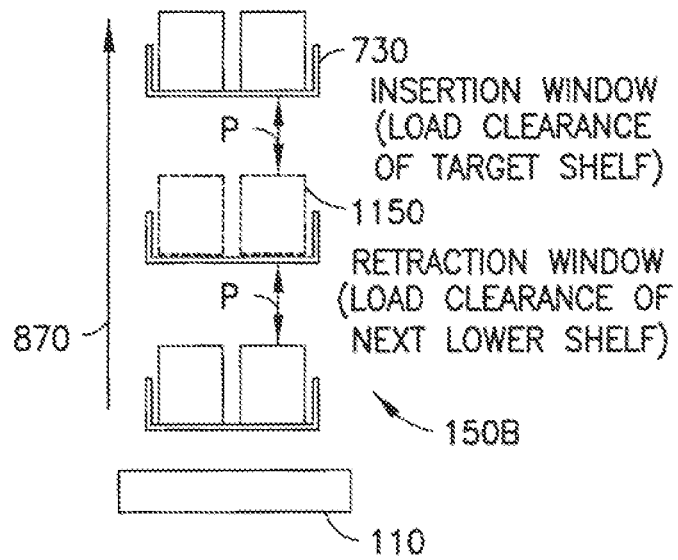
Figure 5G:
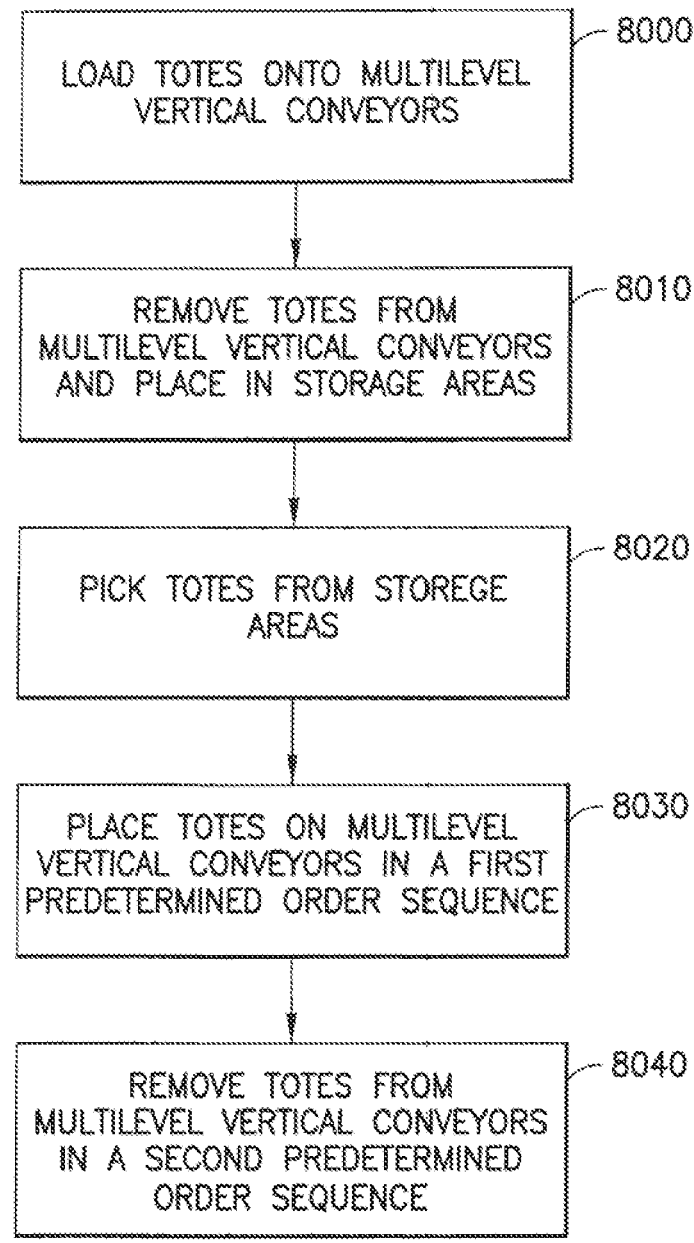

In operation, referring also to FIGS. 5C-5F, product totes PT and/or order totes CT (e.g. from workstations 24) that are being transferred into the storage area 130 of the storage and retrieval system 12 are loaded on and will circulate around the multilevel vertical conveyors 150I and be removed from a respective conveyor by, for example, one or more bots 110 for placement in a storage area of the storage structure (FIG. 5G, Blocks 8000 and 8010). As will be described further below, in the exemplary embodiments the input loading sequencing of case units onto the multilevel vertical conveyors 150I, 150O (e.g. such as at corresponding feeder input sides of transfer stations 170I and bot transfer locations on respective storage levels) may be substantially independent from the output or unloading sequence of the multilevel vertical conveyors 150I, 150O (e.g. such as at corresponding output sides of transfer stations 170O and bot transfer locations on respective storage levels) and vice versa. In one example, the product totes PT and/or order totes CT may be loaded onto the shelves 730 during an upward travel of the multilevel vertical conveyor 150 and off loaded from the shelves 730 during downward travel of the multilevel vertical conveyor 150. By way of example, multilevel vertical conveyor shelves 730*i* and 730*ii* (FIG. 5D) may be loaded sequentially, but when unloaded, shelf 730*ii* may be unloaded before shelf 730*i*. As may be realized, the multilevel vertical conveyors form what may be referred to as sorters enabling the sortation of containers entering the multilevel vertical conveyor (such as delivered by bots 110 from storage shelf locations), to be different from the sortation of containers leaving the multilevel vertical conveyor, and vice versa. It is noted that the shelves 730 may be loaded through one or more cycles of the multilevel vertical conveyor. In other examples the product totes PT and/or order totes CT (generally referred to as reference number 1500 in the drawings) may be loaded or off loaded from the shelves 730 in any suitable manner. As may be realized, the position of the case units on the multilevel vertical conveyor shelf 730 defines the position that the bot 110 picks from. The bot may be configured to pick any suitable product totes PT and/or order totes CT from the shelf 730 regardless of the position on the shelf 730 or the size of the product totes PT and/or order totes CT. In one aspect of the disclosed embodiment, the storage and retrieval system 12 may include a bot positioning system for positioning the bot adjacent the shelves 730 for picking a desired tote from a predetermined one of the shelves 730 (e.g. the bot 110 is positioned so as to be aligned with the product totes PT and/or order totes CT). The bot positioning system may also be configured to correlate the extension of a bot transfer arm with the movement (e.g. speed and location) of the shelves 730 so that the transfer arm is extended and retracted to remove (or place) product totes PT and/or order totes CT from predetermined shelves 730 of the multilevel vertical conveyors 150I, 150O. For exemplary purposes only, the bot 110 may be instructed by, for example, the computer workstation 700 or control server 120 (FIG. 5A) to extend the transfer arm into the path of travel of the product totes PT and/or order totes CT. As the product totes PT and/or order totes CT are carried by the multilevel vertical conveyor 150I in the direction of arrow 860 fingers of the bot the transfer arm pass through the fingers 910 of the shelf 730 for transferring the product totes PT and/or order totes CT from the shelf 730 to the carriage system 1135 (e.g. the product totes PT and/or order totes CT are lifted from the fingers 910 via relative movement of the shelf 730 and the bot transfer arm). As may be realized, the pitch P between shelves may be any suitable distance for allowing the transfer of product totes PT and/or order totes CT between the multilevel vertical conveyor and the bots 110 while the shelves 730 are circulating around the multilevel vertical conveyor at a substantially continuous rate.

The bot transfer arm may be retracted in any suitable manner so that the product totes PT and/or order totes CT is no longer located in the path of travel of the shelves 730 of the multilevel vertical conveyor 150A. The carriage system 1130 may be fully retracted as shown in FIG. 3N for transfer of the product totes PT and/or order totes CT to a bot 110.

It is noted that the multilevel vertical conveyors 150O (and conveyors 150I) are configured to allow the totes, containers and/or case units to continuously revolve around the conveyor loop so that the case units can be moved to, for example, an out-feed transfer station 170O (or in-feed transfer station 170I) at any suitable time for fulfilling an order. For example, a first tote is placed on a first shelf of the multilevel vertical conveyor 150O and a second tote is placed on a second shelf of the multilevel vertical conveyor 150O where the first shelf is located in front of the second shelf in a sequence of shelves of the multilevel vertical conveyor 150O and the second tote is to be provided to the out-feed transfer station 170O before the first tote. The first shelf (holding the first tote) may be allowed to pass the out-feed transfer station without unloading the first tote to allow the second tote to be removed from the second shelf. Thus, the totes may be placed on the shelves of the multilevel vertical conveyor 150O in any order. The out-feed transfer station 170O removes the totes from a desired shelf of the multilevel vertical conveyor at a desired time (as described herein) so that the individual totes are transported to outbound pallets (or other suitable container-like transport supports) in, for example, a predetermined sequence for shipping to a customer.

Referring to FIGS. 5D and 5F, for transferring product totes PT and/or order totes CT in the outbound direction (e.g. moving product totes PT and/or order totes CT 1500 from or out of the storage and retrieval system) the bots 110 pick one or more product totes PT and/or order totes CT 1150, from a respective predetermined storage area of the storage structure (FIG. 5G, Block 8020). As may be realized, the product totes PT are picked from the storage area 130 according to, for example, orders that are to be filled. For example, controller 120 can inform one or more bots of an order that is to be filled and instruct the bots to pick predetermined product totes for filling the order. In one aspect, the product totes can be picked in a batch, e.g. substantially at the same time or one after another and placed on a conveyor 150O in a predetermined sequence. The product totes PT and/or order totes CT may be extended into the path of the shelves 730 of the multilevel vertical conveyor 150O (which is substantially similar to conveyor 150I) by the transfer arm of bot 110 through an extension of the bot transfer arm relative to a frame of the bot 110. It is noted that the product totes PT and/or order totes CT 1150, may be placed on the multilevel vertical conveyor 150O in a first predetermined order sequence (FIG. 5G, Block 8030). The first predetermined order may be any suitable order. The substantially continuous rate of movement of the shelves 730 in the direction of arrow 870 cause the fingers 910 of the shelf 730 to pass through the fingers of the bot transfer arm such that the movement of the shelf 730 effects lifting the pickface 1150 from the fingers of the bot transfer arm. The pickface 1150 travels around the multilevel vertical conveyor 150O to an out-feed transfer station 170O (which is substantially similar to in-feed transfer station 170I) where is it removed from the shelf 730 in any suitable manner, such as through a suitable conveyor system. The product totes PT and/or order totes CT may be removed from the multilevel vertical conveyor 150O by, for example the out-feed transfer stations 170O in a second predetermined order sequence that may be different and independent from the first predetermined order sequence (FIG. 5G, Block 8040). The second predetermined order sequence may depend on any suitable factors such as, for example, product need item packing backlogs, or order of delivery of the product totes PT and/or order totes CT to the modules 20. It is noted that the respective transfer of product totes PT and/or order totes CT between the multilevel vertical conveyors 150I, 150O and the in-feed and out-feed transfer stations 170I, 170O may occur in any suitable manner.

It is noted that the control server 120, for example, may be configured to order the removal of product totes PT and/or order totes CT from the storage and retrieval system 12 for any suitable purpose, in addition to order fulfillment. In the exemplary embodiments, the distribution (e.g. sortation) of containers, such e.g. as the product totes PT and order totes CT, in the storage and retrieval system 12 is such that the containers can be provided for delivery to a module 20 in any suitable order at any desired rate using any desirable sortation sequences. The control server 120 may also be configured to incorporate, for example, store plan rules when fulfilling orders so that the product totes PT and/or order totes CT are provided by the bots 110 to respective multilevel vertical conveyors 150O in a first predetermined sequence (e.g. a first sortation of case units) and then removed from the respective multilevel vertical conveyors 150O in a second predetermined sequence (e.g. a second sortation of case units) so that items from the product totes PT can be placed in order totes CT or the order totes CT may be placed on pallets or other suitable shipping containers/devices) in a predetermined order (see e.g. FIG. 5G described above). For example, in a first sortation of product totes PT and/or order totes CT the bots 110 may pick respective product totes PT and/or order totes CT in any order. The bots 110 may traverse the picking aisles and transfer deck (e.g. circulate around the transfer deck) with the picked product totes PT and/or order totes CT until a predetermined time when the product totes PT and/or order totes CT are to be delivered to a predetermined multilevel vertical conveyor 150O. In a second sortation of containers, once the containers are on the multilevel vertical conveyor 150O the containers, such as the product totes PT and/or order totes CT may circulate around the conveyor until a predetermined time when the product totes PT and/or order totes CT are to be delivered to the out-feed transfer station 170O. It is noted that the order of containers delivered to the modules 20 may correspond to, for example, any suitable packing rules. The rules may incorporate, for example, an aisle layout in the customer's store or a family group of items corresponding to, for example, a particular location in the store where the order tote CT will be unloaded or a type of goods. The order of product totes PT and/or order totes CT delivered to the modules 20 may also correspond to characteristics of the products such as, for example, dimensions, weight and a durability of the product totes PT and/or order totes CT. For example, containers having crushable items therein may be delivered to the module for placement in an order tote CT after heavier more durable items are delivered to the module 20.

The control server 120 in combination with the structural/mechanical architecture of the storage and retrieval system enables maximum load balancing. As described herein, the storage spaces/storage locations are decoupled from the transport of the product totes PT and/or order totes CT through the storage and retrieval system 12. For example, the storage volume (e.g. the distribution of product totes PT and/or order totes CT in storage) is independent of and does not affect throughput of the product totes PT and/or order totes CT through the storage and retrieval system 12. The storage array space may be substantially uniformly distributed with respect to output. The horizontal sortation (e.g. for each storage level, a first bot 110 may traverse, for example, the transfer deck 130B for any suitable amount of time to, for example, allow other bots to pick respective containers of the order and deliver those containers to the multilevel vertical conveyor 150O if the containers of the other bots are to be delivered to the multilevel vertical conveyor before the containers of the first bot 110) and high speed bots 110 and the vertical sortation by the multilevel vertical conveyors 150O substantially creates a storage array space that is substantially uniformly distributed relative to an output location from the storage array (e.g. an out-feed transfer station 170O of a multilevel vertical conveyor 150O). The substantially uniformly distributed storage space array also allows product totes PT and/or order totes CT to be output at a desired substantially constant rate from each out-feed transfer station 170O such that the product totes PT and/or order totes CT are provided in any desired order. To effect the maximum load balancing, the control architecture of the control server 120 may be such that the control server 120 does not relate the storage spaces within the storage structure (e.g. the storage array) to the multilevel vertical conveyors 150O based on a geographical location of the storage spaces (which would result in a virtual partitioning of the storage spaces) relative to the multilevel vertical conveyors 150O (e.g. the closest storage spaces to the multilevel vertical conveyor are not allocated to cases moving from/to that multilevel vertical conveyor). Rather, the control server 120 may map the storage spaces uniformly to each multilevel vertical conveyor 150O and then select bots 110, storage locations and output multilevel vertical conveyor 150O shelf placement so that containers from any location in the storage structure come out from any desired multilevel vertical conveyor output (e.g. at the out-feed transfer stations) at a predetermined substantially constant rate in a desired order for filling order totes CT and customer orders.

It is noted that the control server 120 may be configured to communicate with the bots 110, multilevel vertical conveyors 150I, 150O, in-feed or out-feed transfer stations 170I, 170O and other suitable features/components of the storage and retrieval system 12 in any suitable manner. The bots 110, multilevel vertical conveyors 150I, 150O and transfer stations 170I, 170O may each have respective controllers that communicate with the control server 120 for conveying and/or receiving, for example, a respective operational status, location (in the case of the bots 110) or any other suitable information. The control server may record the information sent by the bots 110, multilevel vertical conveyors 150I, 150O and transfer stations 170I, 170O for use in, for example, planning order fulfillment or replenishment tasks.

As may be realized any suitable controller of the storage and retrieval system such as for example, control server 120, may be configured to create any suitable number of alternate pathways for retrieving one or more product or order totes from their respective storage locations when a pathway providing access to those containers is restricted or blocked. For example, the control server 120 may include suitable programming, memory and other structure for analyzing the information sent by the bots 110, multilevel vertical conveyors 150I, 150O and transfer stations 170I, 170O for planning a bot's 110 primary or preferred route to a predetermined item within the storage structure. The preferred route may be the fastest and/or most direct route that the bot 110 can take to retrieve the item. In other examples the preferred route may be any suitable route. The control server 120 may also be configured to analyze the information sent by the bots 110, multilevel vertical conveyors 150I, 150O and transfer stations 170I, 170O for determining if there are any obstructions along the preferred route. If there are obstructions along the preferred route the control server may determine one or more secondary or alternate routes for retrieving the containers so that the obstruction is avoided and the containers can be retrieved without any substantial delay in, for example, fulfilling an order. It should be realized that the bot route planning may also occur on the bot 110 itself by, for example, any suitable controller system, such as control system 1220 (FIG. 3A) onboard the bot 110. As an example, the bot control system 1220 may be configured to communicate with the control server 120 for accessing the information from other bots 110, the multilevel vertical conveyors 150I, 150O and the transfer stations 170I, 170O for determining the preferred and/or alternate routes for accessing an item in a manner substantially similar to that described above. It is noted that the bot control system 1220 may include any suitable programming, memory and/or other structure to effect the determination of the preferred and/or alternate routes.

Referring to FIG. 1, the warehousing system 12 interfaces or is otherwise coupled to the replenishment and order fulfillment system 20 (which may be located within the facility as shown for example). Accordingly, the warehousing system 12 and replenishment and order fulfillment 20 are substantially integrated so that both the warehouse storage placement and retrieval flow or stream (of cases and totes) effected by the warehousing system 12 and the replenishment and order fulfillment flow or stream (of product cases or totes and order totes) effected by the replenishment and order fulfillment system may be processed and controlled by a control system (not shown) operably connected to and communicating with both the warehousing system 12 and replenishment and order fulfillment system 20. As may be realized, the control system 120 in response to suitable programming and commands selecting a desired order, from a store or customer, (which order, having one or more order lines) for fulfillment initiates a suitable command protocol causing the warehousing system to retrieve a desired product case or tote and transfer it to the replenishment system 20. The control system 120 then may operate the replenishment system 20 so that the desired containers corresponding to the order line are picked from the product case/tote PT and placed into an order tote CT corresponding to the store/customer order. The control system 120 and replenishment system 20 are configured for effecting optimal picking and transfer of units from product cases/totes PT to order totes CT, as will be described further below. The order fulfillment sequence (e.g. sequence of filling of order totes) effected by the replenishment system 20 and control system 120, and hence the retrieval sequence of the warehousing system feeding the replenishment system may be decoupled from the shipment load sequence (i.e. the sequence in which the order totes are loaded, for example onto pallets and/or trucks for shipment from the facility). Filled order totes CT may be transported and stored via the warehousing system 12 in storage locations (for example distributed amongst product cases/totes, or in segregated locations) awaiting retrieval according to the shipment load sequence. The order fulfillment sequence may be arranged so that one product tote PT can fill multiple order totes CT in the replenishment system as will be described in greater detail below. Thus, multiple order totes, each of which may have different order lines (i.e.

each of the order totes may correspond to different stores) but having common order items (all ordering common good unit(s)) may be filled from one (or more) product cases/tote containing the desired good unit(s). As may be realized, this provides the greatest concurrence between product totes PT and order totes OT, hence minimizing the picks and retrievals by the warehousing system 12 and maximizing throughput (order fulfillment) for a given or minimum flow of totes/cases through the arteries of the warehousing system and replenishment system.

Figure 6:
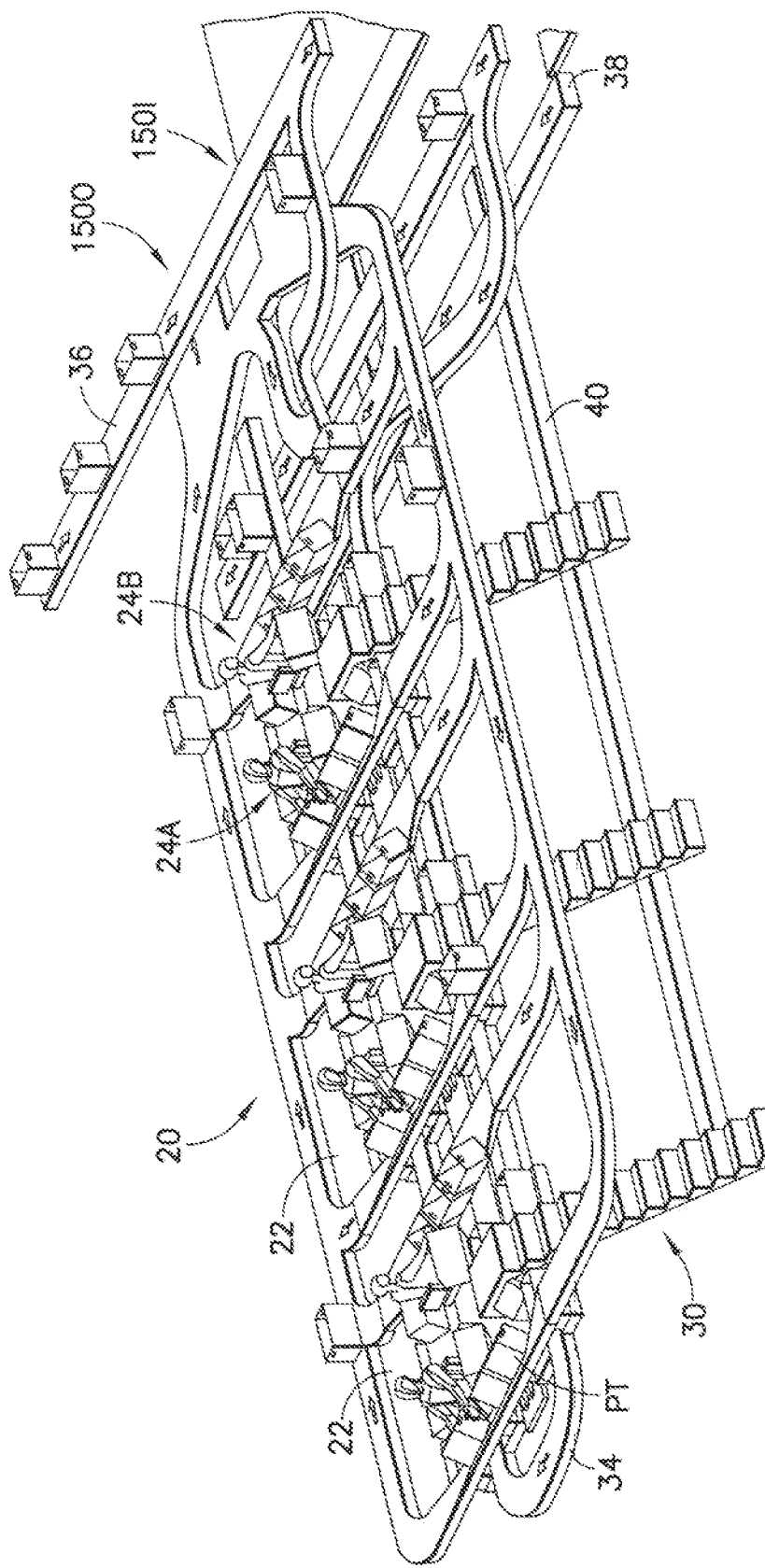
FIG. 6 is a schematic perspective view of a module or portion of the replenishment system in accordance with an exemplary embodiment.

Referring now to FIGS. 6 and 6A, there is shown a schematic perspective view of what may be referred to as a module (in that this section is substantially integrated to operate as a unit) of the replenishment system 20. For example, referring again to FIG. 1, the facility is shown as having a number of modules 20 (five are shown for example purposes) though in alternate embodiments the facility may have any suitable number (one or more). The section 20 of the replenishment system may also be considered as being a module in the sense that the section may be coupled, in the fashion of a module, to input and output locations (e.g. the input and output MVC's 150, see also FIGS. 5-5F) of the warehousing system. The replenishment module 20 may be configured to form what may be referred to for purposes of description, order fulfillment cells 22. Each order fulfillment cell 22 may have one or more (two are shown for example) order fulfillment stations 24A, 24B. The order fulfillment cells 22 are arranged to facilitate picking from one (or more) product container(s) or tote(s) PT in the replenishment module 20 to one or more order containers or totes CT in the replenishment module. In other words, a product tote(s) PT may remain within a replenishment module 20 until all order totes CT at the fulfillment stations 24 that are to receive good units (at that time) from the product tote have received the ordered unit (at which time the product tote is returned to the warehousing system) or until the product tote is empty (when the product tote is sent for filling with common goods units). The configuration of the module and cells is exemplary and in alternate embodiment may have any suitable configuration.

As noted before, the module 20 may be coupled to the warehousing system by infeed and outfeed stations such as MVC's 150I, 150O. One infeed and one outfeed station is shown for example, but a module may have one or more infeed and one or more outfeed stations. Also one MVC 150 is shown at each of the infeed and outfeed stations for example, and in alternate embodiments the infeed and outfeed stations may have one or more MVC's (and/or other suitable lifts) at each of the infeed 150I and outfeed 150O sections. Each cell 22 may include, for example a product tote/case conveyor 32 (all other suitable transport), see FIG. 7A, an order tote conveyor 34, see FIG. 7C, (the term conveyor is used herein to refer to the transports in the module for convenience, and it should be understood that the transport may be of any suitable type and configuration not limited to conveyors), an empty product tote conveyor 36, see FIG. 7D, a replenishment product tote induction conveyor 38, see FIG. 7E, and an order staging conveyor 40, see also FIG. 7F.

Figure 7A:
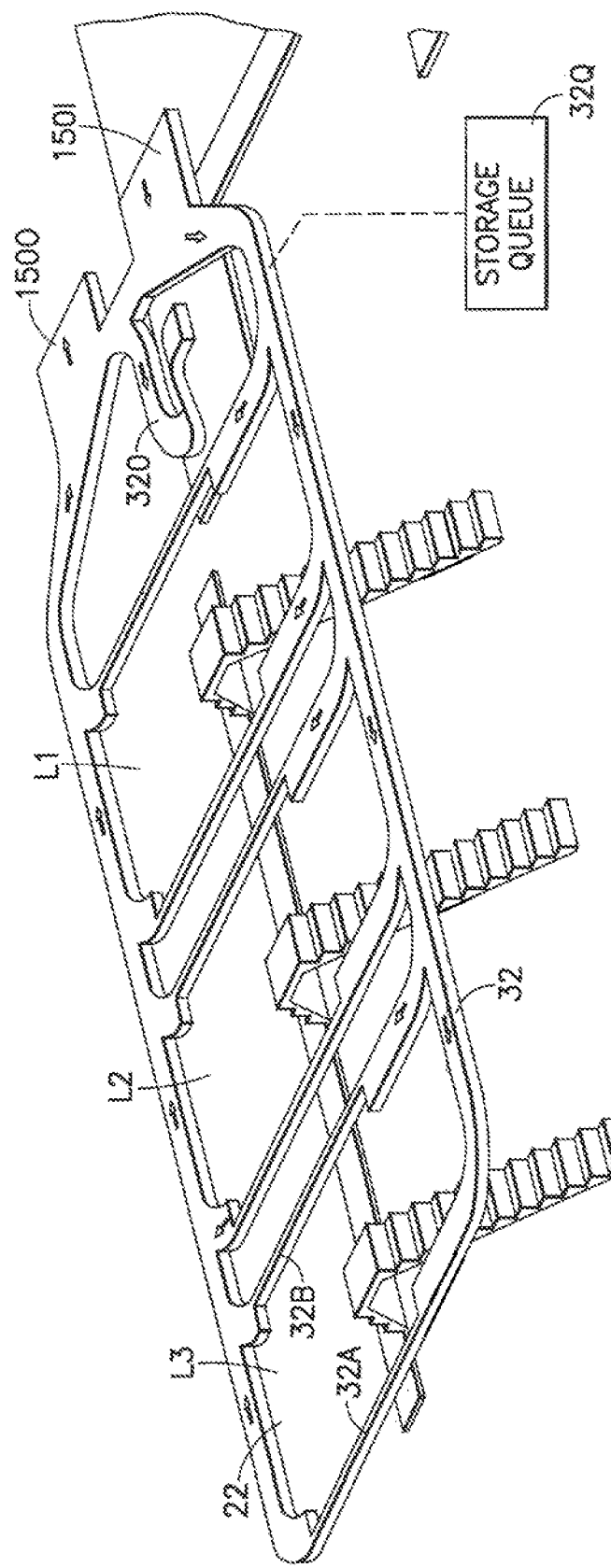
FIGS. 7A-7F are schematic perspective views of the system, shown in FIG. 6, with one or more of the portions or system components removed in respective views for clarity.
Figure 7B:
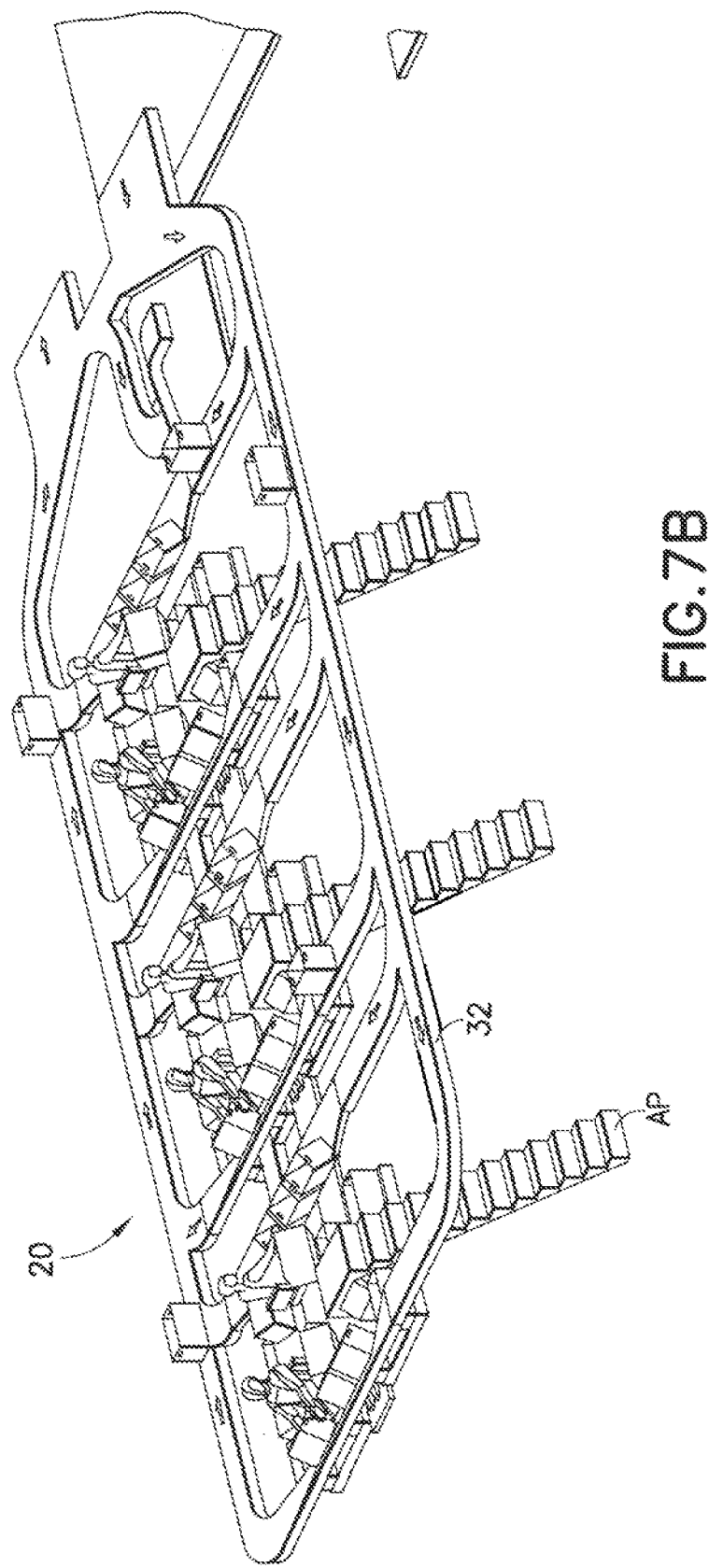

In the exemplary embodiment the product tote conveyor 32 may be closed loop, serving to convey product totes PT and/or partially filled order totes CT from the storage area 130 (fed by the input station MVC 150I) to the workstations of the replenishment cells. It is noted that the product tote conveyor 32 of each module 20 may be connected in any suitable manner, such as with suitable conveyor paths, to each of the vertical conveyors 150O so that product totes can be transferred from any one of the conveyors 150O to any one of the workstations in the modules 20 (e.g. each conveyor 150O is common to all of the modules 20 and workstations 24). For example, transfer station 170O may connect the conveyor 32 to a respective multilevel vertical conveyor 150O for transferring product totes PT from storage area 130 to the conveyor 32. As may be realized, the conveyor 32 may also be coupled, in any suitable manner, to conveyor 13 for transferring product totes PT substantially directly from storage system 100 to the conveyor 32 without the product totes PT going into the storage area 130. Here, the conveyor 32 may also communicate with each workstation 24A, 24B of each replenishment cell 22. Accordingly, one product tote(s) may be moved if desired, to one or more of each of the replenishment workstations until all order totes CT at the fulfillment stations 24 that are to receive good units from the product tote (at that time) have received the ordered unit (at which time the product tote is returned to the warehousing system) or until the product tote is empty (when the product tote is sent for filling with common goods units). As can be seen in FIG. 7A the conveyor 32 forms, for example, transport loops L1-L3 that are configured to allow the product totes PT to travel substantially continuously around conveyor 32 for sorting and transporting the product totes PT to each of the workstations 24A, 24B. As may be realized the conveyor 32 may have stations 32A, 32B corresponding to the workstations 24A, 24B where the product tote(s) may be stopped for picking by the operator at the workstation. The stations 32A, 32B may have any suitable configuration to minimize operator movement while filling order totes CT. For example, the stations 32A, 32B may have a curved or angled configuration to bias the conveyor in a direction of the access by the operator (e.g. the right side of the station may be angled towards or away from the operator and the left side of the stations may be angled towards or away from the operator where the apex of an angle or curve formed by the left and right side of the station is located at a position adjacent the operator and substantially at a center of the station). Suitable buffers and interfaces may be included to enable product totes to stop at the desired stations 32A, 32B while other portions of the conveyor continue to move product totes along the conveyor. As may be realized the loops L1-L3 may be configured to allow, for example, misqueued product totes to travel around the loops so that the misqueued products totes are placed in a desired order for filling order totes substantially without disrupting a flow of product totes to the workstations. One or more temporary storage queues 32Q may also be part of the conveyor 32 at, for example, locations between workstations 24 and/or between the workstations 24 and the conveyors 150I, 150O so that totes can be delivered to the queues 32Q and released to the workstations at a suitable time for a further sortation of the totes. It is noted that the storage queues 32Q may be located at any suitable portion of conveyor 32. As seen in FIG. 7A, in one aspect of the disclosed embodiment, the conveyor 32 may have an output to the output station MVC(s) 150O. A further output 320 may be provided to route empty product totes to the empty product tote return conveyor 36 (see also FIG. 7D) for return to a product tote fill station (not shown) in the facility. Suitable automated gates or fences or other directional devices (under the control of, e.g., controller 120) may be provided for directing the totes along a predetermined route on the different portions of conveyor 32.

Figure 7C:
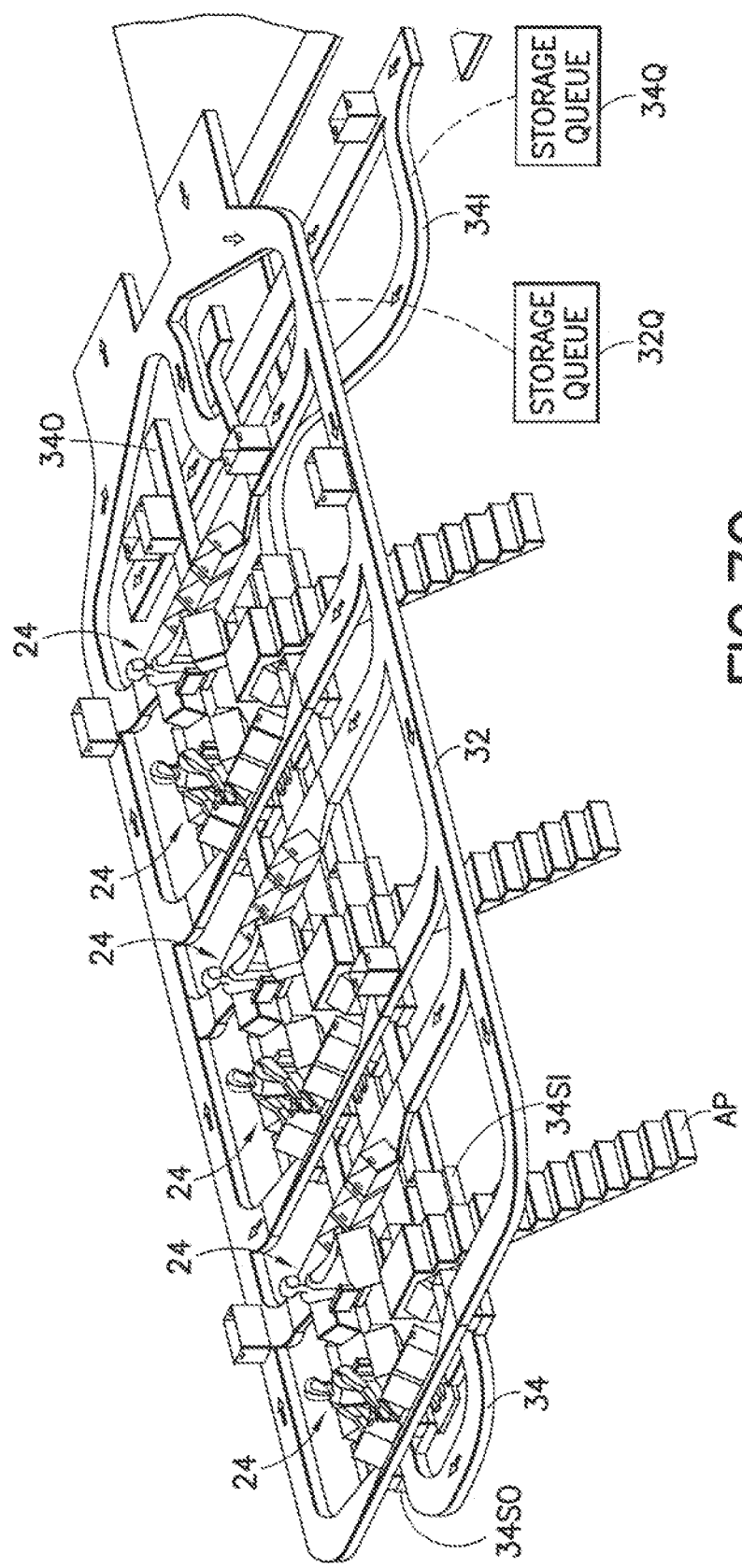

In one aspect of the disclosed embodiment, the order tote or order conveyor 34 is arranged to communicate with each replenishment workstation 24A, 24B of the module 20 and may transport what may be inbound empty order totes CT to each workstation. It is noted that the order conveyor 34 may have one or more storage queues 34Q located at any suitable portion of the conveyor 34 for temporarily storing order totes in a manner substantially similar to that described above with respect to storage queues 32Q. As seen best in FIGS. 6, 6A and 7C, the order conveyor 34 communicates with both (e.g. left and right) sides of each workstation, and has stations 34SI, 34SO (which will be described in greater detail below) respectively on both left and right sides of each workstation where order totes CT are stopped for filling. As may be realized, the order conveyor 34 may have a looped arrangement, similar to that described above with respect to conveyor 32 so that any misqueued order totes can travel around the one or more loops substantially without disrupting a flow of order totes on conveyor 34 so that the misqueued order totes are placed in a proper location or sequence for filling as the workstations 24. In an aspect of the disclosed embodiment, the product conveyor 32 and order conveyor 34 may be offset vertically (at least at the workstations) as shown in FIGS. 7-7C, with the product conveyor 32 extending across what may be referred to as the front of the workstation and the order conveyor 34 extending along both left and right sides of the workstation. As may be realized, the order conveyor 34 includes an input 34I that, in one aspect, is connected to the multilevel vertical conveyor 150O through transfer station 170O so that order totes CT may be transferred from the storage area 130 back to the workstations 24A, 24B if additional items are to be added to order tote CT after an initial filling of the order tote CT. In another aspect, the input 34I may also be connected in any suitable manner to an order tote supply area (not shown) for supplying empty order totes to the workstations 24A, 24B. The conveyor 34 may have an output 34O that directs the filled ordered totes CT to, for example, conveyor 150I through transfer station 170I for induction into the storage area 130. The output 34O may be connected to each of the conveyors 150I in any suitable manner, such as through suitable conveyor paths, so that the order totes CT output from each module 20 can be inducted into the storage area 130 using any one of the conveyors 150I (e.g. each conveyor 150I is common to each module 20 and workstation 24). As may be realized, the output 34O may also be connected to, for example, order staging conveyor 40 for substantially directly transferring filled order totes CT to a staging area for shipping the filled order tote CT to a customer. Suitable automated gates or fences or other directional devices (under the control of, e.g., controller 120) may be provided for directing the order totes along a predetermined route on the different portions of conveyor 34.

Figure 7D:
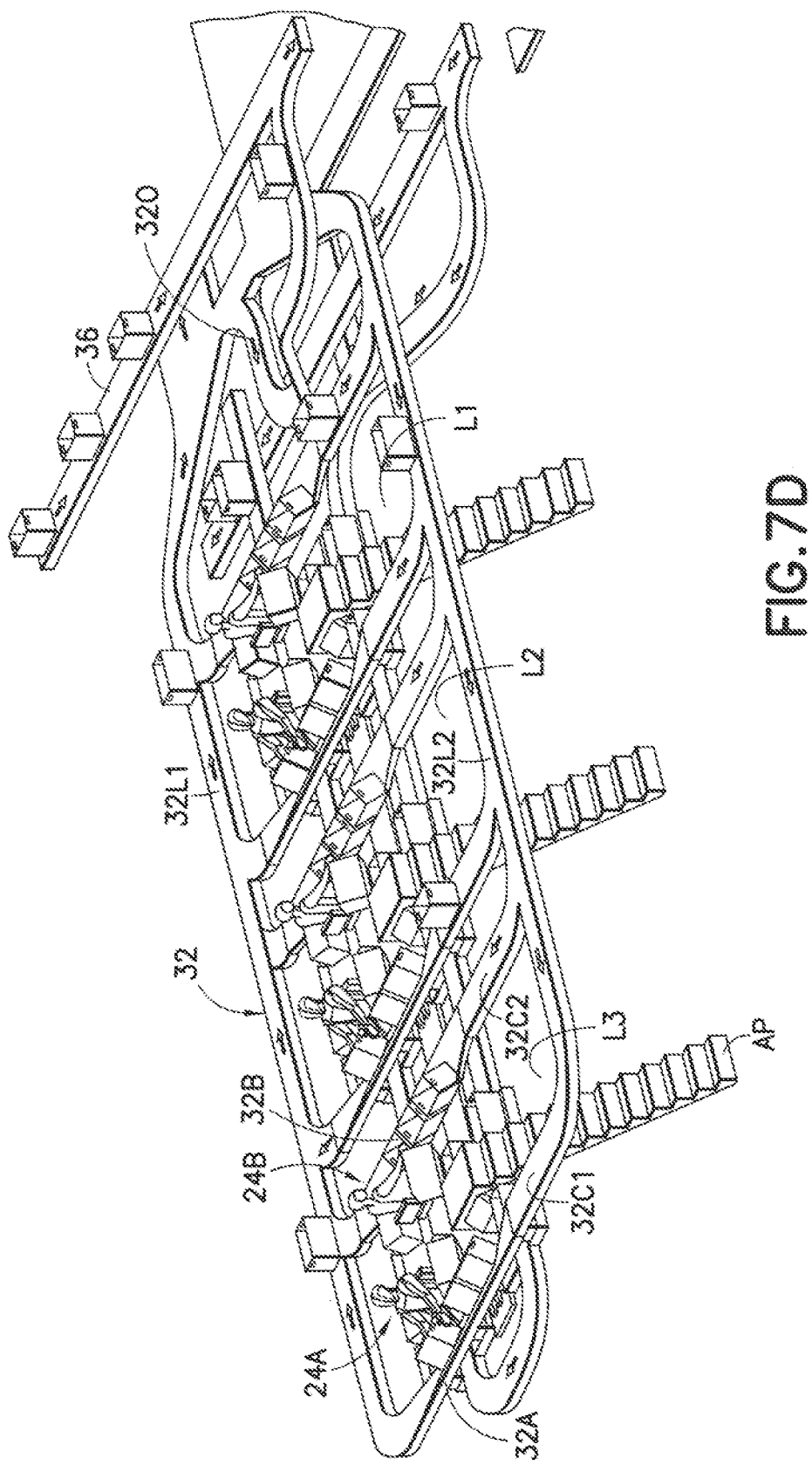
Figure 7E:
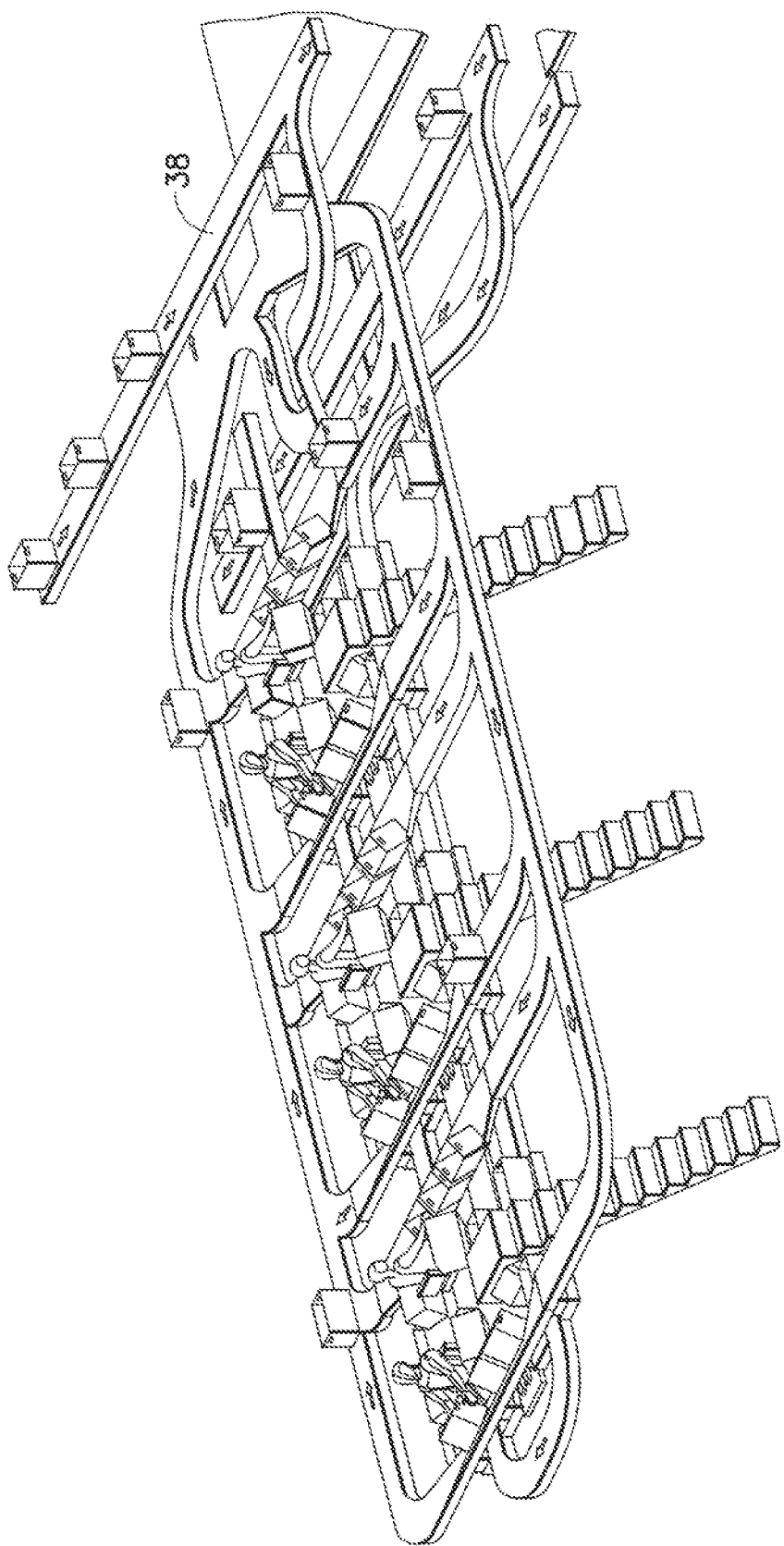
Figure 7F:
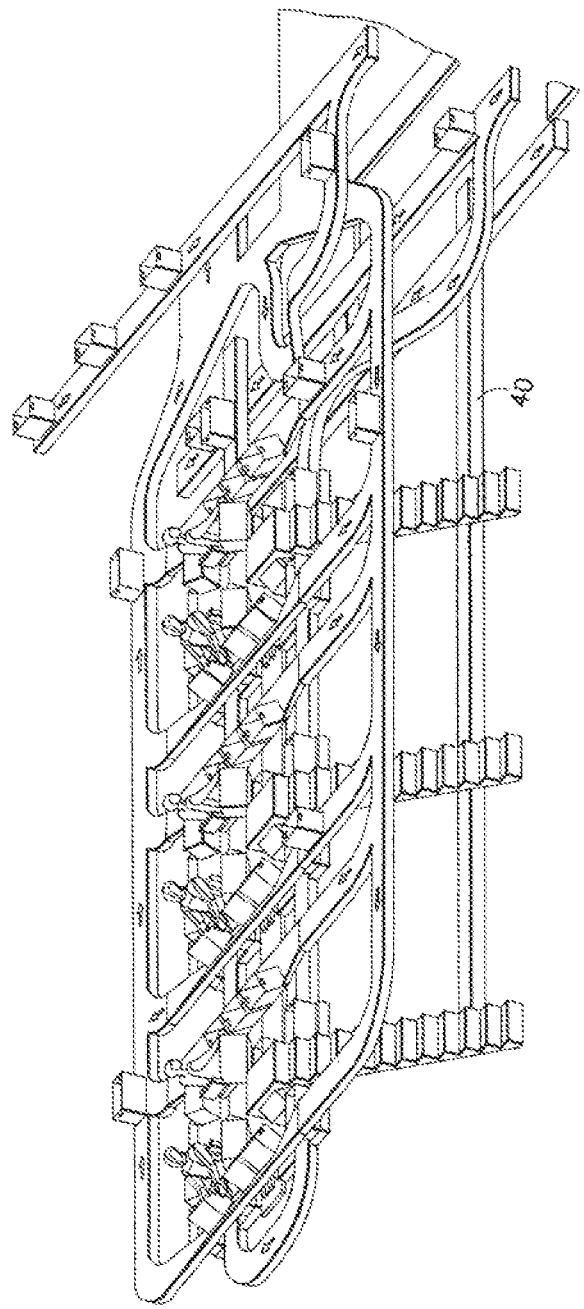

Referring also to FIGS. 8A-8C and 7D, there is shown respective schematic views of the front, back and partial back of a representative workstation 24A. The workstations 24 may be arranged in opposing pairs within each loop L1-L3 of the module 20 (FIG. 7D). For example, as can be seen in FIG. 7D, using loop L3 as an example, the conveyor 32 may have a first and second longitudinal conveyor portions 32L1, 32L2. Cross or lateral conveyor portions, such as portions 32C1, 32C2 may extend between the longitudinal portions 32L1, 32L2 to form, for example, loop L3. Stations 32A, 32B are located on respective ones of these cross conveyor portions 32C1, 32C2. An access path AP is provided for each of the workstation pairs 24A, 24B and is configured so that the path AP allows an operator to enter one of the opposing workstations 24A, 24B. Workstations may be similar and, as may be realized, the workstation is arranged substantially symmetrically so that the operator may pick and fill orders ambidextrously, e.g. substantially simultaneously with both left and right hands. Each workstation may be configured to account for the handedness of the operator and include handedness features for effecting the filling of order totes as will be described below.

Figure 8B:
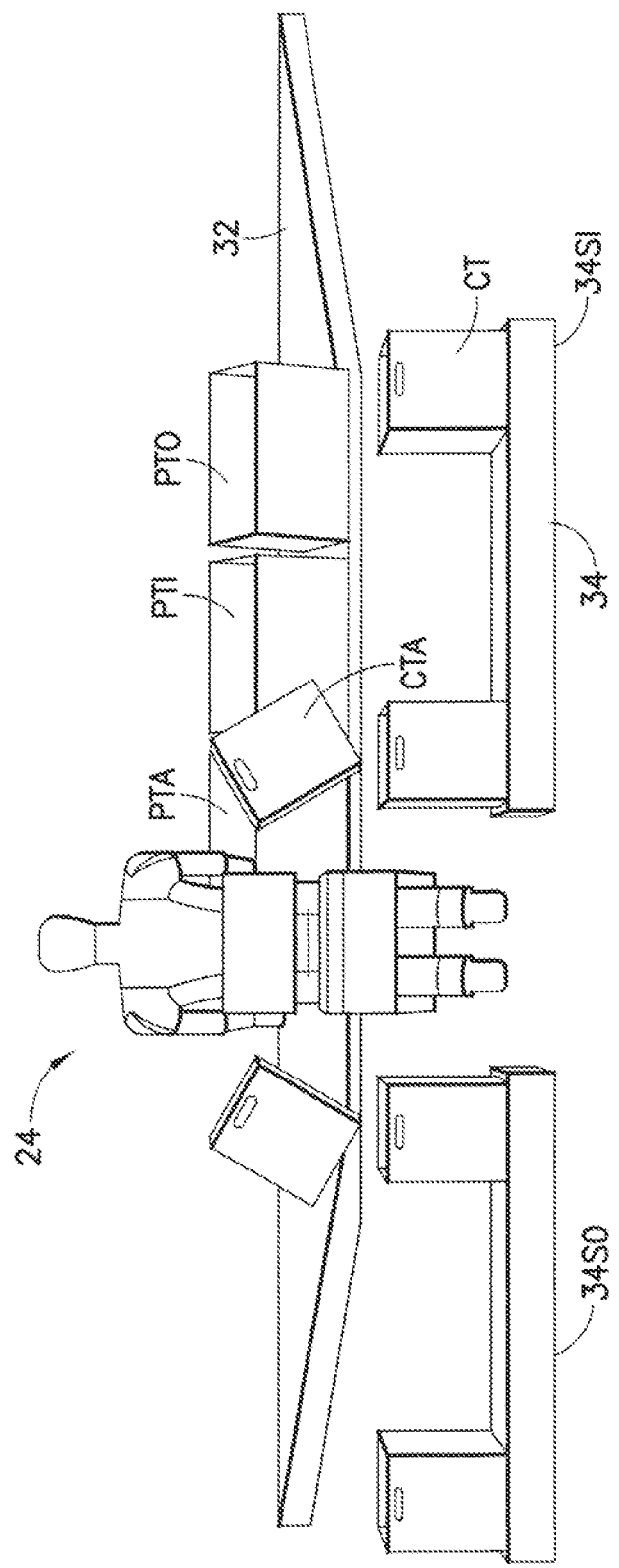
Figure 12:
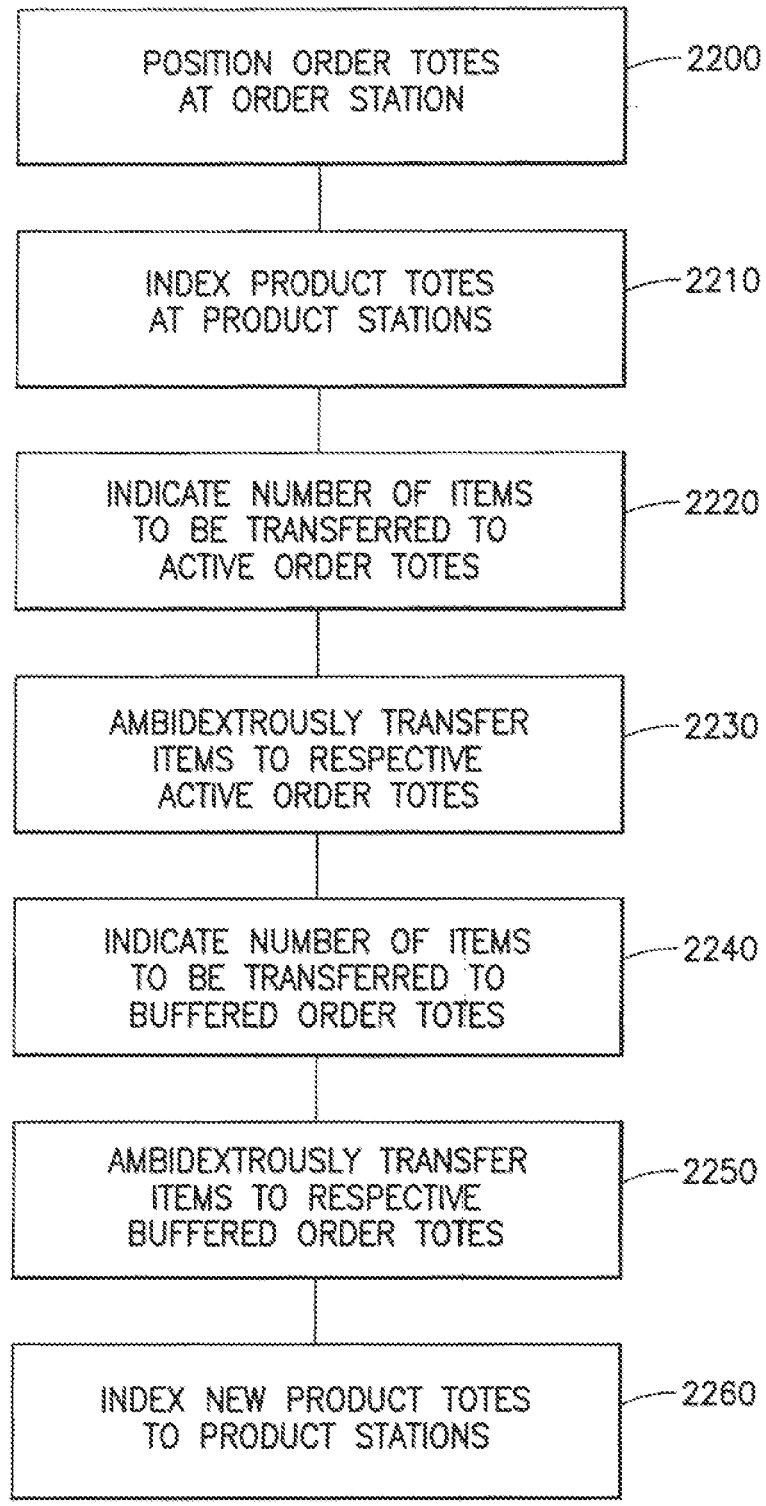
FIG. 12 is a flow diagram in accordance with an aspect of the disclosed embodiment.

In one aspect, active order totes CTAI, CTAO are positioned, through for example controller 120 or any other suitable manner, ergonomically at the operator left and right hand sides (I, O) to be filled. As described above, buffered order totes may also be positioned ergonomically at the operator's sides for opportunistic picking or order fulfillment. (FIG. 12, Block 2200). As an example, of opportunistic picking, if there are order totes (e.g. active and/or buffered) that require the same items from a product tote, the controller 120, for example, may be configured to cause a retrieval of one or more product totes PT and direct the retrieved product totes PT to the stations 32A, 32B in respective indexed positions, as will be described below. (FIG. 12, Block 2210). The controller 120 may also be configured to give the operator a handed or directional indication (e.g. an aural or visual indication in a manner substantially similar to that described below) to place a predetermined number of items into the active order totes CTAI, CTAO (FIG. 12, Block 2220) using both hands of the user (e.g. the left hand moves items from and to containers on the operator's left side and the right hand moves items from and to containers on the operator's right hand side) (FIG. 12, Block 2230). Once the items are transferred to the active the respective order totes controller 120 will provide the operator with another handed indication (e.g. aural or visual in a manner substantially similar to that described below) to transfer a predetermined amount of items to one or more of the buffered order totes (e.g. multiple orders are filled from one product tote so that items are taken from the product tote and transferred to both the active product tote and one or more buffered product totes while the product tote remains at the workstation). (FIG. 12, Blocks 2240 and 2250). Once the items are transferred from the product tote to each of the active and buffered order totes the controller 120 is configured to cause the removal of the product totes from the workstation so that a new set of product totes arrive at the active product tote stations LH, RH. (FIG. 12, Block 2260). As can be seen in FIGS. 8A-8C the active order totes CTAI, CTAO are shown as being angled toward the operator but it should be understood that the active order totes CTAI, CTAO may have any suitable spatial relationship with respect to the operator. A revolving or other suitable transfer system AL may be provided to move one or more order totes at the workstation between active (being filled) and buffered positions (e.g. arrayed at the conveyor station 34SI, 34IO). For example, the transfer system AL may be configure to lift the one or more order totes from the conveyor 34 to an ergonomic height and then tilt the one or more order totes to allow transfer of items from the product totes to the order totes with minimal operator movement. As may be realized, some of the buffered totes may be lifted by the lift AL to a position for filling so that the buffered totes can be filled opportunistically as described above. As noted previously, each order tote may correspond to unique store order, and hence the active order totes CTAI, CTAO respectively on the sides I, O of the operator may have different order lives (and thus may be filled from different product totes).

Figure 9A:
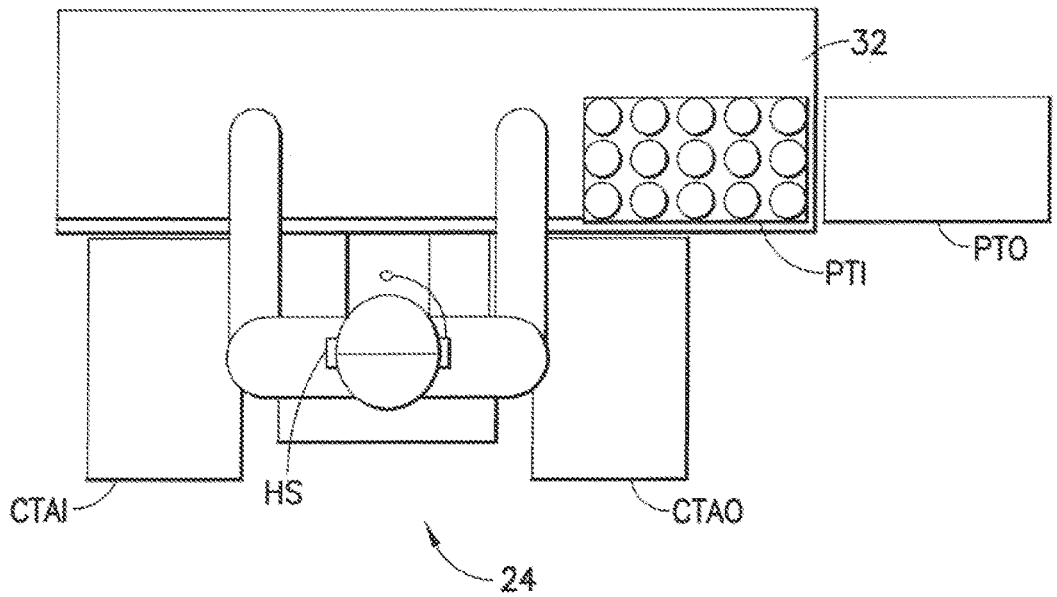
FIGS. 9A-9B are schematic plan views of the workstation showing the workstation at different stages during the replenishment process.
Figure 9B:
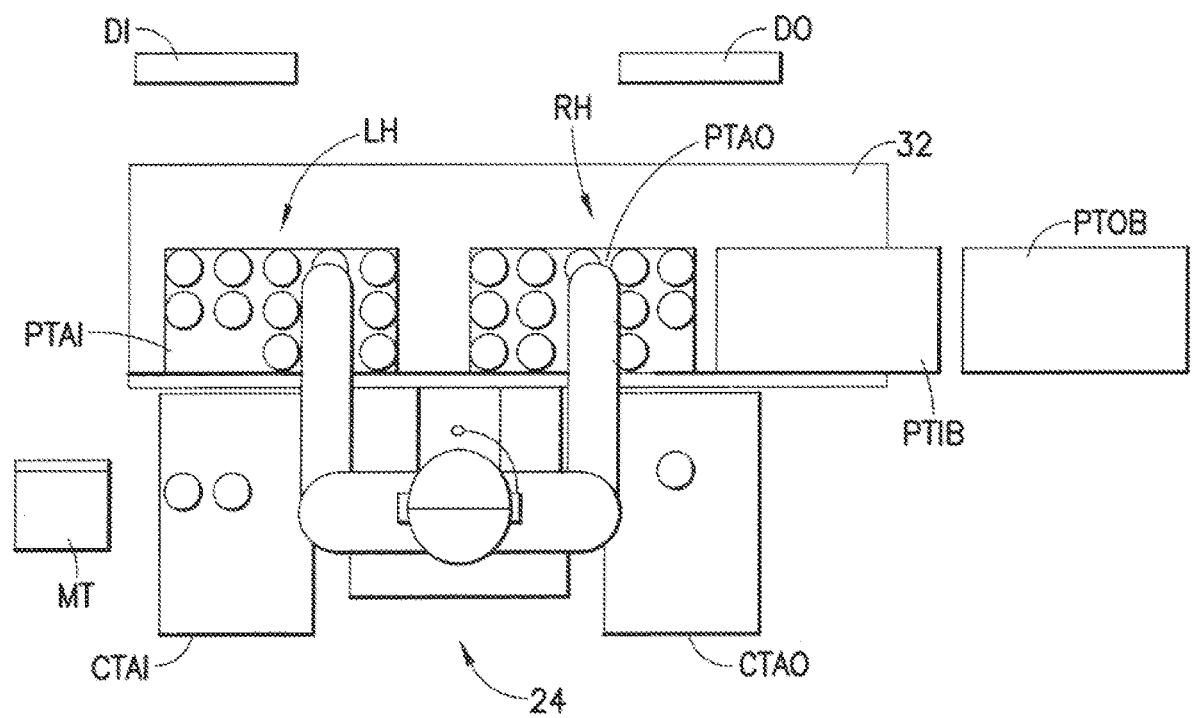
Figure 13:
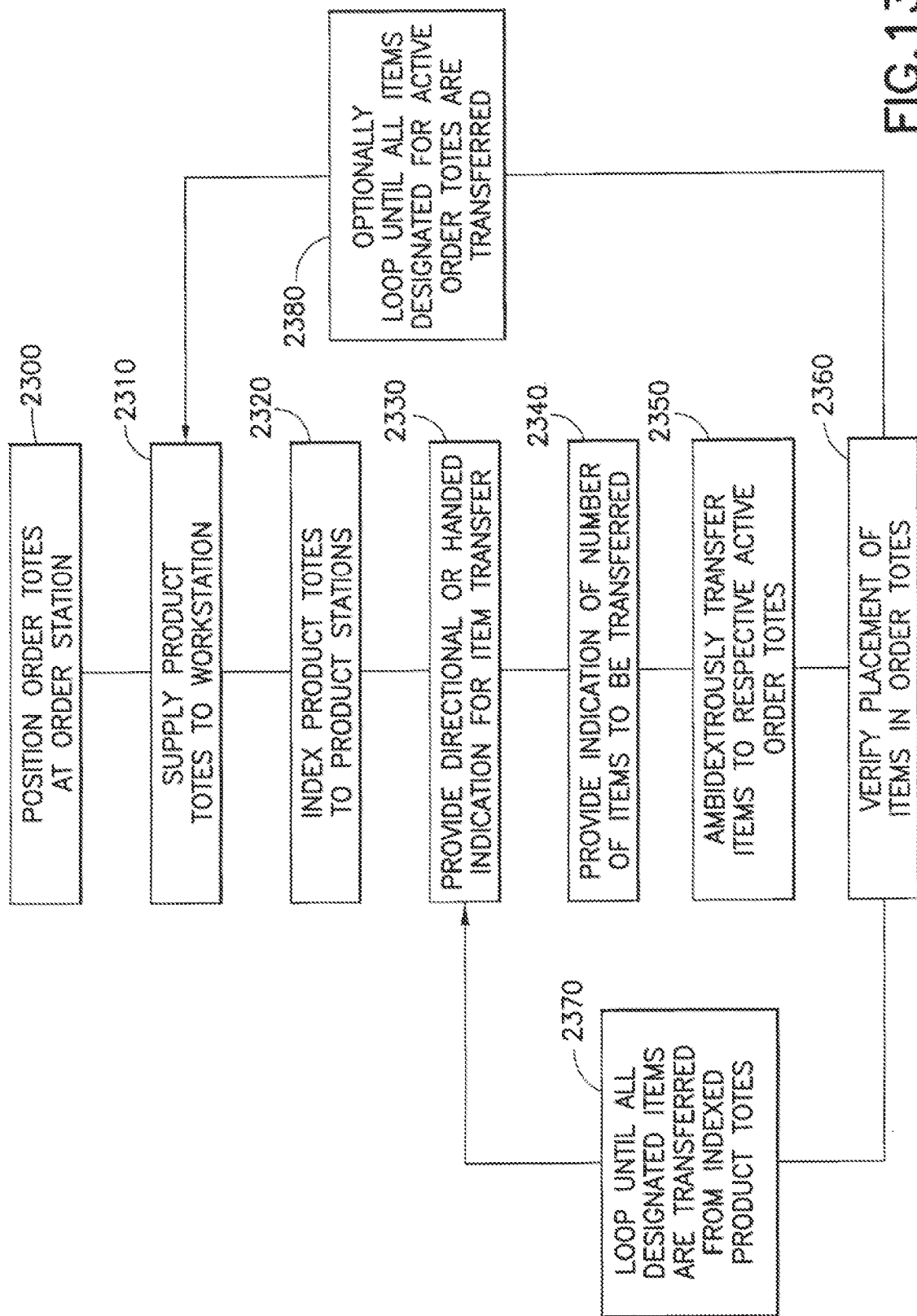
FIG. 13 is a flow diagram in accordance with an aspect of the disclosed embodiment.

In one aspect of the disclosed embodiment, the control system 120 may be programmed so that the product totes PT queued to a workstation correlate to the active order totes CTAI, CTAO positioned at the station as well as the relative side or position of the order tote CTAI, CTAO when realizing the active platform of the workstation (e.g. deterministic order fulfillment or picking, where only the active order totes CTAI, CTAO receive items from a respective one of the active product totes PTAI, PTAO). It is noted that the order totes may be positioned at the workstations in sequence corresponding to customer order or in any other suitable sequence. (FIG. 13, Block 2300). Referring to FIGS. 9A and 9B, by way of example, the product totes buffered (see e.g. totes PTIB, PTOB in FIG. 9B) at the workstation (see FIG. 9A) are sequenced, such as in an alternating PTI, PTO sequence, to correspond to the lines of the respective active (and buffered) order totes CTAI, CTAO on the respective sides I, 0 of the workstation. For example, the product totes may be supplied to the workstation 24 in pairs (e.g. one product tote PT to be accessed with the left hand of the operator and one product tote to be accessed by the right hand of the operator) where each product tote includes only one SKU or product type. (FIG. 13, Block 2310). The product conveyor 32 may be configured (e.g. through commands from the controller 120 and suitable sensors) to index the product totes along the conveyor 32 for placing the product totes at the proper location for the hand (e.g. left or right hand) of the operator to pick and place the items in an order tote at a corresponding side of the operator. (FIG. 13, Block 2320). In the exemplary embodiment, where the conveyor 32 feeds product totes from one side, the product totes PTIB, PTOB that are buffered at the workstation may be moved across an active product tote station to locations corresponding to the active order totes CTAI, CTAO. For example, the buffered tote PTIB may move across station RH so that the tote becomes PTIB an active tote PTAI at station LH while buffered tote PTOB is moved to station RH to become active tote PTAO. Hence, different units corresponding to the different order lines for each order tote may be picked ambidextrously, e.g. substantially simultaneously by the left and right hands of the operator without the operator turning or making arm motions across the body (e.g. without placing, with the right hand of the operator, an item in active order tote CTAI located on the left side of the operator from product tote PTAO located on the right side of the operator or vice versa). As may be realized from FIGS. 9A-9B the product totes enter the stations or pick zones RH, LH and stop at one of the stations RH, LH so that the pick location deterministically signals, to the operator, the put location of items taken from the respective product totes PTAI, PTAO in any suitable manner. (FIG. 13, Block 2330). For example, if the product tote PTAI is located on the left hand side of the operator items picked from product tote PTAI are placed in the order tote CTAI located on the left hand side of the operator. Likewise, if the product tote PTAO is located on the right hand side of the operator items picked from product tote PTAO are placed in the order tote CTAO located on the right hand side of the operator. The workstations 24 may be arranged to provide for minimal operator movement when transferring items from product totes to order totes. As a non-limiting example, the workstation may be configured so that operator only has to move an item only a few inches up out of the product tote, over and down into the order tote without the operator turning his/her body and/or head to the left or right towards a respective order tote. It is noted that where a heavy item is to be moved from a product tote to an order tote (e.g. the item cannot be lifted with one hand of the user) a chair the operator is sitting in may be configured to rotate for placing the heavy item in the order tote so that the operator does not twist the operator's back.

One or more displays DI, DO may be disposed for viewing by the operator during the pick and place operations at the workstation 24 to indicate a number of items to be removed from each product tote PTAI, PTAO for placement in corresponding order totes CTAI, CTAO by the corresponding hand (e.g. left or right hand) of the operator. (FIG. 13, Blocks 2340, 2350). In one aspect, the displays DI, DO may be located substantially immediately behind the product tote PTAI, PTAO to which they relate or in any other suitable location that is within the operator's field of view and readily associates the displays DI, DO with their respective product totes PTAI, PTAO. It is noted that the displays DI, DO may be positioned in a "heads down" configuration such that the displays DI, DO are viewable as the operator is looking at the items within at least the product totes PTAI, PTAO so that the operator does not have to take his/her eyes off of the items to be transferred and so that the operator does not have to change a field of view to observe the displays DI, DO. As a non-limiting example of display placement, the display DI and product tote PTAI are both located on the left hand side of the operator such that the display DI indicates how many items are to be removed from the product tote PTAI and placed in the order tote CTAI. Likewise, the display DO and product tote PTAO are both located on the right hand side of the operator such that the display DO indicates how many items are to be removed from the product tote PTAO and placed in the order tote CTAO. It is noted that while two displays DI, DO are shown it should be realized that a single display may be provided where the single display operates to indicate a number of items to be removed from the product totes PTAI, PTAO. The displays DI, DO may be any suitable displays, such as for example, an array of lights and/or an LCD or other flat panel display.

The displays may be configured (e.g. through communication with controller 120) to "count down" the number of items to be picked. For example, if three items are to be removed from product tote PTAI and placed in order tote CTAI the initial indication from the display (e.g. when product tote PTAI arrives at station LH) will indicate three items are to be removed. As the first item is removed and placed in order tote CTAI the display changes to indicate that two more items are to be removed (e.g. a number of illuminated lights changes from three to two or a number being displayed changed from "3" to "2") and so on. As may be realized the displays DI, DO may be connected to, for example, the controller 120 in any suitable manner for providing the indication of the number of items to be removed from the product totes. For example, the controller 120 may be configured to cause the display DI, DO to indicate the initial number of items to be removed from the respective product tote PTAI, PTAO in any suitable manner. The controller 120 may be connected to any suitable sensor(s) or tracking device(s) for sensing/detecting or otherwise verifying that items are removed from the product totes PTAI, PTAO and placed in the corresponding order tote CTAI, CTAO. (FIG. 13, Block 2360). In one example, the workstations 24 may include weight sensors 1000 for sensing a weight of each order tote CTAI, CTAO. The weight sensors 1000 may be connected to the controller 120 in any suitable manner and the controller 120 may be configured, such as through any suitable memory, with the weights of each individual item in the product totes PTAI, PTAO. As each item is placed in the order totes CTAI, CTAO the weight of the order totes CTAI, CTAO changes by the amount of weight of each item taken from the respective product tote PTAI, PTAO. The controller 120 may be configured to recognize this increase in order tote weight (via the weight sensors 1000) and determine how many items from the product totes PTAI, PTAO have been placed in respective ones of the order totes CTAI, CTAO. Based on the number of items placed in the order totes CTAI, CTAO the controller 120 is configured to determine how many more items from each of the product totes PTAI, PTAO are to be placed in the respective order totes CTAI, CTAO and accordingly change the displays DI, DO to indicate the how many more items are to be removed from the product totes PTAI, PTAO.

Figure 10:
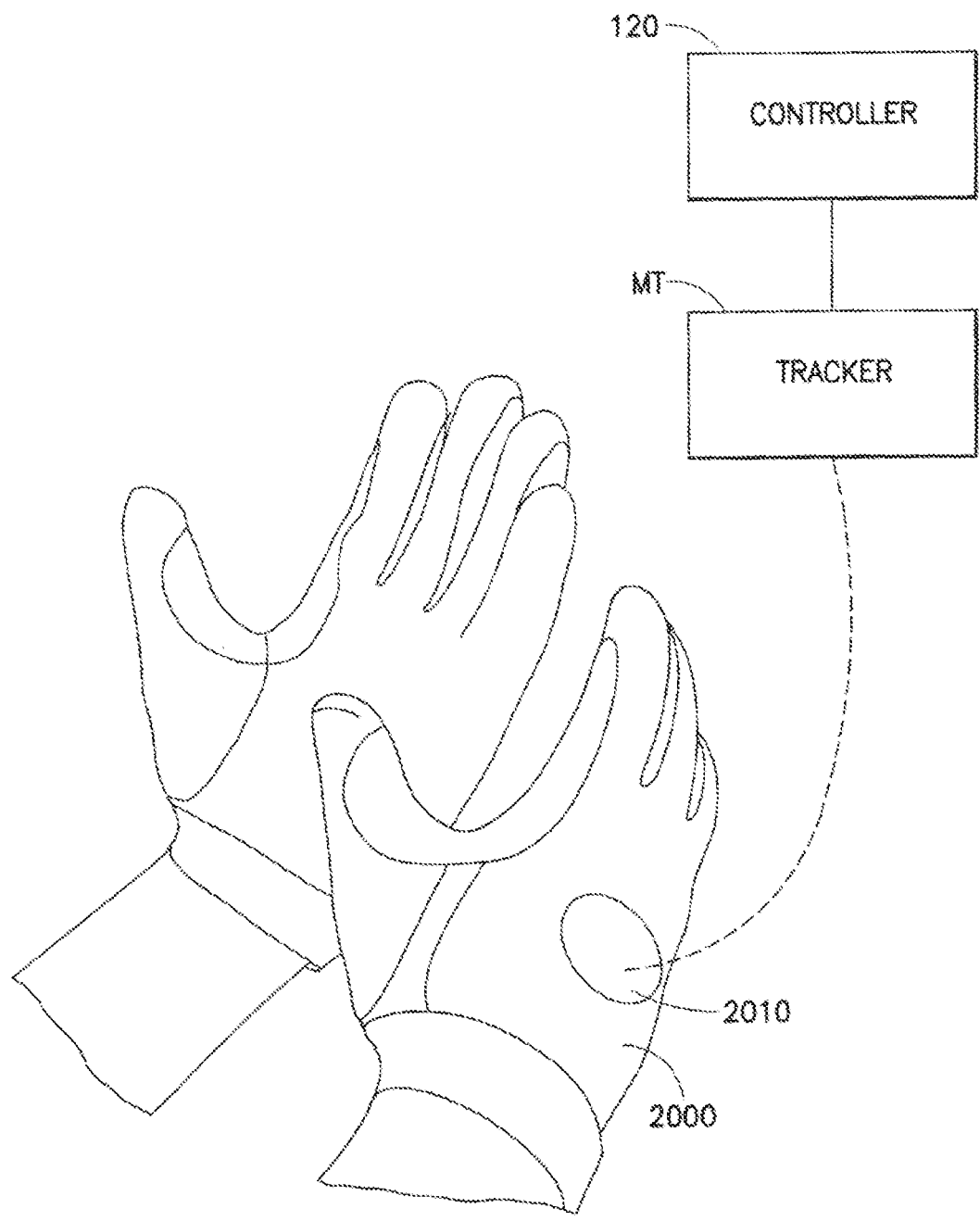
FIG. 10 is a schematic partial view showing a portion of the replenishment system in accordance with aspects of the disclosed embodiment.

In another aspect, the workstations 24 may include one or more motion tracking units MT configured to track, for example, the movement of the operator's hands between the product totes PTAI, PTAO and the respective order totes CTAI, CTAO. The motion tracking unit(s) MT may be connected to, for example, the controller 120 in any suitable manner. The motion tracking unit(s) may include, for example, a glove 2000 (FIG. 10) having a surface (e.g. reflective surface) or other suitable feature 2010 that the motion tracking unit MT is configured to detect. As may be realized, the surface or other suitable feature 2010 may have any suitable form and be affixed to any suitable wearable object such, as for example, a bracelet or a ring. It is noted that the gloves may also be configured to increase grip and reduce hand fatigue. The controller 120 may be configured, e.g. through the motion tracking unit MT, to track the number of times the left and right hands of the user move between the respective product and order totes PTAI, CTAI and PTAO, CTAO and change the indication on the respective display DI, DO to show a decreased number of items to be removed from the respective product totes PTAI, PTAO. As may be realized, the motion tracking unit MT and the weight sensors 1000 may operate together or individually to determine the number of items placed in the order totes CTAI, CTAO. It is noted that the number of items placed in the order totes may be tracked in any suitable manner for changing the displays DI, DO as described herein. The motion tracking unit MT may also be configured to indicate when the operator's hands are clear of the product totes PTAI, PTAO before the totes are advanced from the workstation 24.

The controller 120 may also be configured to communicate with the operator through, for example, an audio headset HS. The audio headset HS may provide bi-directional communication between the operator and the controller 120 (e.g. through voice recognition and speech generation or text to speech). The controller 120 may be configured to provide handed aural indications to the operator indicating, for non-limiting exemplary purposes, the quantity of items to be removed from each product tote PTAI, PTAO, the location of placement of the items and errors in item placement. The headset HS may also be in communication with other headsets to allow for bidirectional communication between, for example, supervisory personnel and the operator. The controller 120 may also be configured to receive input from the operator such as, for non-limiting exemplary purposes, a confirmation of quantity for the items placed in the order totes, confirmation when a product tote is clear to advance after a final pick from that product tote, an instruction that the operator is going to take a break.

Figure 11:
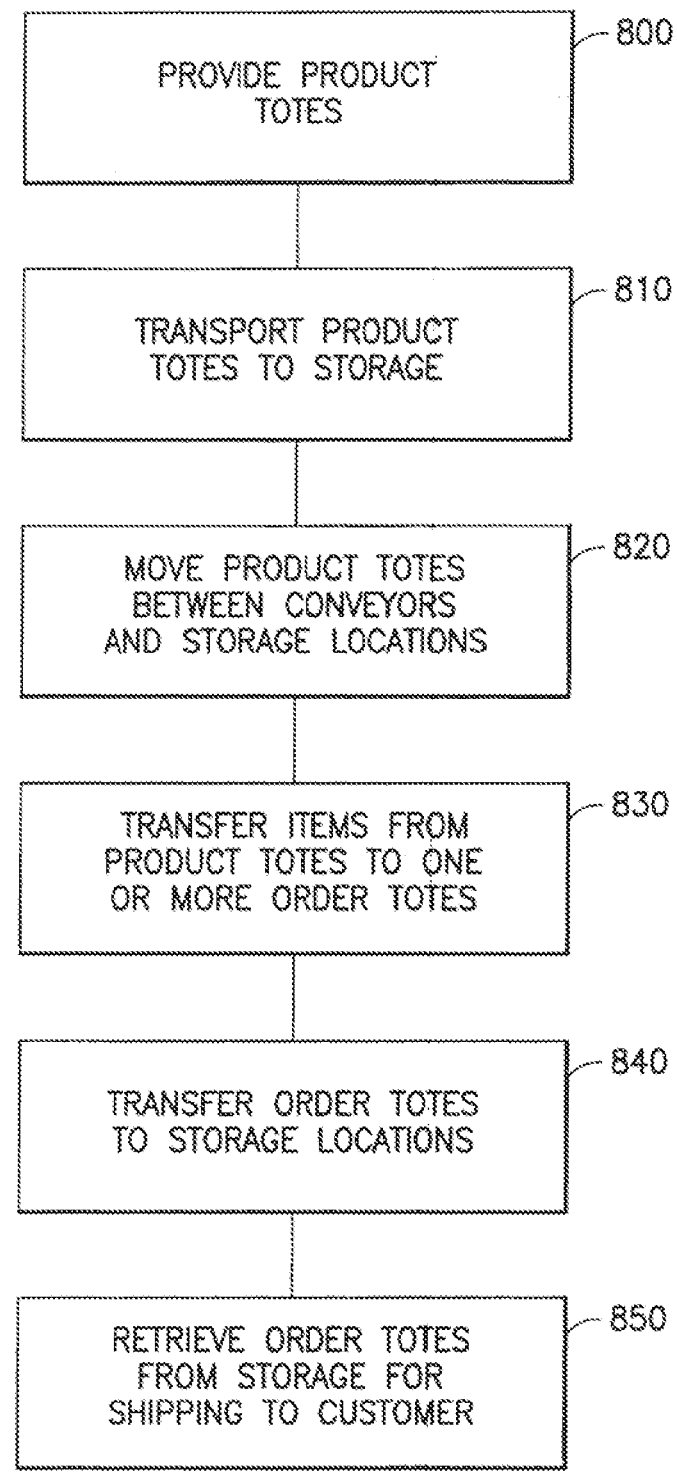
FIG. 11 is a flow diagram of an exemplary process in accordance with aspects of the disclosed embodiment.

Referring now to FIG. 11 an exemplary operation of the storage and retrieval system 12 will be described. As noted above product totes PT are inducted into the storage and retrieval system 12 in any suitable manner. (FIG. 11, Block 800). For example, the product totes PT may be transferred from another storage and retrieval system, such as system 100 of FIG. 2 or from a staging area that provides product totes PT or case units from, for example, a manufacturer's delivery truck. The product totes PT or case units may be operated on such as by removing a top of the tote or case unit to provide access to the contents therein. The product totes PT are transferred to, for example, an in-bound conveyor 150I of the storage and retrieval system 12 in any suitable manner such as by, for example, conveyor 13. (FIG. 11, Block 810). The product totes PT are removed from the conveyors 150I and placed in designated storage positions within the storage area 130. (FIG. 11, Block 820). As may be realized autonomous vehicles, such as vehicles 110 may transport the product totes PT between the conveyors 150I and the storage areas. When orders are received product totes PT designated to fulfill the order are removed from the storage area 130 to conveyor 150O by, for example, vehicle 110 for transfer to a predetermined one or more of the workstations 24. At the workstations 24 items are removed from the active product totes PTAI, PTAO and placed in corresponding order totes CTAI, CTAO for fulfilling, for example, a customer order. (FIG. 11, Block 840). It is noted, as described above, in an opportunistic order fulfillment one product tote may be used to fill multiple order totes before the product tote is removed from the workstation, whereas in the deterministic order fulfillment one product tote is used to fill only one order tote (e.g. the product tote is removed from the workstation substantially immediately after the active order tote is filled with the items designated from the product tote—see FIG. 13, Block 2370 but it should be understood that the product totes may be removed from the workstations to the storage area without filling e.g. the complete order for that product tote such as when a product tote has insufficient items to fulfill a designated quantity). The controller may be configured to cause the conveyor 32 to transfer the product totes from which the items have already been transferred to the order totes CTAI, CTAO to leave the stations LH, RH so that other product cases can be indexed to the stations for completing the transfer of designated items into the order totes CTAI, CTAO. As may be realized, any suitable number of product totes may be transferred to the stations LH, RH for transferring items to a single order tote (e.g. the transfer of items to a single order tote being a transfer of items from a station LH, RH to a respective order tote where the order tote is not moved from the active position until the order tote is filled with all designated items—see FIG. 13, Block 2380 but it should be understood that the order totes may be removed from the workstations to the storage area without filling e.g. the complete order for that product tote). As described above, the product totes PT may be transferred around the loops L1-L3 of the conveyor 32 to transfer the product totes to any workstation 24 that requires items from the tote to fulfill a customer order. Product totes that have items remaining in them after customer order fulfillment are transferred back into the storage area 130 by the conveyors 150I and vehicles 110. Empty product totes may be removed from the workstation area by, for example, a suitable conveyor (e.g. conveyor 320) and are not returned to the storage area. The empty product totes may be transferred to a staging area for reuse in the system 12 or discarded. The filled or partially filled order totes CT may be transferred from the workstations 24 into the storage area 130 through the conveyors 150I and vehicles 110 where they are stored until such time when the order totes CT are to be shipped to a customer. (FIG. 11, Block 840). As may be realized, the product totes may be transferred directly to a shipping area after being filled at workstation 24, without being placed in storage area 130. When the order totes CT are to be shipped to a customer, the vehicles 110 remove the order totes CT from the storage area 130 and transfer them to a conveyor 150O. From the conveyor 150O the order totes CT are transferred to order staging conveyor 40 in any suitable manner, such as with transfer station 150O. The order staging conveyor 40 transfers the order totes CT to a staging area where they are prepared for shipping in any suitable manner such as by wrapping the order tote, placing the order tote on a pallet or other shipping container, or otherwise placing the order tote in a transport for delivery to the customer. (FIG. 11, Block 850). As may be realized, the controller 120, or other suitable controller, is configured to issue commands to the components of the storage and retrieval system 12 to effect the induction of product totes PT into the system 12 and the transfer of product totes and order totes within the system 12 for fulfilling customer orders.

In accordance with a first aspect of the disclosed embodiments a warehousing system for storing and retrieving goods disposed in containers is provided. The system includes a multilevel storage array, each level of which has a transport area and a storage area, the storage area including an array of storage shelves configured to hold containers thereon and the transport area being substantially continuous and arranged to communicably connect the storage shelves to each other; at least one substantially continuous lift for transporting containers to and from at least one level of the multilevel storage array; at least one transport vehicle located on the at least one level and configured to traverse the transport area transporting containers between the at least one continuous lift and container storage locations on the storage shelves so that the at least one continuous lift communicates non-deterministically, via the transport vehicle, with container storage locations of each of the storage shelves on the at least one level; an infeed transport system communicably linked to the at least one continuous lift for entering product containers, holding stock goods, on the storage shelves; and an order fulfillment station arranged for generating, from the stock goods in the product containers on the storage shelves, order containers corresponding to a customer order and holding order goods, designated by the customer order, the fulfillment station being communicably connected to the multilevel storage array via the at least one continuous lift so that order containers from the fulfillment station are entered onto the storage shelves of the multilevel storage array.

In accordance with the first aspect of the disclosed embodiment the at least one transport vehicle connected to the infeed transport system and the order fulfillment station is a common transport vehicle.

In accordance with the first aspect of the disclosed embodiment the storage shelves of the array are arranged in rows and the transport area forms aisles between the rows and communicably connects each container storage location along the rows of storage shelves to the at least one continuous lift.

In accordance with the first aspect of the disclosed embodiment the warehousing system further includes a controller programmed to guide the at least one transport vehicle along transport area so that the at least one transport vehicle is capable of moving from the at least one continuous lift to each container storage location along each row of storage shelves.

In accordance with the first aspect of the disclosed embodiment the warehousing system further includes a controller programmed so that product containers and order containers are transported by the at least one transport vehicle to and from the at least one continuous lift and the container storage locations of the array of storage shelves.

In accordance with the first aspect of the disclosed embodiment the at least one continuous lift defines a container sorter that is common for the multilevel storage array and the order fulfillment station.

In accordance with a second aspect of the disclosed embodiment a warehousing system for storing and retrieving goods disposed in containers is provided. The system includes a multilevel storage array, each level of which has a transport area and a storage area, the storage area including an array of storage shelves configured to hold containers thereon and the transport area being substantially continuous and arranged to communicably connect the storage shelves to each other; at least one substantially continuous lift for transporting containers to and from at least one level of the multilevel storage array; at least one order fulfillment station arranged for generating, from the stock goods in the product containers on the storage shelves, order containers corresponding to a customer order and holding order goods, designated by the customer order, the at least one order fulfillment station being communicably connected to the multilevel storage array via the at least one continuous lift so that order containers from the at least one order fulfillment station are entered onto the storage shelves of the multilevel storage array; and at least one transport vehicle located on the at least one level and configured to traverse the transport area transporting containers between the at least one continuous lift and container storage locations on the storage shelves so that the at least one transport vehicle communicates non-deterministically, via the at least one substantially continuous lift, and is common to each of the at least one order fulfillment station.

In accordance with the second aspect of the disclosed embodiment the warehousing system further includes an infeed transport system communicably linked to the at least one continuous lift for entering product containers, holding stock goods, on the storage shelves.

In accordance with the second aspect of the disclosed embodiment the warehousing system further includes a controller programmed to guide the at least one transport vehicle along transport area so that the at least one transport vehicle is capable of moving from the at least one continuous lift to each container storage location along each row of storage shelves.

In accordance with the second aspect of the disclosed embodiment the warehousing system further includes a controller programmed so that product containers and order containers are transported by the at least one transport vehicle to and from the at least one continuous lift and the container storage locations of the array of storage shelves.

In accordance with a third aspect of the disclosed embodiment an order fulfillment station arranged for filling, from stock goods, disposed in product containers, order containers corresponding to a customer order and holding order goods designated by a customer order is provided. The fulfillment station includes an operator station where an operator is resident for picking stock goods from product containers and placing into order containers; a product container station configured for positioning the product containers for picking stock goods therefrom by the operator at the operator station, the product container station being arranged to define more than one product container holding locations; and an order container station configured for positioning the order containers for placing order goods thereinto by the operator at the operator station, the order container station defining more than one order container holding locations, wherein product container station and the order container station have predetermined characteristics that define handedness features for picking from product containers at the more than one product container holding locations, each product container holding location having a different handedness than an adjacent product container holding location.

In accordance with the third aspect of the disclosed embodiment the predetermined characteristics that define handedness features comprise at least one display configured to indicate a number of stock goods to be transferred from a product container on one side of the operator and placed into an order container disposed on the one side of the operator.

In accordance with the third aspect of the disclosed embodiment the predetermined characteristics that define handedness features comprise a communication device configured to indicate a number of stock goods to be transferred from a product container on one side of the operator and placed into an order container disposed on the one side of the operator.

In accordance with the third aspect of the disclosed embodiment the predetermined characteristics that define handedness features comprise a left and right product container station and a left and right order container station, wherein stock goods removed from product containers at the left product container station are placed in order containers at the left order container station and items removed from product containers at the right product container station are placed in order containers at the right order container station.

In accordance with the third aspect of the disclosed embodiment the product container station includes a left hand and a right hand product container station, the predetermined characteristics that define handedness features comprise the operator station being disposed such that the left hand product container station is located on a left hand side of the operator station and the right hand product container station is located on a right hand side of the operator station.

In accordance with the third aspect of the disclosed embodiment the order container station includes a left hand and a right hand order container station, the predetermined characteristics that define handedness features comprise the operator station being disposed such that the left hand order container station is located on a left hand side of the operator station and the right hand order container station is located on a right hand side of the operator station.

In accordance with a fourth aspect of the disclosed embodiment an order fulfillment station arranged for filling, from stock goods, disposed in product containers, order containers corresponding to a customer order and holding order goods designated by a customer order is provided. The fulfillment station includes an operator station where an operator is resident for picking stock goods from product containers and placing into order containers; a product container station configured for positioning the product containers for picking stock goods therefrom by the operator at the operator station, the product container station being arranged to define more than one product container holding location; an order container station configured for positioning the order containers for placing order gods thereinto by the operator at the operator station, the order container station defining more than one order container holding location; wherein the more than one product container holding location and the more than one order container holding location are configured for substantially simultaneous ambidextrous picking and placing by the operator at the operator station, the more than one product container holding locations being indexed to the one or more order container holding stations so that picking and placing is effected deterministically between indexed product container holding stations and order container holding stations.

In accordance with the fourth aspect of the disclosed embodiment the one or more product container location comprises a first product container location disposed on a right hand side of the operator station and a second product container location disposed on a left hand side of the operator station and the one or more order container location comprises a first order container location disposed on a right hand side of the operator station and a second order container location disposed on a left hand side of the operator station, wherein the left and right hand product and order containers are positioned so that stock goods are substantially simultaneously removed from the left and right hand product container stations and placed in a respective one of the left and right hand order container stations.

In accordance with the fourth aspect of the disclosed embodiment the order fulfillment station further includes at least one of an aural and visual indicator configured to indicate a number of stock goods to be removed from the product containers for placement into a corresponding one of the order containers.

In accordance with the fourth aspect of the disclosed embodiment the order fulfillment station further includes an order container conveyor and a product container conveyor and a controller connected to each of the order container conveyor and product container conveyor, the controller being configured to control movement of containers on each of the conveyors such that product containers containing stock goods to be transferred to a predetermined order container are delivered to a corresponding product container holding location while the predetermined order container is located at a predetermined order container holding station.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A warehousing system for storing and retrieving goods disposed in containers, the warehousing system comprising:
   a multilevel storage array, each level of which has a transport area and a storage area, the storage area including an array of storage shelves configured to hold containers thereon and the transport area arranged to communicably connect the storage shelves to each other, the transport area including picking aisles and a transfer path connecting the picking aisles;
   at least one vertical lift for transporting containers to and from at least one level of the multilevel storage array, wherein the transfer path connects the picking aisles and at least one vertical lift so that container storage locations on storage shelves communicate with the at least one vertical lift;
   at least one transport vehicle, distinct from the transport area, located on each of the at least one level and configured to traverse the transfer path so as to effect communication and transport containers between the container storage locations on storage shelves and the at least one vertical lift at each of the at least one level;

an infeed transport system communicably linked to the at least one level for entering product containers, holding stock goods, on the storage shelves;

an order fulfillment station arranged for generating, from the stock goods in the product containers on the storage shelves, order containers corresponding to a customer order and holding order goods, designated by the customer order; and a transport conveyor communicably connected to the at least one vertical lift and at least one of the order fulfillment station so that the at least one vertical lift is connected to one or more of the order fulfillment station.

2. The warehousing system of claim 1, wherein the at least one transport vehicle connected to the infeed transport system and the order fulfillment station is a common transport vehicle.

3. The warehousing system of claim 1, wherein the storage shelves of the array are arranged in rows and the picking aisles are disposed between the rows and communicably connects each container storage location along the rows of storage shelves to the at least one vertical lift.

4. The warehousing system of claim 1, further comprising a controller programmed to guide the at least one transport vehicle along the transport area so that the at least one transport vehicle is capable of moving from the at least one vertical lift to each container storage location along each row of storage shelves.

5. The warehousing system of claim 1, further comprising a controller programmed so that product containers and order containers are transported by the at least one transport vehicle to and from the at least one vertical lift and the container storage locations of the array of storage shelves.

6. The warehousing system of claim 1, wherein the at least one vertical lift defines a container sorter that is common for the multilevel storage array and the order fulfillment station.

7. The warehousing system of claim 1, wherein the order fulfillment station includes one or more motion tracking units configured to track operator movement relative to the product containers and order containers for effecting a determination of a number of stock goods transferred between the product containers and the order containers.

8. The warehousing system of claim 1, wherein the order fulfillment station includes a display configured to indicate to an operator a number of stock goods to be removed from the product containers.

9. The warehousing system of claim 1, wherein the product containers are buffered at the order fulfillment station in a predetermined sequence based on the customer order.

10. A warehousing system for storing and retrieving goods disposed in containers, the warehousing system comprising:

a multilevel storage array, each level of which has a transport area and a storage area, the storage area including an array of storage shelves configured to hold containers thereon and the transport area arranged to communicably connect the storage shelves to each other, the transport area including picking aisles and a transfer path connecting the picking aisles;

at least one vertical lift for transporting containers to and from at least one level of the multilevel storage array, wherein the transfer path connects the picking aisles and at least one vertical lift so that container storage locations on storage shelves communicate with the at least one vertical lift;

at least one order fulfillment station arranged for generating, from the stock goods in the containers on the storage shelves, order containers corresponding to a customer order and holding order goods, designated by the customer order;

a transport conveyor communicably connected to the at least one vertical lift and the at least one order fulfillment station so that the at least one vertical lift is connected to one or more of the order fulfillment station; and at least one transport vehicle, distinct from the transport area, located on the at least one level and configured to traverse the transfer path so as to effect communication and transport containers between the container storage locations on storage shelves and the at least one vertical lift at each of the at least one level.

11. The warehousing system of claim 10, further comprising an infeed transport system communicably linked to the at least one level for entering product containers, holding stock goods, on the storage shelves.

12. The warehousing system of claim 10, further comprising a controller programmed to guide the at least one transport vehicle along transport area so that the at least one transport vehicle is capable of moving from the at least one vertical lift to each container storage location along each row of storage shelves.

13. The warehousing system of claim 10, further comprising a controller programmed so that product containers and order containers are transported by the at least one transport vehicle to and from the at least one vertical lift and the container storage locations of the array of storage shelves.

14. The warehousing system of claim 10, wherein the array of storage shelves are arranged in rows of storage shelves and the picking aisles are disposed between the rows and communicably connects each container storage location along the rows of storage shelves to the at least one vertical lift.

15. The warehousing system of claim 10, wherein the at least one order fulfillment station includes one or more motion tracking units configured to track operator movement relative to the containers and order containers for effecting a determination of a number of stock goods transferred between the containers and the order containers.

16. The warehousing system of claim 10, wherein the at least one order fulfillment station includes a display configured to indicate to an operator a number of stock goods to be removed from the containers.

17. The warehousing system of claim 10, wherein the containers are buffered at the at least one order fulfillment station in a predetermined sequence based on the customer order.

18. A method for storing and retrieving goods in a warehouse where the goods are disposed in containers, the method comprising:

providing a multilevel storage array, each level of which has a transport area and a storage area, the storage area including an array of storage shelves configured to hold containers thereon and the transport area arranged to communicably connect the storage shelves to each other, the transport area including picking aisles and a transfer path connecting the picking aisles;

transporting containers to and from at least one level of the multilevel storage array with at least one vertical lift, wherein the transfer path connects the picking aisles and at least one vertical lift so that container storage locations on storage shelves communicate with the at least one vertical lift;

effecting communication and transport containers between the container storage locations on storage shelves and the at least one vertical lift at each of the at least one level with at least one transport vehicle, that is distinct from the transport area, where the at least one transport vehicle is located on each of the at least one level and traverses the transfer path;

re-entering product containers, holding stock goods, on the storage shelves with an infeed transport system communicably linked to the at least one level with a transport conveyor; and generating at an order fulfillment station, from the stock goods in the product containers on the storage shelves, order containers corresponding to a customer order and holding order goods, designated by the customer order, wherein the at least one vertical lift and at least one of the order fulfillment station are communicably connected to the transport conveyor so that the at least one vertical lift is connected to one or more of the order fulfillment station.

19. The method of claim 18, wherein the at least one transport vehicle connected to the infeed transport system and the order fulfillment station is a common transport vehicle.

20. The method of claim 18, wherein the storage shelves of the array are arranged in rows and the picking aisles are disposed between the rows and communicably connects each container storage location along the rows of storage shelves to the at least one vertical lift.

21. The method of claim 18, further comprising guiding the at least one transport vehicle, with a controller, along the transport area so that the at least one transport vehicle is capable of moving from the at least one vertical lift to each container storage location along each row of storage shelves.

22. The method of claim 18, further comprising providing a controller programmed so that product containers and order containers are transported by the at least one transport vehicle to and from the at least one vertical lift and the container storage locations of the array of storage shelves.

23. The method of claim 18, wherein the product containers are buffered at the order fulfillment station in a predetermined sequence based on the customer order.

\* \* \* \* \*